United States Patent
Zhang et al.

(10) Patent No.: US 11,537,026 B2
(45) Date of Patent: Dec. 27, 2022

(54) OPTICAL FREQUENCY COMB GENERATION IN INTEGRATED LITHIUM NIOBATE DEVICES

(71) Applicants: President and Fellows of Harvard College, Cambridge, MA (US); THE BOARD OF TRUSTEES OF LELAND STANFORD JUNIOR UNIVERSITY, Stanford, CA (US)

(72) Inventors: Mian Zhang, Cambridge, MA (US); Cheng Wang, Cambridge, MA (US); Marko Loncar, Cambridge, MA (US); Brandon Taylor Buscaino, Yorba Linda, CA (US); Joseph M. Kahn, San Carlos, CA (US)

(73) Assignees: PRESIDENT AND FELLOWS OF HARVARD COLLEGE, Cambridge, MA (US); THE BOARD OF TRUSTEES OF LELAND STANFORD JUNIOR UNIVERSITY, Stanford, CA (US)

( * ) Notice: Subject to any disclaimer, the term of this patent is extended or adjusted under 35 U.S.C. 154(b) by 134 days.

(21) Appl. No.: 17/051,670

(22) PCT Filed: Apr. 30, 2019

(86) PCT No.: PCT/US2019/030003
§ 371 (c)(1),
(2) Date: Oct. 29, 2020

(87) PCT Pub. No.: WO2019/213137
PCT Pub. Date: Nov. 7, 2019

(65) Prior Publication Data
US 2021/0096444 A1 Apr. 1, 2021

Related U.S. Application Data

(60) Provisional application No. 62/664,806, filed on Apr. 30, 2018.

(51) Int. Cl.
*G02F 1/35* (2006.01)

(52) U.S. Cl.
CPC ........ *G02F 1/3536* (2013.01); *G02F 2203/56* (2013.01)

(58) Field of Classification Search
CPC ............................ G02F 1/3536; G02F 2203/56
See application file for complete search history.

(56) References Cited

U.S. PATENT DOCUMENTS

| 6,795,481 B2 * | 9/2004 | Maleki | H01S 5/141 |
|---|---|---|---|
| | | | 372/92 |
| 2020/0064512 A1 * | 2/2020 | Stark | G02F 1/365 |

FOREIGN PATENT DOCUMENTS

WO    WO-2019/213137 A1    11/2019

OTHER PUBLICATIONS

Boes et al., "Status and Potential of Lithium Niobate on Insulator (LNOI) for Photonic Integrated Circuits," Laser Phot Rev, 12(4): 1700256 (2018).

(Continued)

*Primary Examiner* — Daniel Petkovsek
(74) *Attorney, Agent, or Firm* — Potomac Law Group, PLLC; Reza Mollaaghababa; Reza Sadr

(57) ABSTRACT

Kerr and electro-optic frequency comb generation in integrated lithium niobate devices is provided. In various embodiments, a microring resonator comprising lithium niobate is disposed on a thermal oxide substrate. The microring resonator has inner and outer edges. Electrodes are positioned along the inner and outer edges of the microring resonator. The electrodes are adapted to modulate the refractive index of the microring. A pump laser is optically coupled to the microring resonator. The microring resonator is adapted to emit an electro-optical frequency comb when receiving a pump mode from the pump laser and when the (Continued)

electrodes are driven at a frequency equal to a free-spectral-range of the microring resonator.

64 Claims, 75 Drawing Sheets

(56) References Cited

OTHER PUBLICATIONS

International Search Report and Written Opinion for International Application No. PCT/US2019/030003 dated Aug. 27, 2019.
Krasnokutska et al., "Ultra-low loss photonic circuits in lithium niobate on insulator," Arxiv.org, Cornell University Library (2017).
Pfeiffer et al., "Photonic Damascene process for integrated high-Q microresonator based nonlinear photonics," Optica, 3(1):20 (2016).
Poberaj et al., "Lithium niobate on insulator (LNOI) for micro-photonic devices," Laser & Photonics Reviews, 6(4): 488-503 (2012).
Zhang et al., "Monolithic ultra-high-Q lithium niobate microring resonator," Arxiv.org, Cornell University Library (2017).

\* cited by examiner

CW Pump Laser $\omega_1 + \omega_2 = \omega_3 + \omega_4$

Kerr

CW Pump Laser $\omega_1 = \omega_2 + \omega_3$
Electro-optic

OPTICAL FREQUENCY COMB GENERATION IN INTEGRATED LITHIUM NIOBATE DEVICES

CROSS-REFERENCE TO RELATED APPLICATIONS

This application is the U.S. National Stage of International Application PCT/US19/30003, filed Apr. 30, 2019, which claims the benefit of U.S. Provisional Application No. 62/664,806, filed on Apr. 30, 2018, each of which is hereby incorporated by reference in its entirety.

BACKGROUND

Embodiments of the present disclosure relate to optical frequency comb generation, and more specifically, to Kerr and electro-optic frequency comb generation in integrated lithium niobate devices.

BRIEF SUMMARY

According to embodiments of the present disclosure, methods and devices for optical frequency comb generation are provided.

In various embodiments, a device comprises: a thermal oxide substrate; a microring resonator comprising lithium niobate, the microring resonator disposed on the thermal oxide substrate; a pump laser optically coupled to the microring resonator, wherein the microring resonator is adapted to emit a Kerr frequency comb when receiving a pump mode from the pump laser.

In some embodiments, the Kerr frequency comb has a span of at least 80 nm.

In some embodiments, the Kerr frequency comb has a span of at least 200 nm.

In some embodiments, the Kerr frequency comb has a span of at least 300 nm.

In some embodiments, the Kerr frequency comb has a span of at least 700 nm.

In some embodiments, the microring resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of 50 nm to 1000 nm.

In some embodiments, the ridge portion has a height of about 350 nm.

In some embodiments, the ridge portion has a width of 1000 nm to 5000 nm.

In some embodiments, the ridge portion has a width of 1300 nm to 1500 nm.

In some embodiments, the ridge portion has a cross sectional area of at most 5 $\mu m^2$.

In some embodiments, the ridge portion has a cross sectional area of at most 2 $\mu m^2$.

In some embodiments, the microring resonator has a pump rejection ratio of at most 47 dB.

In some embodiments, the pump mode has a wavelength of 300 nm to 5000 nm.

In some embodiments, the pump mode has a wavelength of 1450 nm to 1600 nm.

In some embodiments, the pump mode has a wavelength of 1500 nm to 1750 nm.

In some embodiments, the pump mode has a wavelength of about 1570 nm.

In some embodiments, the microring resonator has a Q factor of at least 500,000.

In some embodiments, the microring resonator has a Q factor of at least 106.

In some embodiments, the microring resonator has a Q factor of about 107.

In some embodiments, the pump laser has a power of at least 50 mW.

In some embodiments, the pump laser has a power of at least 100 mW.

In some embodiments, the pump laser has a power of about 300 mW.

In some embodiments, the thermal oxide substrate comprises $SiO_2$.

In some embodiments, the microring resonator has a radius of 20 $\mu m$ to 2000 $\mu m$.

In some embodiments, the microring resonator has a radius of 20 $\mu m$ to 200 $\mu m$.

In some embodiments, the microring resonator has a radius of about 80 $\mu m$.

In some embodiments, the Kerr frequency comb has a line spacing of about 2 nm.

In some embodiments, the Kerr frequency comb has a TM-polarized comb.

In some embodiments, the Kerr frequency comb has a TE-polarized comb.

In various embodiments, a device comprises: a thermal oxide substrate; a microring resonator comprising lithium niobate, the microring resonator disposed on the thermal oxide substrate and having inner and outer edges; electrodes positioned along the inner and outer edges of the microring resonator, adapted to modulate the refractive index of the microring; a pump laser optically coupled to the microring resonator, wherein the microring resonator is adapted to emit an electro-optical frequency comb when receiving a pump mode from the pump laser and when the electrodes are driven at a frequency equal to a free-spectral-range of the microring resonator.

In some embodiments, the pump laser is optically coupled to the microring resonator via a coupling ring resonator, the coupling ring resonator having a free spectral range that is a non-integer multiple of a free spectral range of the microring resonator.

In some embodiments, an output waveguide is optically coupled to the microring resonator.

In some embodiments, the coupling ring resonator has a free spectral range greater than that of the microring resonator.

In some embodiments, the microring resonator is further adapted to emit a Kerr frequency comb when receiving the pump mode from the pump laser.

In some embodiments, the electro-optical frequency comb spans at least 10 nm.

In some embodiments, the electro-optical frequency comb has spacing of 1 GHz to 300 GHz.

In some embodiments, the electro-optical frequency comb has spacing of 10 GHz to 11 GHz.

In some embodiments, the electrodes comprise gold.

In some embodiments, the electrodes comprise copper.

In some embodiments, the microring resonator has a Q factor of at least 500,000.

In some embodiments, the electrodes are positioned at least 1.5 $\mu m$ from the edges of the microring resonator.

In some embodiments, the electrodes are positioned about 3.3 µm from the edges of the microring resonator.

In some embodiments, the thermal oxide substrate has a thickness of about 1 µm.

In some embodiments, the thermal oxide substrate has a thickness of about 2 µm.

In some embodiments, the electrodes are driven at a frequency of about 10 GHz.

In some embodiments, the electrodes are driven at a power of about 10 mW.

In some embodiments, the pump laser has a power of 0.1 mW to 3 W.

In some embodiments, the pump laser has a power of from 2 mW to 100 mW.

In some embodiments, the electro-optical frequency comb spans at least 10 nm.

In some embodiments, the electro-optical frequency comb spans at least 50 nm.

In some embodiments, the electro-optical frequency comb spans at least 300 nm.

In some embodiments, the electro-optical frequency comb has a center wavelength of 380 nm to 5000 nm.

In some embodiments, the electro-optical frequency comb has a center wavelength of 1300 nm to 1700 nm.

In some embodiments, the electro-optical frequency comb has a center wavelength of 1500 nm to 1680 nm.

In some embodiments, the microring resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of about 350 nm.

In some embodiments, the ridge portion has a width of 100 nm to 5000 nm.

In some embodiments, the ridge portion has a width of 1300 nm to 2400 nm.

In some embodiments, the ridge portion has a width of about 1400 nm.

In some embodiments, the ridge portion has a cross sectional area less than 5 $µm^2$.

In some embodiments, the ridge portion has a cross sectional area less than 2 $µm^2$.

In some embodiments, the microring resonator is air-clad.

In some embodiments, the microring resonator is clad with $SiO_2$.

In some embodiments, an inductor is electrically coupled to the electrodes.

In some embodiments, the inductor is adapted to form a microwave resonator having a resonant frequency, the resonant frequency being an integer multiple of a free-spectral range of the microring resonator.

In various embodiments, a device comprises: a substrate; a microring resonator comprising an electro-optic material, the microring resonator disposed on the substrate; a pump laser optically coupled to the microring resonator, wherein the microring resonator is adapted to emit a Kerr frequency comb when receiving a pump mode from the pump laser.

In some embodiments, the substrate comprises a thermal oxide.

In some embodiments, the substrate comprises $SiO_2$.

In some embodiments, the substrate comprises quartz.

In some embodiments, the substrate comprises sapphire.

In some embodiments, the electro-optic material comprises lithium niobate.

In some embodiments, the electro-optic material comprises lithium tantalate.

In some embodiments, the electro-optic material has an electro-optic coefficient of at least 2 pm/V.

In some embodiments, the Kerr frequency comb has a span of at least 80 nm.

In some embodiments, the Kerr frequency comb has a span of at least 200 nm.

In some embodiments, the Kerr frequency comb has a span of at least 300 nm.

In some embodiments, the Kerr frequency comb has a span of at least 700 nm.

In some embodiments, the microring resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of 50 nm to 1000 nm.

In some embodiments, the ridge portion has a height of about 350 nm.

In some embodiments, the ridge portion has a width of 1000 nm to 5000 nm.

In some embodiments, the ridge portion has a width of 1300 nm to 1500 nm.

In some embodiments, the ridge portion has a cross sectional area of at most 5 µµm2.

In some embodiments, the ridge portion has a cross sectional area of at most 2 µm2.

In some embodiments, the microring resonator has a pump rejection ratio of at most 47 dB.

In some embodiments, the pump mode has a wavelength of 300 nm to 5000 nm.

In some embodiments, the pump mode has a wavelength of 1450 nm to 1600 nm.

In some embodiments, the pump mode has a wavelength of 1500 nm to 1750 nm.

In some embodiments, the pump mode has a wavelength of about 1570 nm.

In some embodiments, the microring resonator has a Q factor of at least 500,000.

In some embodiments, the microring resonator has a Q factor of at least 106.

In some embodiments, the microring resonator has a Q factor of about 107.

In some embodiments, the pump laser has a power of at least 50 mW.

In some embodiments, the pump laser has a power of at least 100 mW.

In some embodiments, the pump laser has a power of about 300 mW.

In some embodiments, the microring resonator has a radius of 20 µm to 2000 µm.

In some embodiments, the microring resonator has a radius of 20 µm to 200 µm.

In some embodiments, the microring resonator has a radius of about 80 µm.

In some embodiments, the Kerr frequency comb has a line spacing of about 2 nm.

In some embodiments, the Kerr frequency comb has a TM-polarized comb.

In some embodiments, the Kerr frequency comb has a TE-polarized comb.

In various embodiments, a device comprises: a substrate; a resonator comprising an electro-optic material, the resonator disposed on the substrate; electrodes positioned along the resonator with at least a portion of the resonator disposed between the electrodes, the electrodes adapted to modulate the refractive index of the resonator; a pump laser optically coupled to the resonator, wherein the resonator is adapted to emit an electro-optical frequency comb when receiving a pump mode from the pump laser and when the electrodes are driven at a frequency, the frequency being an integer multiple of a free-spectral-range of the resonator.

In some embodiments, the substrate comprises a thermal oxide.

In some embodiments, the substrate comprises $SiO_2$.

In some embodiments, the substrate comprises quartz.

In some embodiments, the substrate comprises sapphire.

In some embodiments, the electro-optic material comprises lithium niobate.

In some embodiments, the electro-optic material comprises lithium tantalate.

In some embodiments, the electro-optic material has an electro-optic coefficient of at least 2 pm/V.

In some embodiments, the resonator comprises a racetrack resonator.

In some embodiments, the racetrack resonator has a minor axis measuring 20 μm to 2000 μm and a perpendicular major axis measuring 0.1 mm to 20 mm.

In some embodiments, the resonator has a minor axis measuring about 200 μm and a perpendicular major axis measuring 2 mm to 6 mm.

In some embodiments, the major axis is perpendicular to an extraordinary axis of the electro-optic material.

In some embodiments, the resonator comprises a ring resonator.

In some embodiments, the resonator comprises a ring resonator or a racetrack resonator, the resonator has inner and outer edges, a first surface in contact with the substrate, and a second surface parallel to the first surface, the electrodes are positioned along the first and second surfaces of the resonator.

In some embodiments, the resonator comprises a ring resonator or a racetrack resonator, the resonator has inner and outer edges, a first surface in contact with the substrate, and a second surface parallel to the first surface, a first electrode is positioned along the outer edge of the resonator, a second electrode is positioned along the second surface of the resonator.

In some embodiments, the pump laser is optically coupled to the resonator via a coupling resonator, the coupling resonator having a free spectral range that is a non-integer multiple of a free spectral range of the resonator.

In some embodiments, the coupling resonator comprises a ring resonator.

In some embodiments, an output waveguide is optically coupled to the resonator.

In some embodiments, the coupling resonator has a free spectral range greater than that of the resonator.

In some embodiments, the resonator is further adapted to emit a Kerr frequency comb when receiving the pump mode from the pump laser.

In some embodiments, the electro-optical frequency comb spans at least 10 nm.

In some embodiments, the electro-optical frequency comb has spacing of 1 GHz to 300 GHz.

In some embodiments, the electro-optical frequency comb has spacing of 10 GHz to 11 GHz.

In some embodiments, the electrodes comprise gold.

In some embodiments, the electrodes comprise copper.

In some embodiments, the resonator has a Q factor of at least 500,000.

In some embodiments, the electrodes are positioned at least 1.5 μm from the edges of the resonator.

In some embodiments, the electrodes are positioned about 3.3 μm from the edges of the resonator.

In some embodiments, the substrate has a thickness of about 1 μm.

In some embodiments, the substrate has a thickness of about 2 μm.

In some embodiments, the electrodes are driven at a frequency of about 10 GHz.

In some embodiments, the electrodes are driven at a power of about 10 mW.

In some embodiments, the pump laser has a power of 0.1 mW to 3 W.

In some embodiments, the pump laser has a power of from 2 mW to 100 mW.

In some embodiments, the electro-optical frequency comb spans at least 10 nm.

In some embodiments, the electro-optical frequency comb spans at least 50 nm.

In some embodiments, the electro-optical frequency comb spans at least 300 nm.

In some embodiments, the electro-optical frequency comb has a center wavelength of 380 nm to 5000 nm.

In some embodiments, the electro-optical frequency comb has a center wavelength of 1300 nm to 1700 nm.

In some embodiments, the electro-optical frequency comb has a center wavelength of 1500 nm to 1680 nm.

In some embodiments, the resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of about 350 nm.

In some embodiments, the ridge portion has a width of 100 nm to 5000 nm.

In some embodiments, the ridge portion has a width of 1300 nm to 2400 nm.

In some embodiments, the ridge portion has a width of about 1400 nm.

In some embodiments, the ridge portion has a cross sectional area less than 5 $\mu m^2$.

In some embodiments, the ridge portion has a cross sectional area less than 2 $\mu m^2$.

In some embodiments, the resonator is air-clad.

In some embodiments, the resonator is clad with $SiO_2$.

In some embodiments, an inductor is electrically coupled to the electrodes.

In some embodiments, the inductor is adapted to form a microwave resonator having a resonant frequency, the resonant frequency being an integer multiple of a free-spectral range of the microring resonator.

In various embodiments, a method of generating a Kerr frequency comb comprises: receiving a pump mode from a pump laser by a microring resonator, wherein the microring resonator comprising an electro-optic material, the microring resonator disposed on a substrate, the pump laser optically coupled to the microring resonator, the microring resonator is adapted to emit a Kerr frequency comb when receiving a pump mode from the pump laser.

In some embodiments, the substrate comprises a thermal oxide.

In some embodiments, the substrate comprises $SiO_2$.

In some embodiments, the substrate comprises quartz.

In some embodiments, the substrate comprises sapphire.

In some embodiments, the electro-optic material comprises lithium niobate.

In some embodiments, the electro-optic material comprises lithium tantalate.

In some embodiments, the electro-optic material has an electro-optic coefficient of at least 2 pm/V.

In some embodiments, the Kerr frequency comb has a span of at least 80 nm.

In some embodiments, the Kerr frequency comb has a span of at least 200 nm.

In some embodiments, the Kerr frequency comb has a span of at least 300 nm.

In some embodiments, the Kerr frequency comb has a span of at least 700 nm.

In some embodiments, the microring resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of 50 nm to 1000 nm.

In some embodiments, the ridge portion has a height of about 350 nm.

In some embodiments, the ridge portion has a width of 1000 nm to 5000 nm.

In some embodiments, the ridge portion has a width of 1300 nm to 1500 nm.

In some embodiments, the ridge portion has a cross sectional area of at most 5 $\mu m^2$.

In some embodiments, the ridge portion has a cross sectional area of at most 2 $\mu m^2$.

In some embodiments, the microring resonator has a pump rejection ratio of at most 47 dB.

In some embodiments, the pump mode has a wavelength of 300 nm to 5000 nm.

In some embodiments, the pump mode has a wavelength of 1450 nm to 1600 nm.

In some embodiments, the pump mode has a wavelength of 1500 nm to 1750 nm.

In some embodiments, the pump mode has a wavelength of about 1570 nm.

In some embodiments, the microring resonator has a Q factor of at least 500,000.

In some embodiments, the microring resonator has a Q factor of at least $10^6$.

In some embodiments, the microring resonator has a Q factor of about $10^7$.

In some embodiments, the pump laser has a power of at least 50 mW.

In some embodiments, the pump laser has a power of at least 100 mW.

In some embodiments, the pump laser has a power of about 300 mW.

In some embodiments, the microring resonator has a radius of 20 $\mu m$ to 2000 $\mu m$.

In some embodiments, the microring resonator has a radius of 20 $\mu m$ to 200 $\mu m$.

In some embodiments, the microring resonator has a radius of about 80 $\mu m$.

In some embodiments, the Kerr frequency comb has a line spacing of about 2 nm.

In some embodiments, the Kerr frequency comb has a TM-polarized comb.

In some embodiments, the Kerr frequency comb has a TE-polarized comb.

In various embodiments, a method of generating an electro-optical frequency comprises: receiving a pump mode from a pump laser by a resonator, wherein the resonator comprises an electro-optic material, the resonator is disposed on a substrate; driving electrodes at a frequency, the frequency being an integer multiple of a free-spectral-range of the resonator, wherein the electrodes are positioned along the resonator with at least a portion of the resonator disposed between the electrodes, the electrodes adapted to modulate the refractive index of the resonator.

In some embodiments, the substrate comprises a thermal oxide.

In some embodiments, the substrate comprises $SiO_2$.

In some embodiments, the substrate comprises quartz.

In some embodiments, the substrate comprises sapphire.

In some embodiments, the electro-optic material comprises lithium niobate.

In some embodiments, the electro-optic material comprises lithium tantalate.

In some embodiments, the electro-optic material has an electro-optic coefficient of at least 2 pm/V.

In some embodiments, the resonator comprises a racetrack resonator.

In some embodiments, the racetrack resonator has a minor axis measuring 20 $\mu m$ to 2000 $\mu m$ and a perpendicular major axis measuring 0.1 mm to 20 mm.

In some embodiments, the resonator has a minor axis measuring about 200 $\mu m$ and a perpendicular major axis measuring 2 mm to 6 mm.

In some embodiments, the major axis is perpendicular to an extraordinary axis of the electro-optic material.

In some embodiments, the resonator comprises a ring resonator.

In some embodiments, the resonator comprises a ring resonator or a racetrack resonator, the resonator has inner and outer edges, a first surface in contact with the substrate, and a second surface parallel to the first surface, the electrodes are positioned along the first and second surfaces of the resonator.

In some embodiments, the resonator comprises a ring resonator or a racetrack resonator, the resonator has inner and outer edges, a first surface in contact with the substrate, and a second surface parallel to the first surface, a first electrode is positioned along the outer edge of the resonator, a second electrode is positioned along the second surface of the resonator.

In some embodiments, the pump laser is optically coupled to the resonator via a coupling resonator, the coupling resonator having a free spectral range that is a non-integer multiple of a free spectral range of the resonator.

In some embodiments, the coupling resonator comprises a ring resonator.

In some embodiments, an output waveguide is optically coupled to the resonator.

In some embodiments, the coupling resonator has a free spectral range greater than that of the resonator.

In some embodiments, the resonator is further adapted to emit a Kerr frequency comb when receiving the pump mode from the pump laser.

In some embodiments, the electro-optical frequency comb spans at least 10 nm.

In some embodiments, the electro-optical frequency comb has spacing of 1 GHz to 300 GHz.

In some embodiments, the electro-optical frequency comb has spacing of 10 GHz to 11 GHz.

In some embodiments, the electrodes comprise gold.

In some embodiments, the electrodes comprise copper.

In some embodiments, the resonator has a Q factor of at least 500,000.

In some embodiments, the electrodes are positioned at least 1.5 μm from the edges of the resonator.

In some embodiments, the electrodes are positioned about 3.3 μm from the edges of the resonator.

In some embodiments, the substrate has a thickness of about 1 μm.

In some embodiments, the substrate has a thickness of about 2 μm.

In some embodiments, the electrodes are driven at a frequency of about 10 GHz.

In some embodiments, the electrodes are driven at a power of about 10 mW.

In some embodiments, the pump laser has a power of 0.1 mW to 3 W.

In some embodiments, the pump laser has a power of from 2 mW to 100 mW.

In some embodiments, the electro-optical frequency comb spans at least 10 nm.

In some embodiments, the electro-optical frequency comb spans at least 50 nm.

In some embodiments, the electro-optical frequency comb spans at least 300 nm.

In some embodiments, the electro-optical frequency comb has a center wavelength of 380 nm to 5000 nm.

In some embodiments, the electro-optical frequency comb has a center wavelength of 1300 nm to 1700 nm.

In some embodiments, the electro-optical frequency comb has a center wavelength of 1500 nm to 1680 nm.

In some embodiments, the resonator comprises a ridge portion extending from a slab portion, the ridge portion having a height perpendicular to the slab portion and a width parallel to the slab portion.

In some embodiments, the slab portion has a thickness of 5 nm to 1000 nm.

In some embodiments, the slab portion has a thickness of about 250 nm.

In some embodiments, the ridge portion has a height of about 350 nm.

In some embodiments, the ridge portion has a width of 100 nm to 5000 nm.

In some embodiments, the ridge portion has a width of 1300 nm to 2400 nm.

In some embodiments, the ridge portion has a width of about 1400 nm.

In some embodiments, the ridge portion has a cross sectional area less than 5 μm².

In some embodiments, the ridge portion has a cross sectional area less than 2 μm².

In some embodiments, the resonator is air-clad.

In some embodiments, the resonator is clad with $SiO_2$.

In some embodiments, an inductor is electrically coupled to the electrodes.

In some embodiments, the inductor is adapted to form a microwave resonator having a resonant frequency, the resonant frequency being an integer multiple of a free-spectral range of the microring resonator.

In some embodiments, the ring resonator is driven in a traveling wave configuration.

In some embodiments, the ring resonator has a light propagation direction, and the traveling wave configuration has a direction that is the same as the light propagation direction.

DETAILED DESCRIPTION

Figure 1:
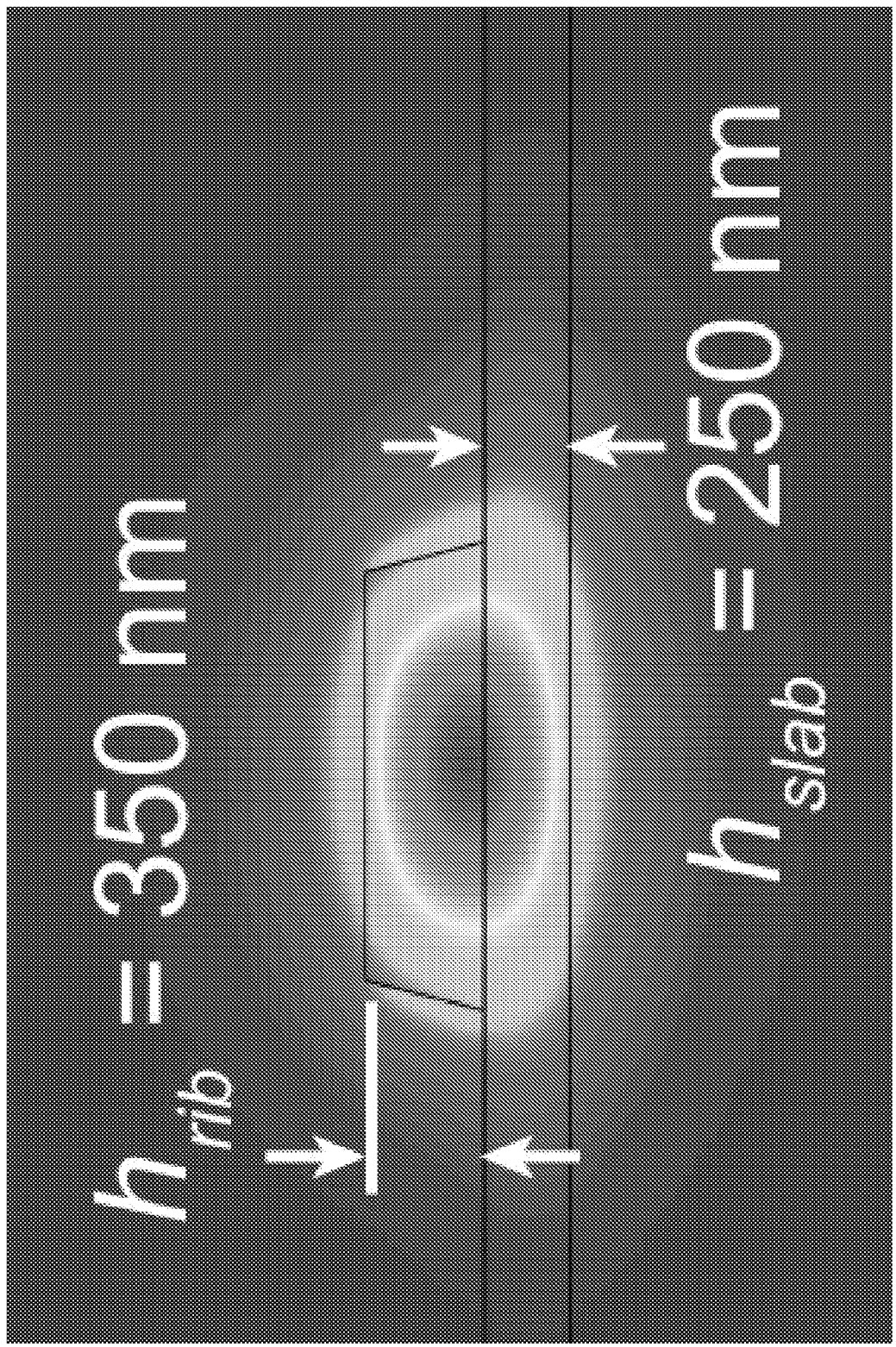
FIG. 1 is a cross sectional view of an exemplary waveguide according to embodiments of the present disclosure.

The present disclosure provides various devices and methods for generating frequency combs. Various embodiments include applications on lithium niobate (LN) and other $\chi(2)$ material based devices.

Integrated optical frequency combs are useful for precision timing, optical communication, and spectroscopy. Combs may be generated through the optical four-wave mixing process on chip where a powerful optical pump laser is coupled to a high-Q optical resonator with high Kerr ($\chi(3)$) nonlinearity. Alternatively, a frequency comb may be generated electro-optically (EO, $\chi(2)$), where a coherent low-noise electrical signal generates sidebands from the pump laser. In additional to Lithium Niobate, other $\chi(2)$ materials include lithium tantalate, PZT, and potassium niobate.

Many frequency comb applications require, in addition to the comb generator, a variety of photonic components such as fast switches, modulators, and/or nonlinear wavelength converters, which rely on strong second-order optical nonlinearity ($\chi^{(2)}$). These functionalities may be implemented as discrete off-chip components, which come at the expense of extra system complexity and increased losses. The present disclosure provides for frequency comb generation on a single chip.

Type I Comb Generation: Kerr

The present disclosure provides Kerr frequency comb generation in high quality factor lithium niobate microresonators. In various embodiments, the generated combs span over 200 nm in the telecommunication wavelength range, and can be manipulated at high speed.

Kerr combs are generated on $\chi^{(3)}$ materials such as silicon dioxide and silicon nitride. The present disclosure describes structures that generate Kerr combs on lithium niobate. For Kerr combs, ring resonators are designed to exhibit anomalous dispersion to maximize comb generation efficiency. The waveguide widths and heights are designed to achieve anomalous dispersion.

Microresonator Kerr frequency combs may be realized in various material platforms, including silica ($SiO_2$), silicon nitride (SiN), silicon (Si), crystalline fluorides, diamond, aluminium nitride (AlN), and aluminium-gallium arsenide (AlGaAs). While most of these materials possess large $\chi^{(3)}$ nonlinearity and low optical loss, which are required for Kerr comb generation, they usually have small or zero $\chi^{(2)}$ nonlinearity and therefore are not suitable for on-chip integration of $\chi^{(2)}$ components that are necessary for various frequency comb applications. Carrier-injection based Si devices can be electrically modulated at high speeds, but exhibits much higher optical losses than their intrinsic Si counterparts. (Al)GaAs possesses high $\chi^{(2)}$ nonlinearity for second harmonic generation, but much weaker electro-optic effect ($r_{41}$=1.5×10$^{-12}$ m/V). As a result, off-chip components are required for achieving these complex functionalities and on-chip manipulation of the generated combs is limited to slow thermal effects or high-voltage electrical signals. Heterogeneous integration of photonic chips with different functionalities may be adopted to circumvent this problem, however, this approach increases the complexity and cost of the system, and requires scalable and low-loss optical links between chips.

The present disclosure provides for achieving $\chi^{(2)}$ functionalities by the monolithic integration of lithium niobate nanophotonic waveguides, microring resonators, filters, and/or modulators on the same chip. Lithium niobate possesses large $\chi^{(2)}$ ($r_{33}$=3×10$^{-11}$ m/V) and $\chi^{(3)}$ (Kerr) (1.6×10$^{-21}$ m$^2$/V$^2$) nonlinearities. The large $\chi^{(3)}$ nonlinearity enables the generation of a Kerr frequency comb, while the large $\chi^{(2)}$ nonlinearity enables the manipulation of the generated comb by an externally applied electric field.

In order for the $\chi^{(3)}$ optical parametric oscillation (OPO) process to take place, a microresonator with a high quality (Q) factor and anomalous dispersion is needed. The former ensures that the four-wave mixing (FWM) process could cascade and overcome the optical losses of the microresonator, and the latter compensates for the nonlinear responses of the strong pump (self-phase modulation (SPM) and cross-phase modulation (XPM)). While ultra-high-Q (~10$^8$) LN whispering-gallery-mode resonators may be fabricated using mechanical polishing methods, their dispersion properties are predetermined by the bulk material properties and cannot be engineered. In contrast, the integrated approach of the present disclosure relies on an ultralow-loss microstructured LN photonic platform that offers dispersion engineering capability.

In various embodiments, a wide Kerr comb is generated on a LN photonic chip, spanning>700 nm, with electrically programmable filtering of a single comb line with a pump rejection ratio of 47 dB, and intensity modulation of a selected line at up to 500 Mbit s$^{-1}$.

Referring to FIG. 1, a cross section of an exemplary waveguide according to the present disclosure is provided. This exemplary waveguide is not clad, meaning that the waveguide is exposed to air at the top.

Figure 2A:
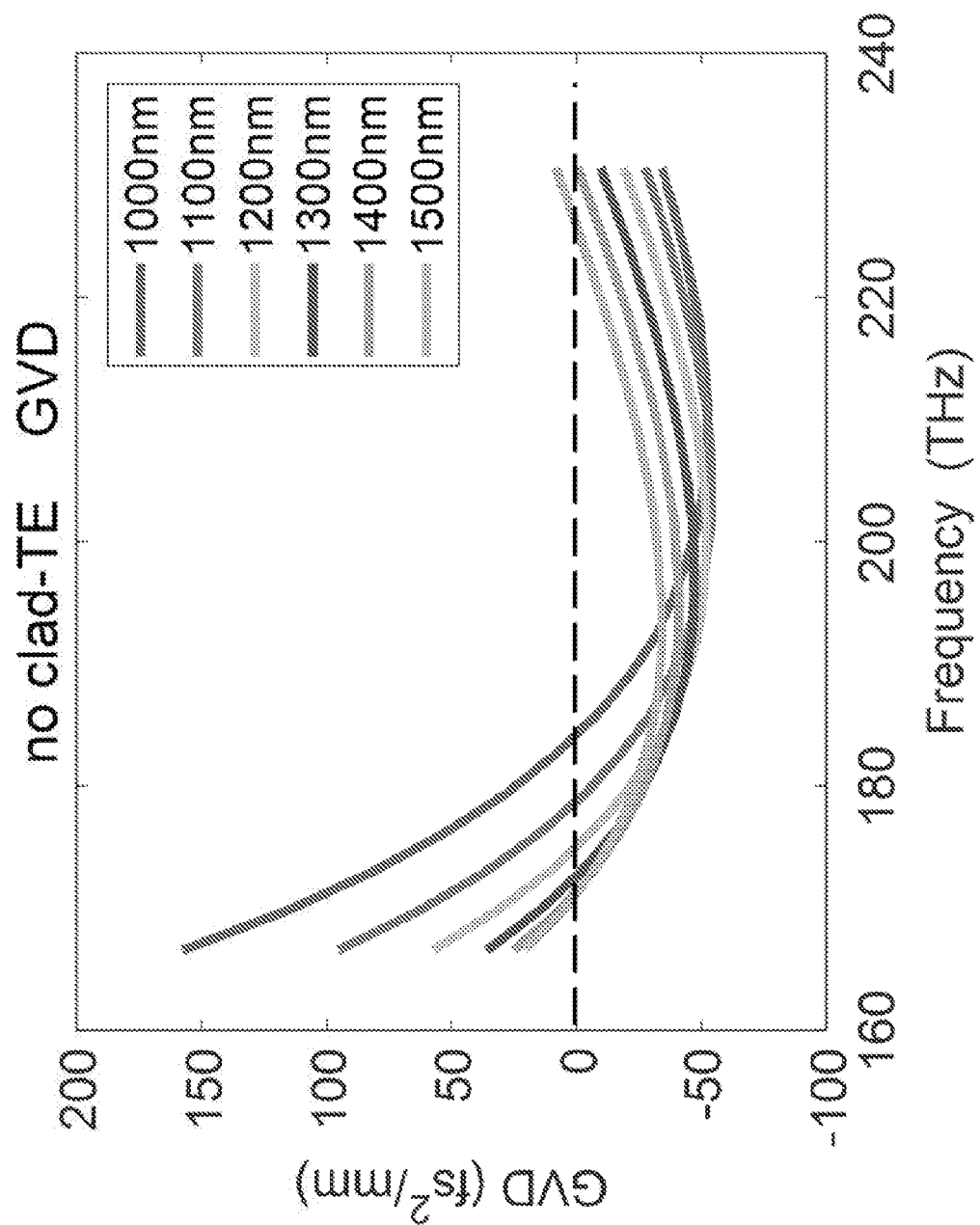
FIGS. 2A-C are plots of the group velocity dispersion (GVD) of an exemplary waveguide according to embodiments of the present disclosure.
Figure 2B:
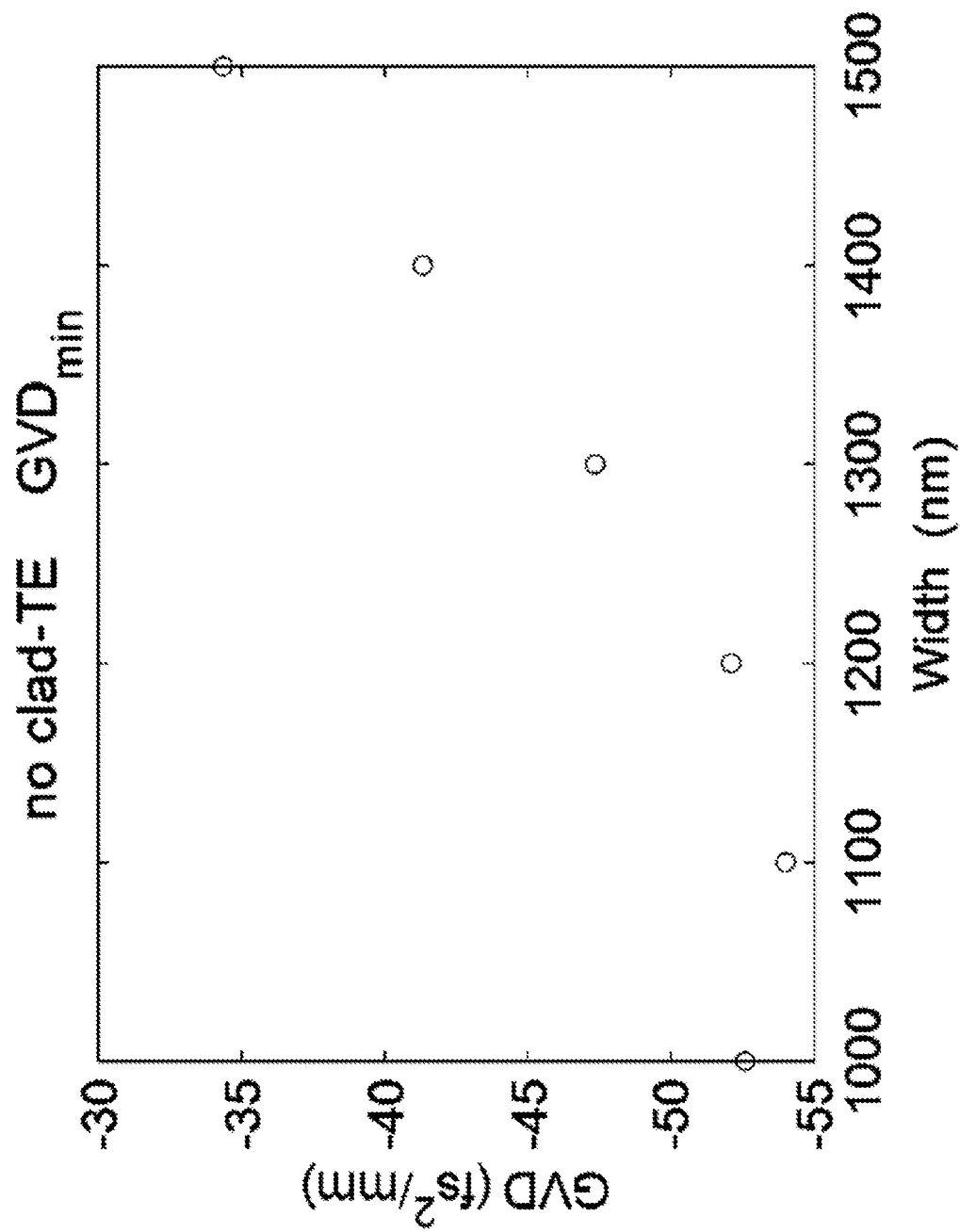
Figure 2C:
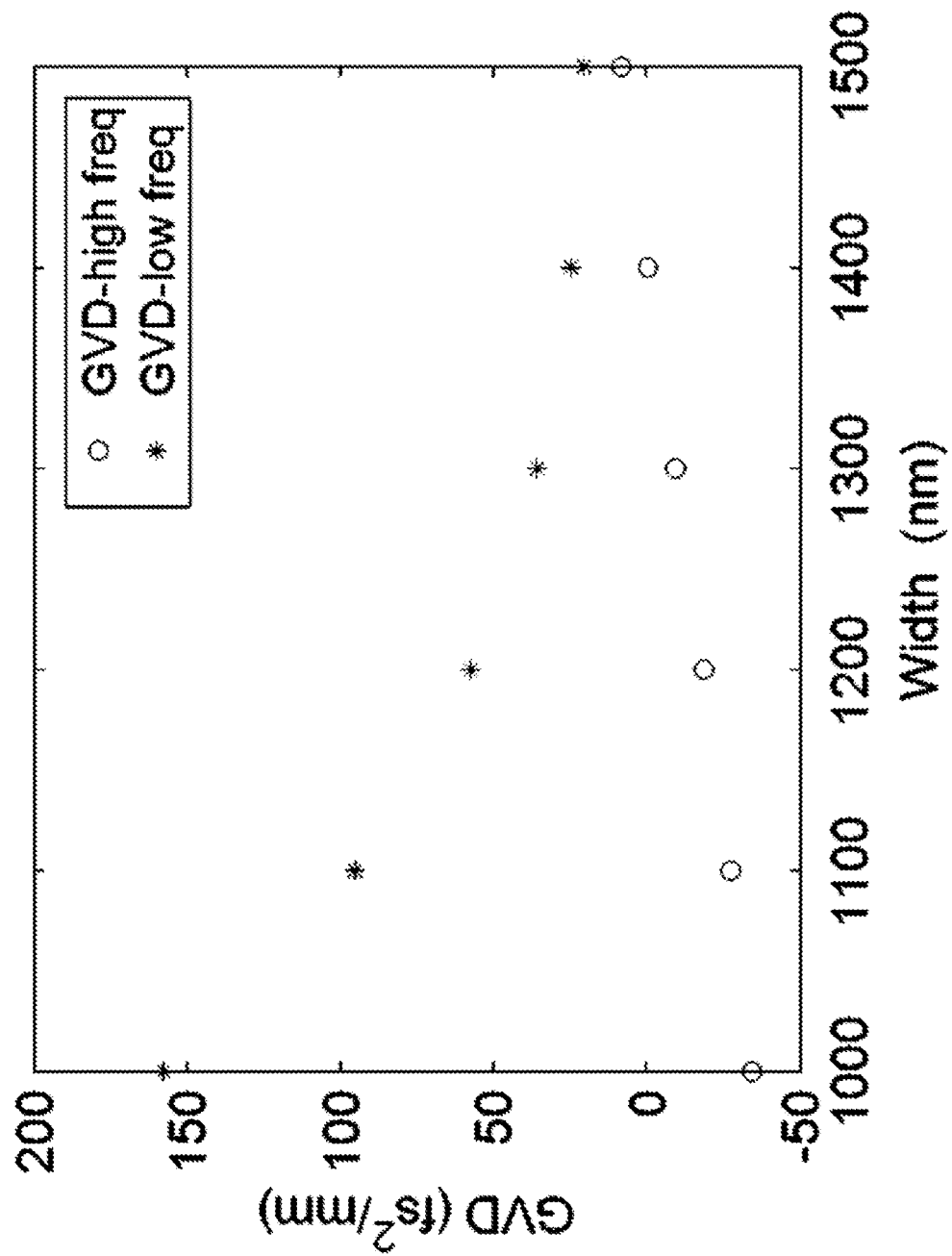

Referring to FIGS. 2A-C, the group velocity dispersion (GVD) of an exemplary waveguide without top cladding is plotted. FIG. 2A shows the GVD of an exemplary waveguide without top cladding for a transverse electric (TE) mode. The GVD is plotted for various waveguide top widths as a function of the input frequency, with each curve corresponding to a different waveguide width. The GVD is anomalous (negative) at certain frequencies to achieve a Kerr comb. The GVD can also be engineered to be negative when there is a cladding (e.g., $SiO_2$). Waveguides with anomalous dispersion can then be fabricated into microring resonators for Kerr comb generation. The principle allows for all optical wavelengths supported by the material. FIG. 2B shows the minimum GVD obtained in FIG. 2A for each of the widths at which the GVD was plotted in FIG. 2A. FIG. 2C shows the GVD for each of the widths at which the GVD was plotted in FIG. 2A at the highest and lowest frequencies measured in FIG. 2A.

A microresonator frequency comb is an excellent platform for broadband coherent light generation and precise frequency metrology. It provides a compact and inexpensive solution for a range of applications including optical clocks, pulse shaping, spectroscopy, and telecommunication. Using the Kerr $\chi^{(3)}$ nonlinearity (four wave mixing, FWM), an on-chip frequency comb can be generated in various material platforms and in a wide wavelength range from visible to mid-infrared. However, these materials typically have zero (Si, SiN, $SiO_2$, chalcogenides) or small (AlN) electro-optic response. As a result, the generated combs can only be controlled at low frequency (thermal) or high voltage (40 V).

The present disclosure provides for Kerr frequency comb generation in integrated lithium niobate (LN) microresonators that can be actively controlled at GHz frequency. LN on insulator platforms enable various on-chip photonic devices including microresonators with quality (Q) factors up to 10'. In various embodiments, a dispersion engineered microring resonator defined by dry etching is used, showing optical frequency comb generation in the telecom band spanning over 200 nm in wavelength.

Devices according to various embodiments comprise high-confinement LN microring resonators on top of thermal oxide substrate, fabricated using electron-beam lithography followed by an optimized dry etching process. The monolithic integration approach provides maximal freedom for waveguide dispersion engineering.

Figure 3A:
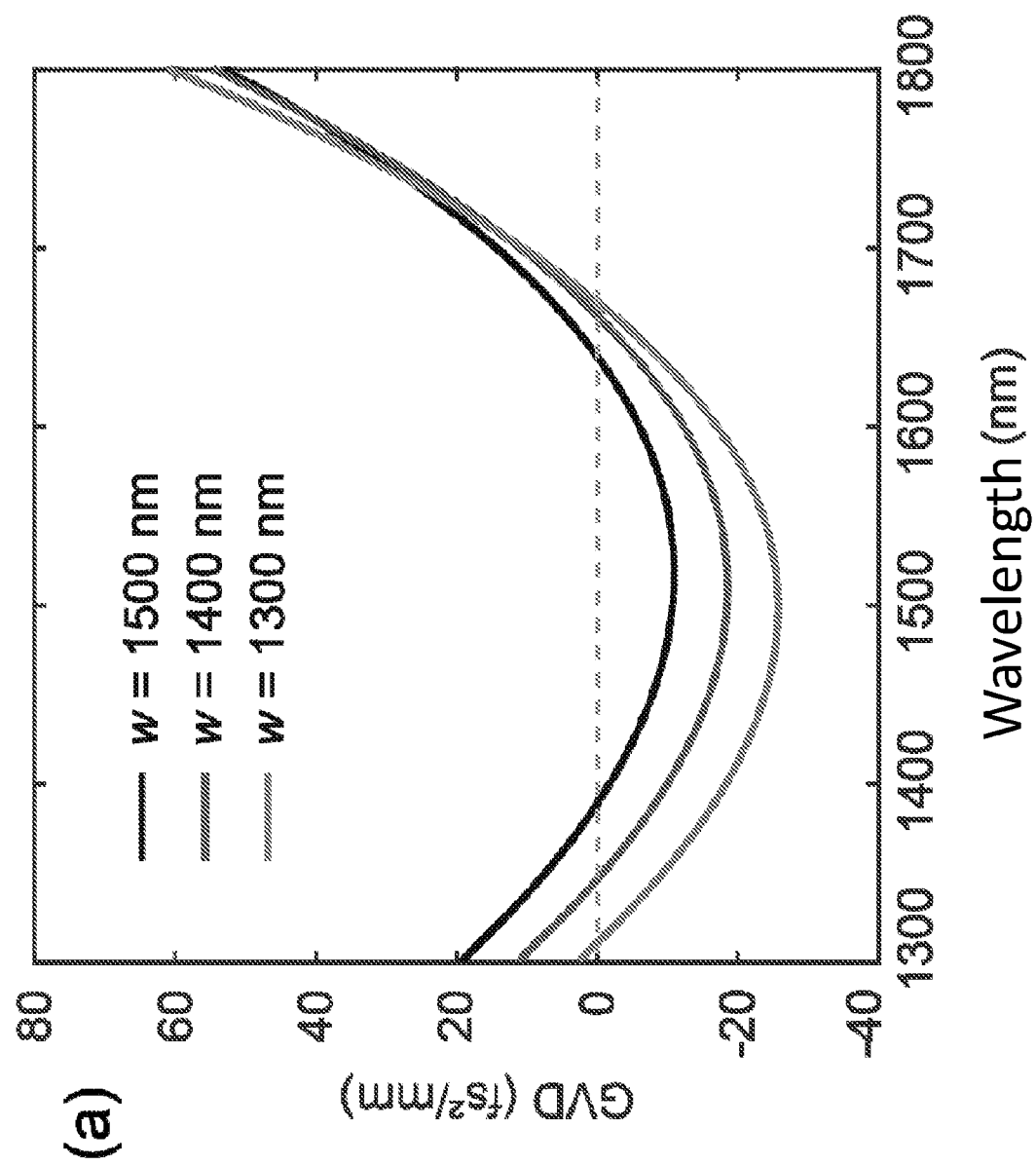
FIG. 3A is a plot of simulated group velocity dispersion (GVD) of an exemplary integrated LN waveguide with various top widths (w) according to embodiments of the present disclosure.
Figure 3B:
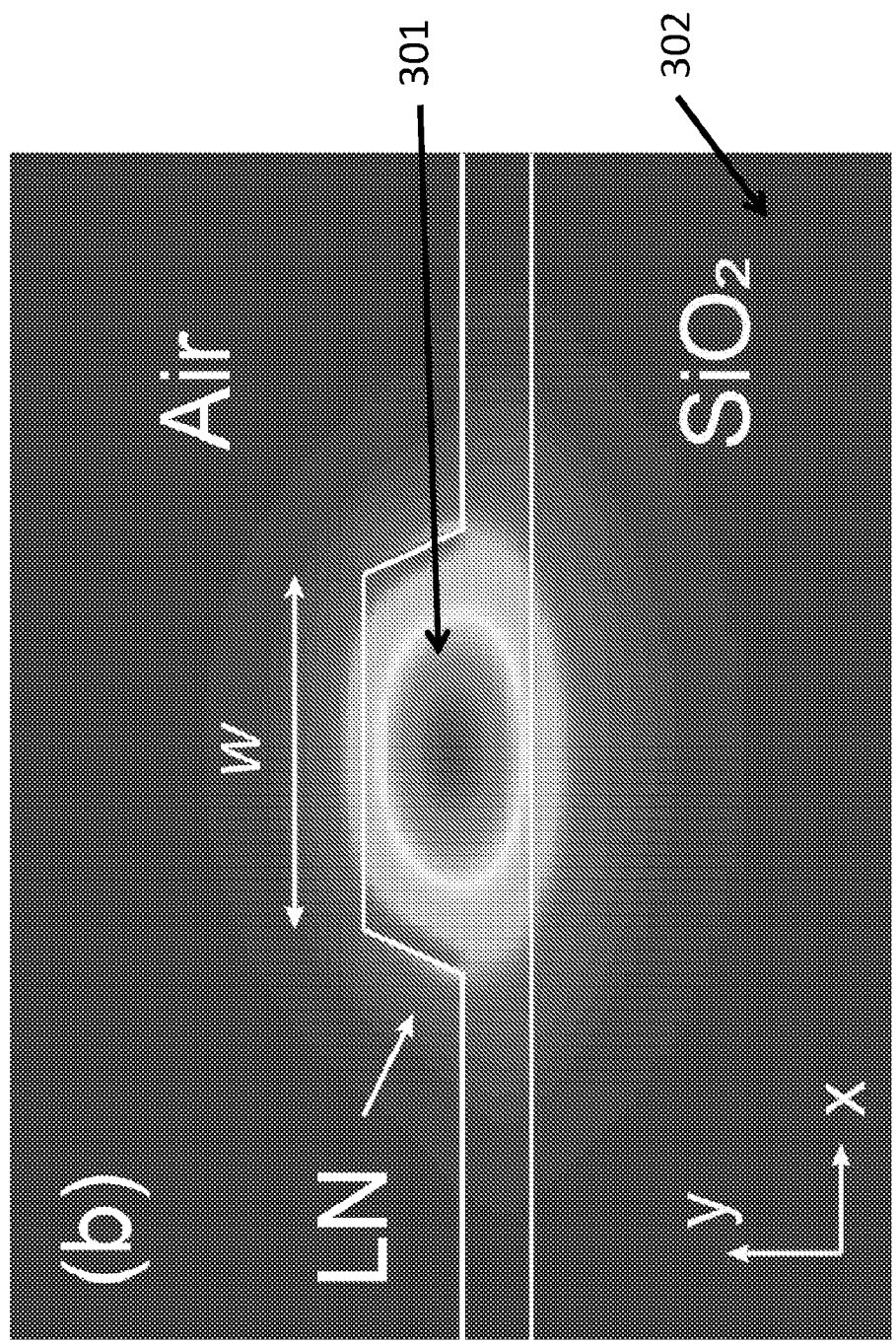
FIG. 3B is a waveguide cross-section showing simulated field profile ($E_x$) of the fundamental TE mode according to embodiments of the present disclosure.
Figure 3C:
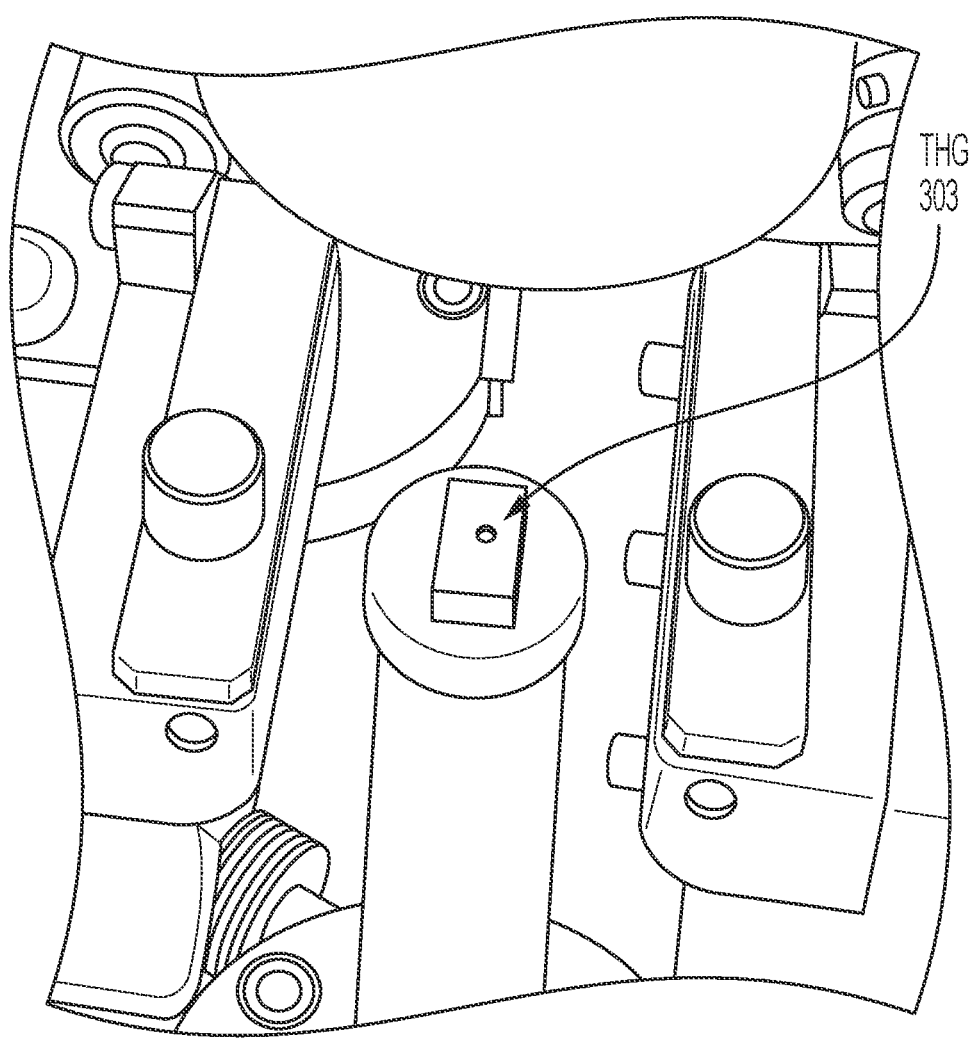
FIG. 3C is an image of an exemplary measurement setup according to embodiments of the present disclosure.

FIG. 3A shows the simulated group velocity dispersion (GVD) of integrated LN waveguides with various top widths (w). FIG. 3B shows simulated field profile ($E_x$) of the fundamental TE mode for a waveguide with w=1300 nm. The waveguide 301 is made of LN, with a $SiO_2$ substrate 302. FIG. 3C shows a camera image of an exemplary measurement setup. The bright green spot 303 in FIG. 3C shows third harmonic generation (THG) light scattered from the device at high pump power.

Figure 3D:
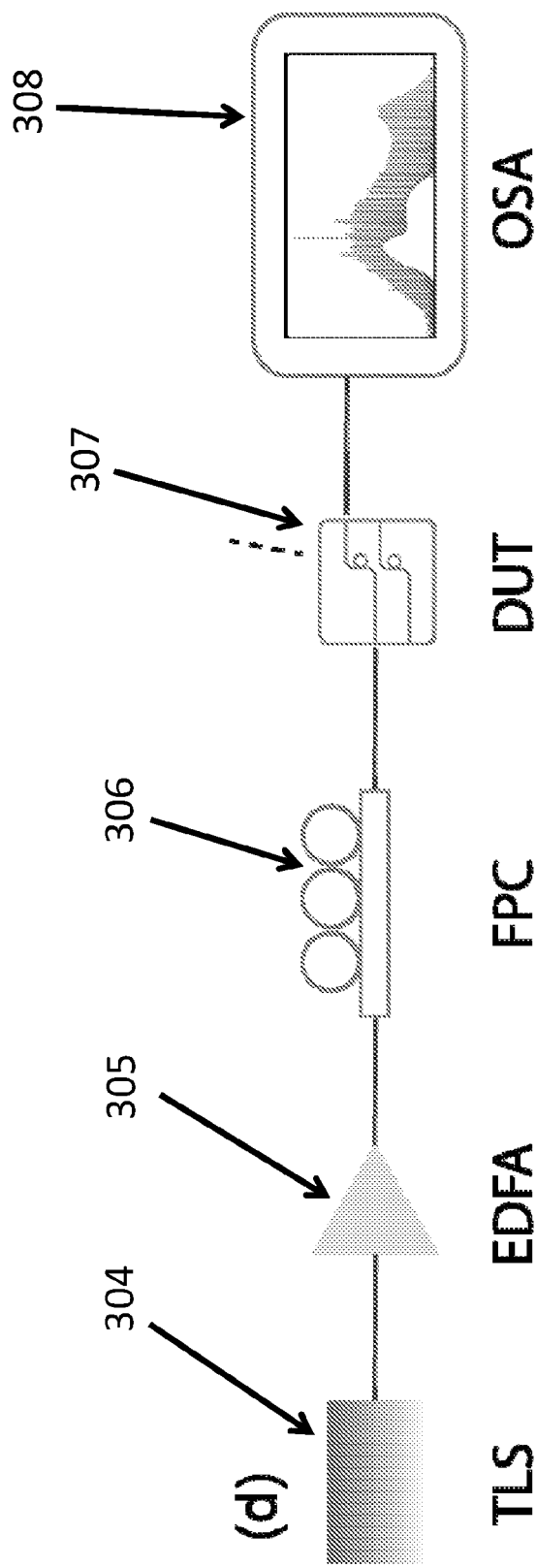
FIG. 3D is a schematic of an exemplary measurement setup according to embodiments of the present disclosure.

FIG. 3D shows a schematic of an exemplary measurement setup. Light passes from tunable laser source 304 to erbium doped fiber amplifier 305 to fiber polarization controller 306 to device under test 307 to optical spectrum analyzer 308. TLS stands for tunable laser source. EDFA stands for erbium doped fiber amplifier. FPC stands for fiber polarization controller. DUT stands for device under test. OSA stands for optical spectrum analyzer.

Figure 3E:
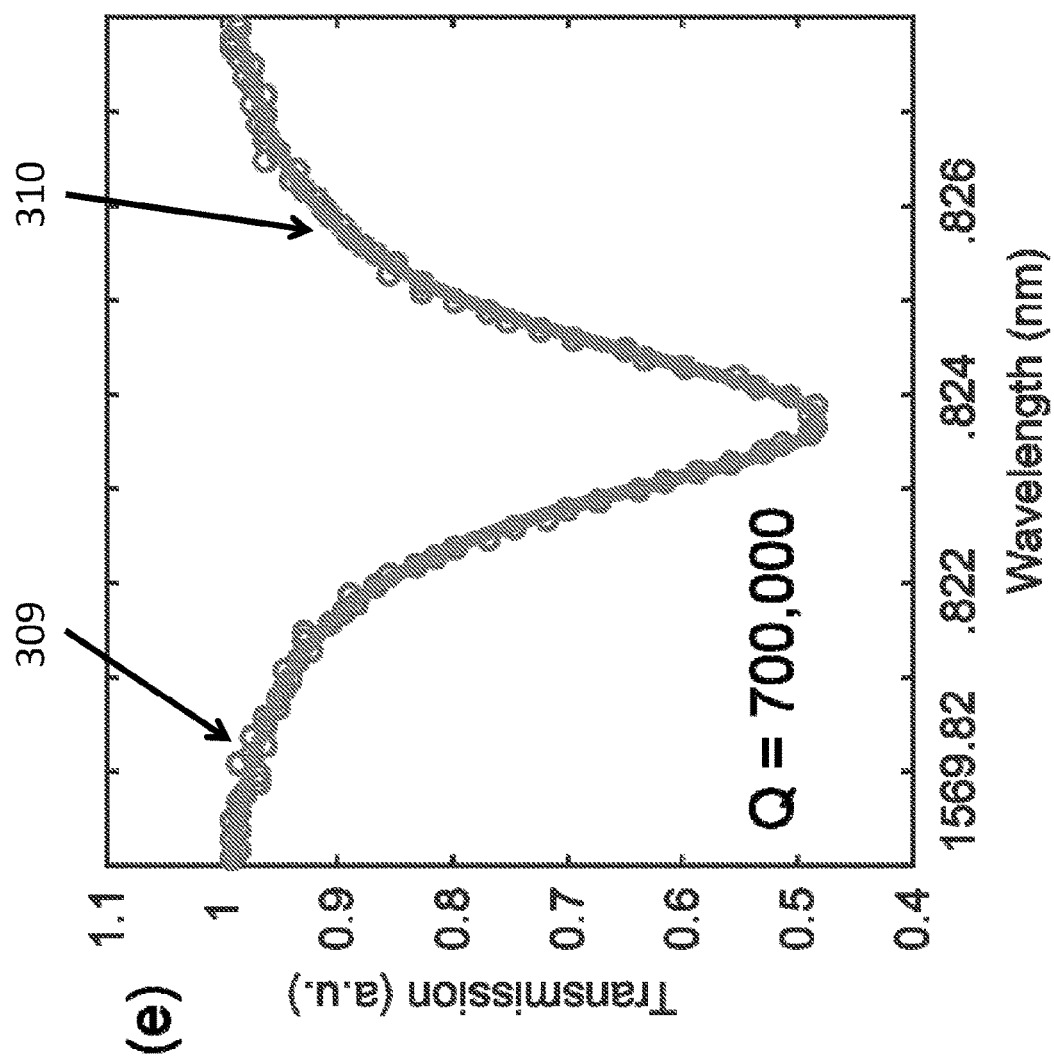
FIG. 3E is a plot showing the transmission spectrum and Lorentzian fit of the pump mode in an exemplary embodiment of the present disclosure.
Figure 3F:
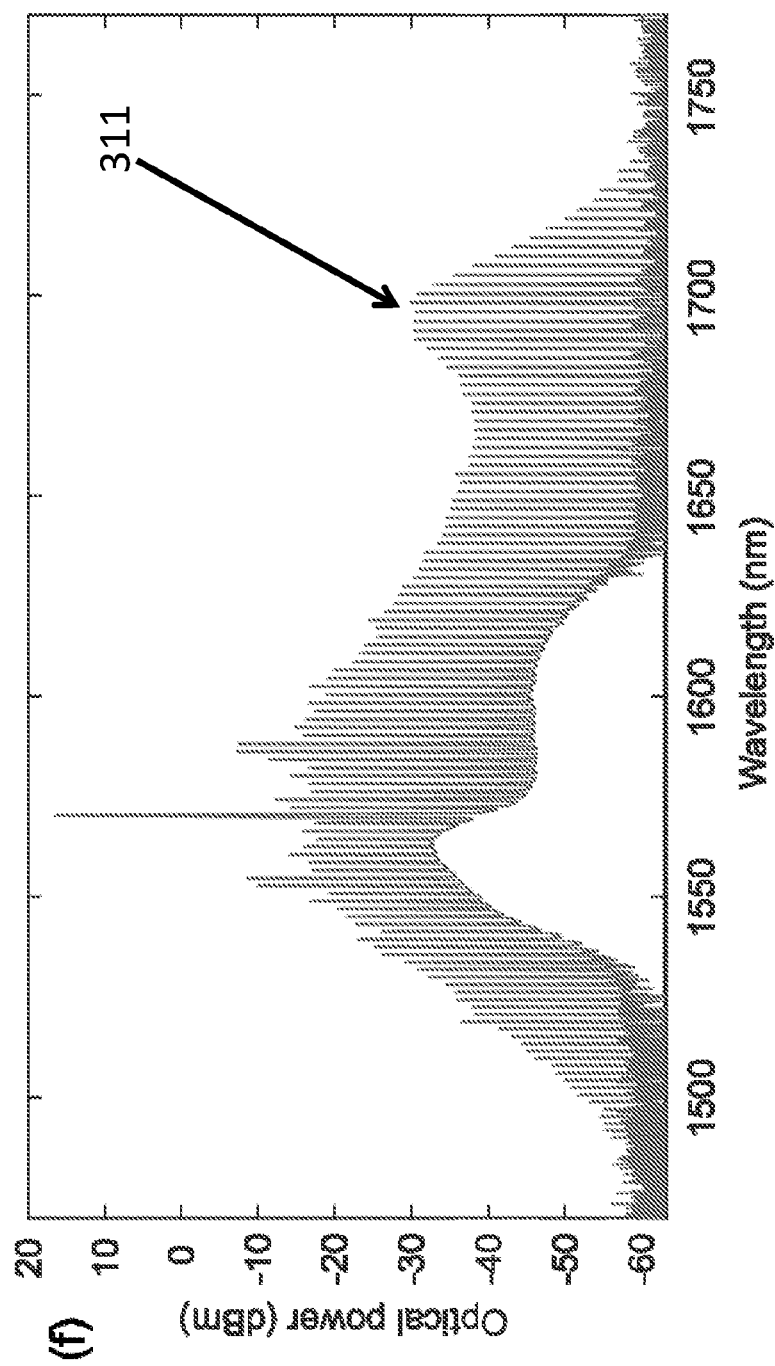
FIG. 3F is a plot of the optical spectrum of a typical frequency comb generated in the telecom wavelength range according to embodiments of the present disclosure.

FIG. 3E shows transmission spectrum 309 (shown as rings) and Lorentzian fit 310 (shown as a curve) of the pump mode at ~1570 nm, showing a loaded quality factor of 700,000. FIG. 3F shows the optical spectrum of a typical frequency comb generated in the telecom wavelength range, spanning a wavelength band>200 nm.

FIG. 3A shows the calculated group velocity dispersion (GVD) for the fundamental TE mode in X-cut LN waveguides with a 600 nm thick device layer and various waveguide widths w. Anomalous dispersion, which is used for frequency comb generation, can be achieved in the telecom wavelength range (FIG. 3A). FIG. 3B shows the corresponding mode profile ($E_x$ component) and device cross-section schematic for w=1300 nm, simulated using a Finite Difference Eigenmode (FDE) solver (Lumerical, Mode Solutions).

Exemplary devices are characterized using the setup shown in FIGS. 3C-D. In this example, pump light from a tunable telecom continuous-wave laser (Santec TSL-510) is amplified using an erbium doped fiber amplifier (EDFA, Amonics) and sent into the LN chip through a lensed fiber. Light polarization is controlled using an in-line fiber polarization controller after the EDFA. Transmitted light at the output end of the chip is collected using a second lensed fiber and monitored with either an InGaAs photodetector (for transmission spectrum measurement) or an optical spectrum analyzer (OSA, Yokogawa) (for comb spectrum measurement).

FIG. 3E shows the transmission spectrum of the pump mode near 1570 nm measured at low power level, showing a loaded Q factor of 700,000. The lowered Q factor is due to increased scattering loss in the air-cladded device. Nevertheless, this level of round-trip loss is sufficient to support the optical parametric oscillation (OPO) process at relatively low pump power.

FIG. 3F shows the generated comb spectrum at an on-chip pump power of 50 mW (17 dBm), with a repetition rate of ~250 GHz. At this power level, the photorefractive induced instability inside the resonator is quenched and the thermo-optic bistability dominates, making it possible to tune the pump laser into the cavity resonance with fine control. The frequency comb spans over 200 nm in wavelength, and the envelope follows a hyperbolic secant function, indicating that the generated comb is likely in a soliton state. In this example, the repetition rate is too high for a direct time-domain measurement, which could be done in a larger resonator with a smaller free spectral range. The comb power bump 311 at ~1700 nm in FIG. 3F likely originates from the phase-matched dispersive wave effect inside the resonator. Due to the high circulating power inside the ring resonator, second and third harmonic generation (SHG/THG) are observed simultaneously with the frequency comb generation. The green spot 303 in FIG. 3C shows the scattered THG light from the device in day light environment. The SHG light here is overwhelmed by THG due to the lower camera sensitivity at ~785 nm. Frequency combs at visible wavelengths are likely generated via the SHG/THG processes.

FIGS. 3A-F demonstrate frequency comb generation in a high Q (~700,000) integrated LN microresonator. The high-confinement monolithic LN platform allows engineering of waveguide dispersion and realize frequency combs covering>200 nm wavelength range at a relatively low pump power (~50 mW). The frequency combs demonstrated here can be combined with the excellent electro-optic and non-linear optical properties of LN, allowing for GHz active control of frequency combs and ultra-wide spanning frequency comb generation (from visible to near IR).

In various embodiments, a single-crystal LN film of sub-micron thickness is bonded on top of an $SiO_2$ substrate. By lithography and dry etching of the thin LN film, microresonators that have Q factors on the order of $10^6$ can be realized. In various embodiments, an x-cut LN thin film wafer is used to achieve anomalous dispersion in the telecom wavelength range for both the traverse electric (TE) and traverse magnetic (TM) polarizations. This can be achieved by carefully engineering the waveguide width and thickness.

In various embodiments, the dispersion engineered microresonator can have loaded and intrinsic Q factors of $6.6 \times 10^5$ and $1.1 \times 10^6$, respectively, for the TE polarizations, with an estimated OPO pump threshold of ~80 mW. In various embodiments, dispersion engineered microresonator can have loaded and intrinsic Q factors of $6.0 \times 10^5$ and $9.2 \times 10^5$, respectively, for the TM polarizations.

In various embodiments, the microring resonator used in the Kerr comb generator has a radius of 80 µm and a top width of 1.3 µm. In various embodiments, a broadband frequency comb is generated for both TE-like and TM-like polarization modes at a pump power of ~300 mW in an input bus waveguide, with a comb line spacing of ~2 nm (250 GHz). In various embodiments, the measured TM-polarized comb spectrum is ~300 nm wide, while the TE-polarized comb spans from 1400 nm to 2100 nm.

In various embodiments, soliton states may be achieved by using temporal scanning techniques that have been deployed in other material platforms.

In various embodiments, the LN microresonators can sustain high optical powers (~50 W of circulating power). Devices according to various embodiments exhibit quenching behavior at high pump powers (>100 mW in the waveguide), due to the photorefractive effect. This allows the thermal bistability effect to dominate, allowing stable positioning of the laser detuning with respect to cavity resonance. In various embodiments, optical damage is not observed even after many hours of optical pumping, despite the high circulating power inside the resonators.

Figure 16:
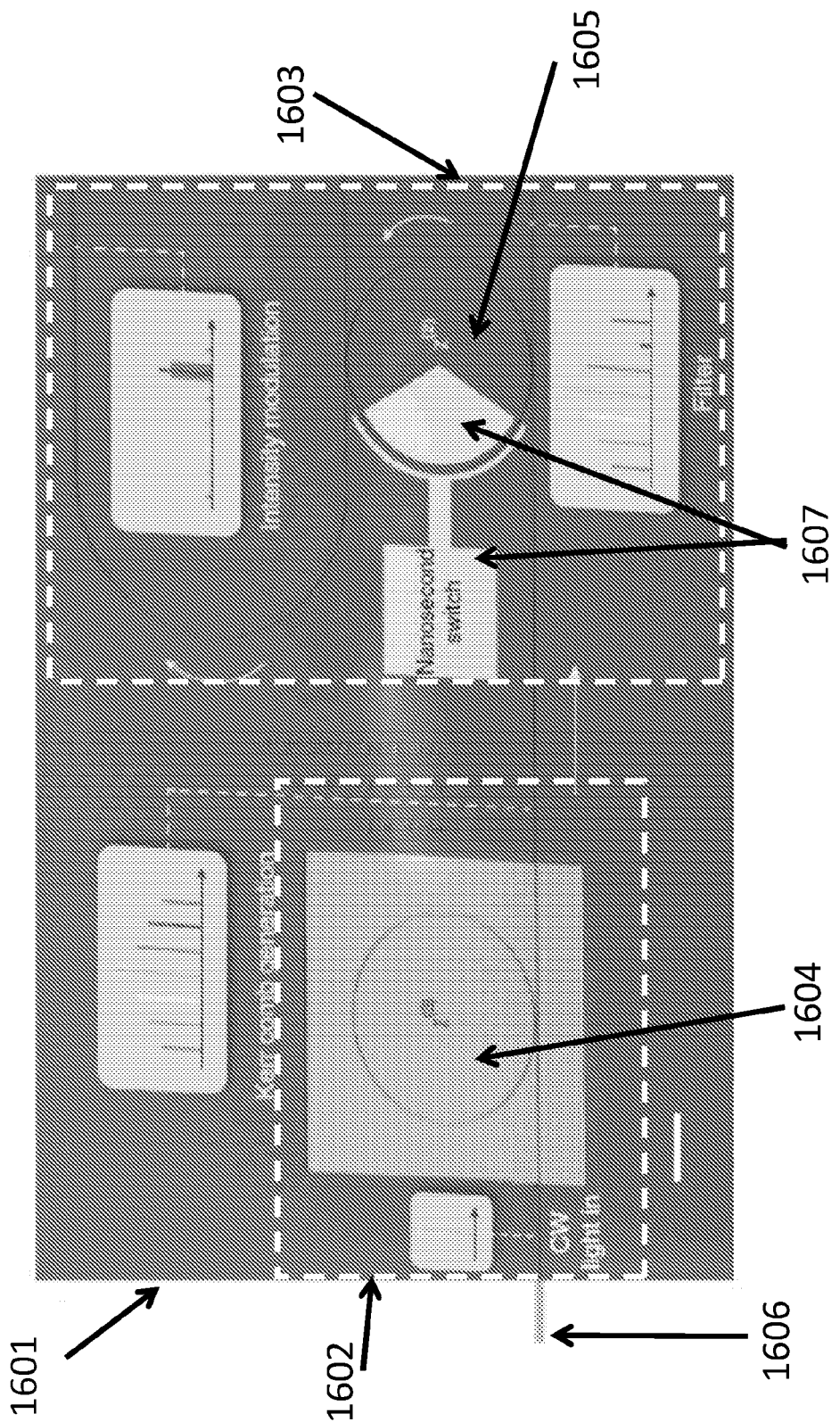
FIG. 16 is a schematic view of a photonic circuit according to embodiments of the present disclosure.

Referring to FIG. 16, a monolithic integrated photonic circuit according to embodiments of the present disclosure is shown. False-color scanning electron microscope (SEM) image 1601 shows a fabricated lithium niobate nanophotonic circuit comprising a microresonator frequency comb generator 1602 and an electro-optically tunable add-drop filter 1603, at a scale of 50 µm. Comb generator 1602 is air cladded to achieve anomalous dispersion, whereas the rest of the chip is cladded in $SiO_2$. Continuous wave pump light 1606 first passes through dispersion engineered microring resonator 1604 to generate a frequency comb. The generated frequency comb is then filtered by add-drop microring resonator 1605. At the drop port of the filter, a single target comb line is selected by applying an external bias voltage on the integrated electrodes 1607 to align the filter passband with the comb line. The selected comb line can be modulated at high speeds via the $\chi^{(2)}$ effect. The high $\chi^{(3)}$ nonlinearity of microresonator 1604 allows for the generation of Kerr frequency combs, while the high $\chi^{(2)}$ nonlinearity of microresonator 1605 allows for the comb generated from comb generator 1602 to be manipulated by an externally applied electric field.

Electrically tunable add-drop filter 1603 is integrated with comb generator 1602 on the same chip 1601. In various embodiments, add-drop filter 1603 comprises an LN microring resonator with a free spectral range (FSR) designed to be ~1% larger than comb generator 1602. This slightly detuned FSR utilizes the Vernier effect to allow for the selection of a single optical spectral line over a wide optical band. Filter ring 1605 is over-coupled to both the add and the drop bus waveguides with the same coupling strength, to ensure a high extinction ratio (on/off ratio). When the input light is on (off) resonance with the filter, the majority of the optical power at the wavelength of interest will be transmitted to the drop (through) port of the filter. Microring filter 1605 is integrated with metal electrodes 1607 positioned closely to the ring. This allows for fast and efficient tuning of the filter frequency, as well as amplitude modulation of the dropped light, via the electro-optic effect. In order to access the maximum electro-optic coefficient ($r_{33}$), the two resonators 1604 and 1605 both operate in TE modes. Comb ring 1604 and filter ring 1605 are cladded with air and $SiO_2$, respectively, to ensure that both devices operate in their best configurations.

Numerical simulation shows that, for a device layer thickness of 600 nm, air cladding is necessary for anomalous dispersions. For the filter ring, however, a $SiO_2$ cladding gives rise to a better electro-optic tuning efficiency. Therefore, in various embodiments, the $SiO_2$ cladding in the comb generator area is removed, while the rest of the chip, including the filter ring, is cladded.

In various embodiments, devices are fabricated from a commercial x-cut LN-on-insulator (LNOI) wafer (NANOLN) with a 600-nm device layer thickness. Electron-beam lithography (EBL, 125 keV) is used to define the patterns of optical waveguides and microring resonators in hydrogen silsesquioxane resist (FOX®-16 by Dow Corning) with a thickness of 600 nm. The resist patterns are subsequently transferred to the LN film using Ar+-based reactive ion etching, with a bias power of ~112 W, an etching rate of ~30 nm min-1, and a selectivity of ~1:1. The etching depth is 350 nm, with a 250-nm LN slab unetched. The coupling bus waveguide has a width of ~800 nm, and the coupling gap is ~800 nm. A 1.5-µm-thick PMMA EBL resist is spun coated and exposed using a second EBL with alignment, to produce the microelectrodes of the filter ring via a lift-off process. The structures are then cladded with an 800-nm-thick $SiO_2$ layer using plasma-enhanced chemical vapor deposition (PECVD). The oxide cladding in the comb generation areas is then removed through a photolithography step followed by hydrofluoric acid (HF) wet etching to realize air-cladded devices with the required anomalous dispersions. Finally, the chip edges are diced and polished to improve the fiber-chip coupling.

Figure 17:
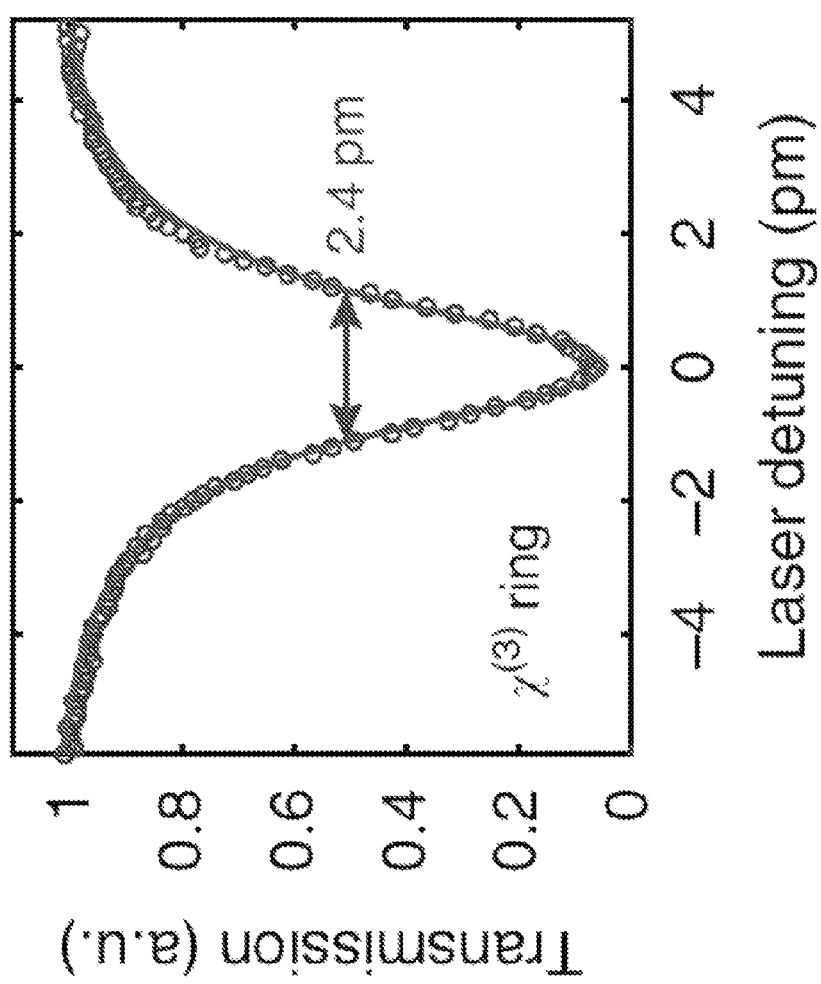
FIG. 17 is a plot of the optical transmission spectrum of a microring resonator according to embodiments of the present disclosure.

Referring to FIG. 17, a plot of the optical transmission spectrum of a microring resonator according to embodiments of the present disclosure is shown. FIG. 17 shows the transmission of the microring resonator 1904 as a function of laser detuning, with loaded and intrinsic Q factors of $6.6 \times 10^5$ and $1.1 \times 10^6$, respectively, for the TE polarization.

Figure 18:
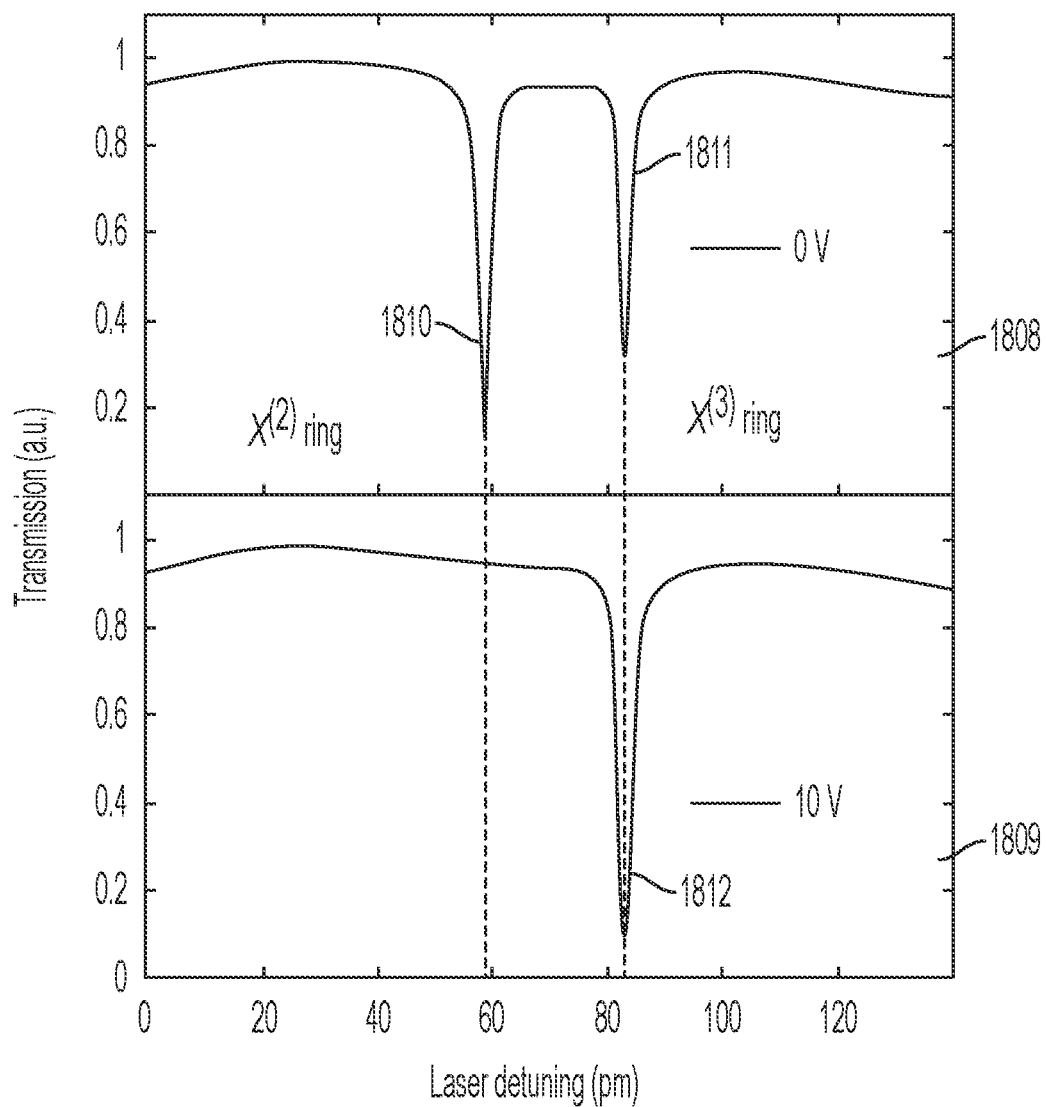
FIG. 18 is a plot of the transmission spectra of a comb generator according to embodiments of the present disclosure.

Referring to FIG. 18, a plot of the transmission spectra of a comb generator according to embodiments of the present disclosure is shown. Top half 1808 and bottom half 1809 of the plot show the transmission spectra at the through port with an applied DC bias voltage of 0 V and 10 V, respectively, and a target comb line at 1616 nm. A zero bias, the comb resonance 1811 has a 24-pm mismatch with the filter resonance 1810. Applying a bias voltage of 10 V can align the two resonances at 1812, with a measured electrical tuning efficiency of 2.4 pm V'.

Figure 19:
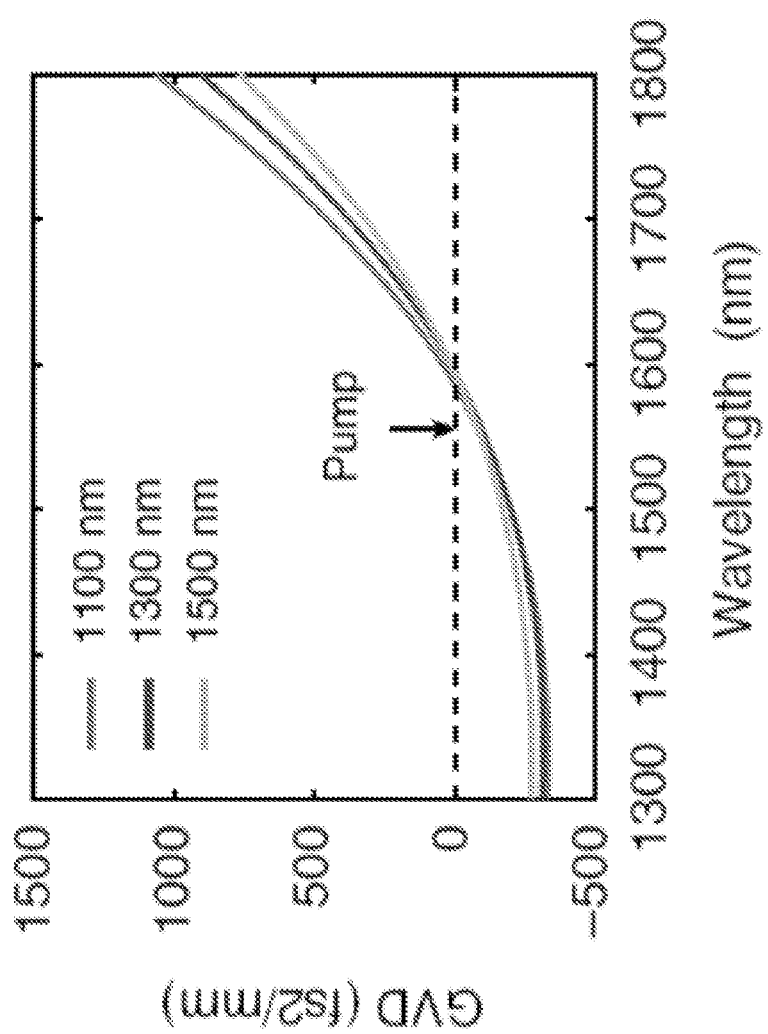
FIG. 19 is a plot of the numerically simulated group-velocity dispersions (GVD) for lithium niobate waveguides according to embodiments of the present disclosure.
Figure 20A:
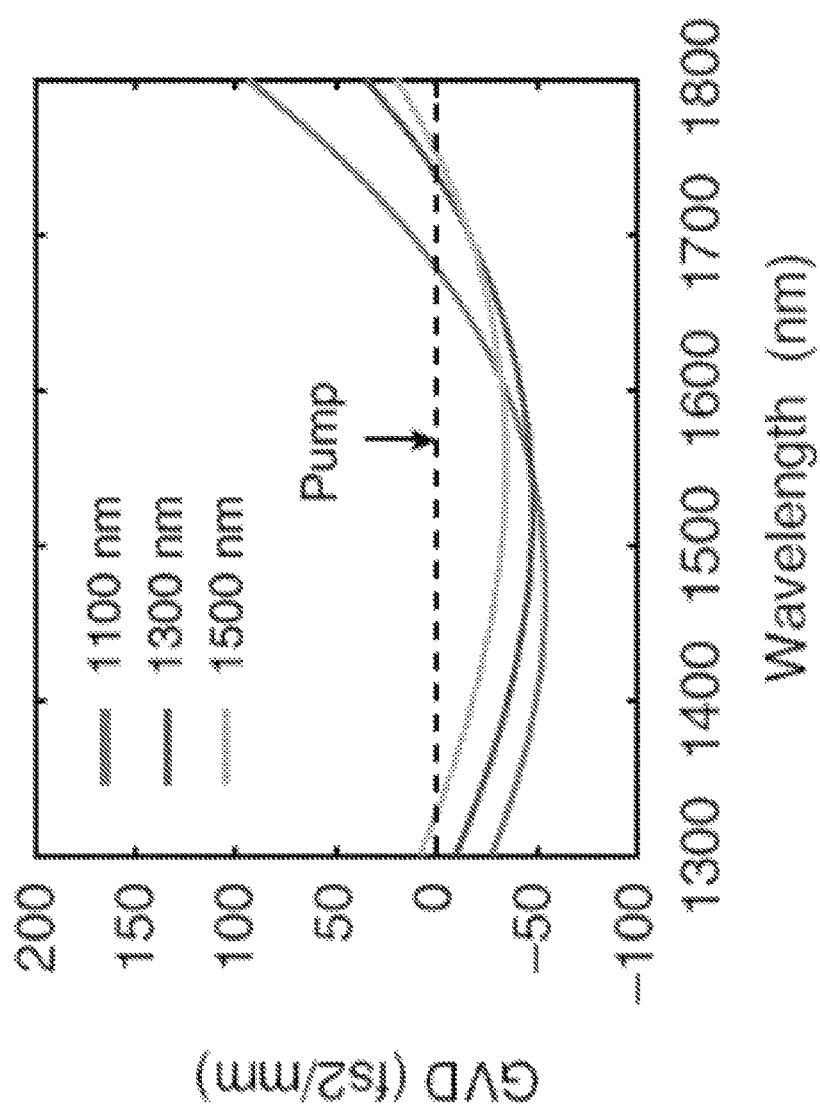
FIG. 20A is a plot of the numerically simulated group-velocity dispersions (GVD) for lithium niobate waveguides according to embodiments of the present disclosure.

Referring to FIGS. 19 and 20A, plots of the numerically simulated group-velocity dispersions (GVD) for LN waveguides according to embodiments of the present disclosure are shown. The GVD is shown at telecom wavelengths for LN waveguides, with the different curves corresponding to different top widths of the waveguides. Anomalous dispersion (GVD<0) can be achieved for both TM and TE modes, represented by FIG. 19 and FIG. 20A, respectively, based on the waveguide width and thickness. The waveguide dispersion diagrams and mode profiles in these examples are numerically calculated using a Finite Difference Eigenmode (FDE) solver.

Figure 20B:
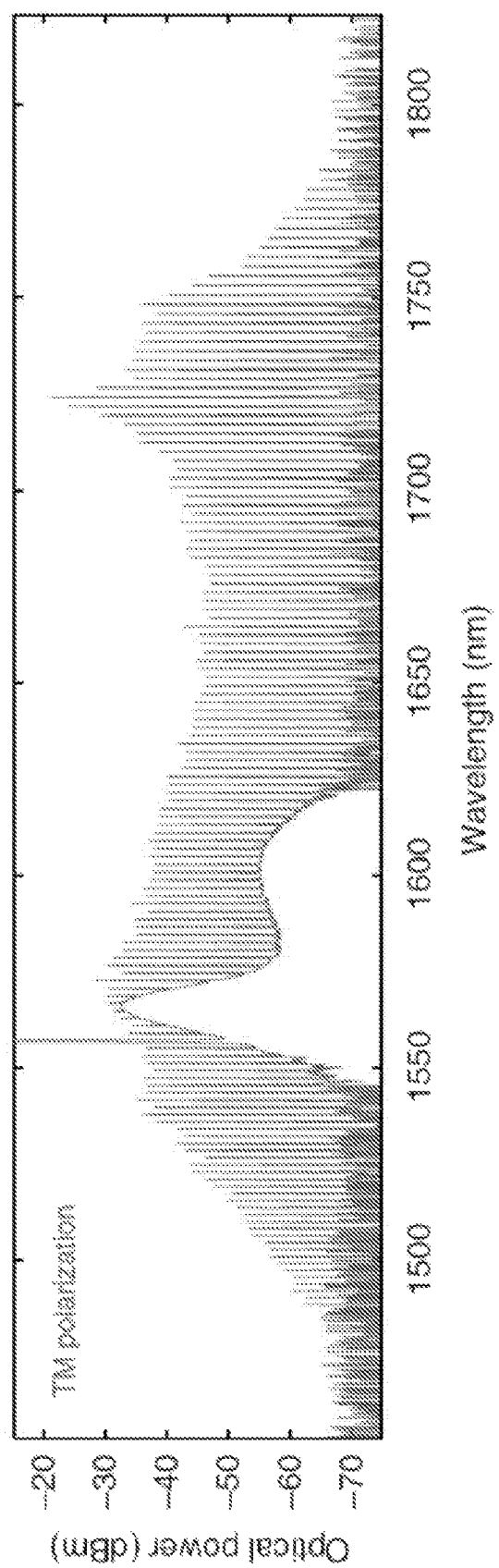
FIGS. 20B-C are plots of generated frequency comb spectra according to embodiments of the present disclosure.
Figure 20C:
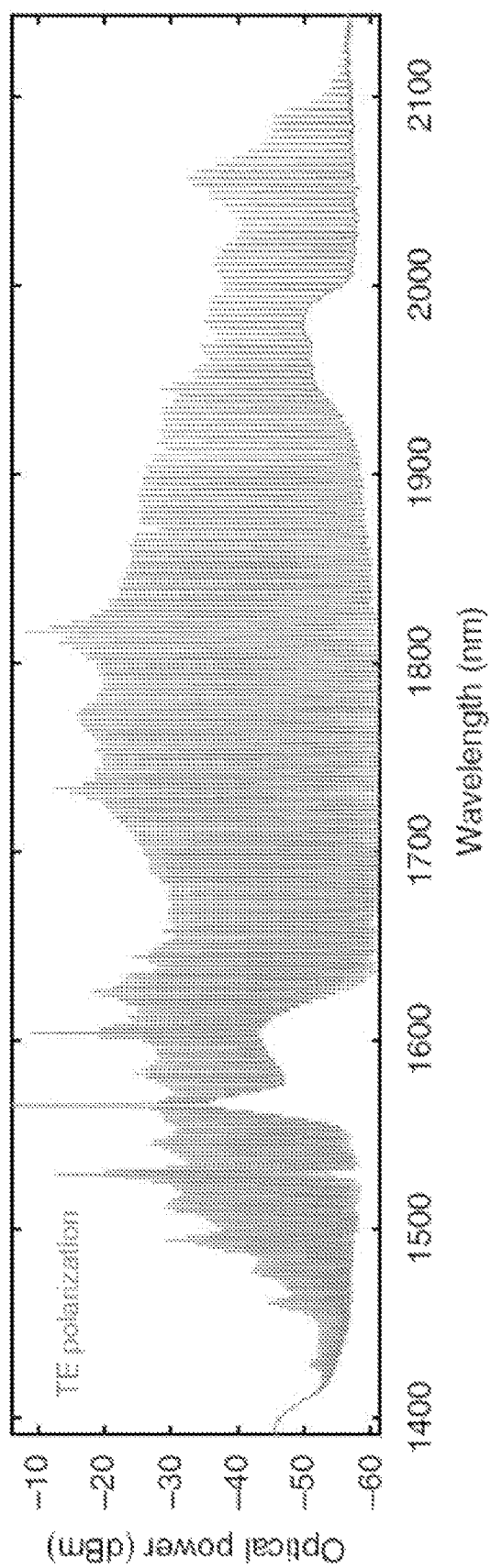

Referring to FIGS. 20B-C, plots of the generated frequency comb spectra according to embodiments of the present disclosure are shown. FIG. 20B and FIG. 20C show the generated frequency comb spectra for TM and TE modes, respectively, when the input laser is tuned into resonance with the respective modes at a pump power of ~300 mW in the bus waveguide. The generated combs have a line spacing of ~250 GHz (~2 nm), and span~300 nm and ~700 nm for the TM and TE modes, respectively. The envelopes of the comb spectra in FIGS. 20B-C indicate that the generated combs are not in a soliton state, that is, are modulation instability frequency combs.

Figure 21A:
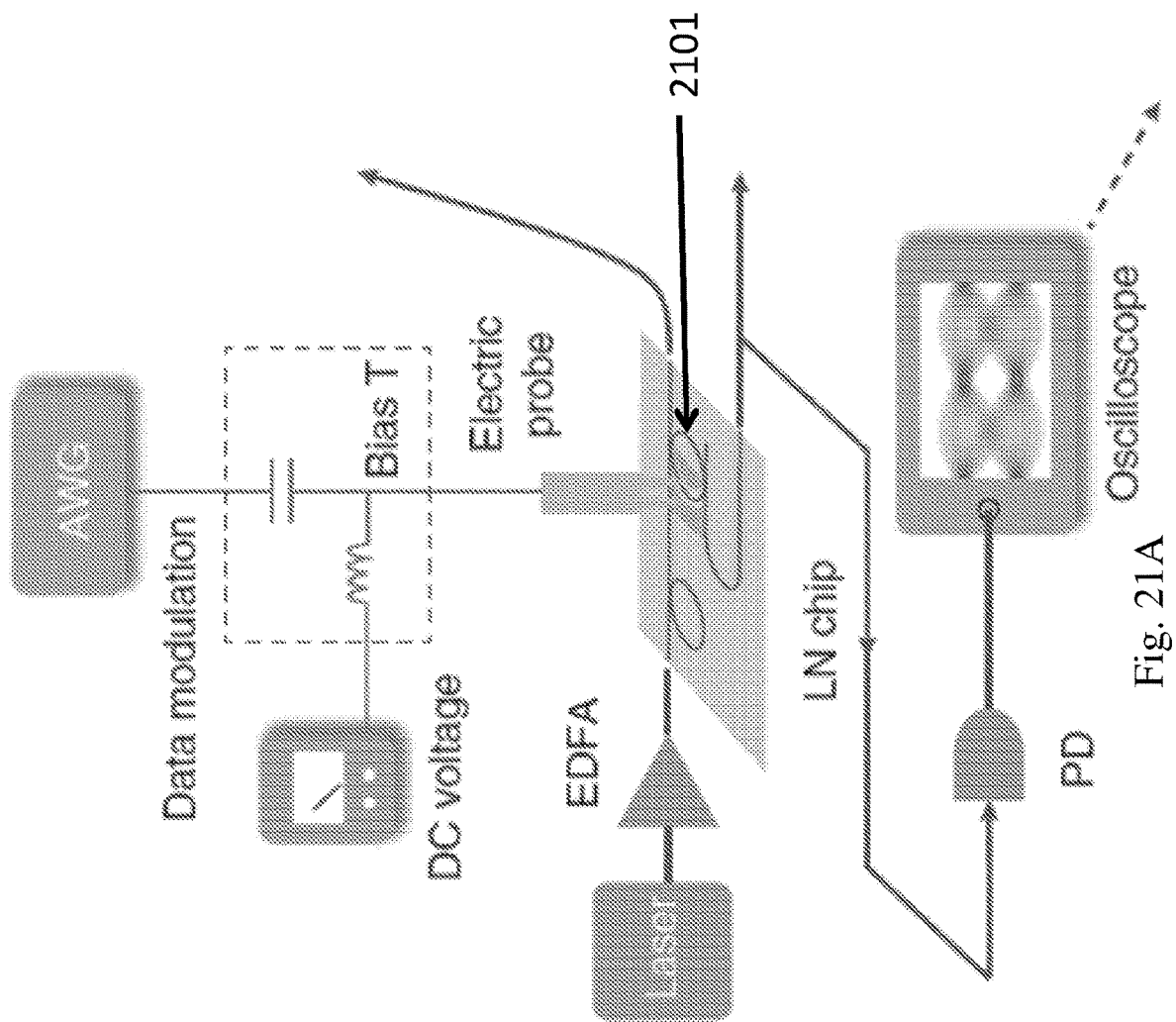
FIG. 21A is a schematic view of an exemplary comb generator and measurement setup according to embodiments of the present disclosure.

Referring to FIG. 21A, a schematic view of an exemplary comb generator and measurement setup according to embodiments of the present disclosure is shown. In the figure, AWG stands for arbitrary waveguide generator, EDFA stands for erbium-doped fiber amplifier, and PD stands for photodetector. The selected target comb line at the drop port of filter 2101 can be modulated at high speeds. An arbitrary waveform generator (AWG) is used to deliver random-binary voltage sequences to the electrodes of the filter ring, in addition to the DC bias voltage.

Figure 21B:
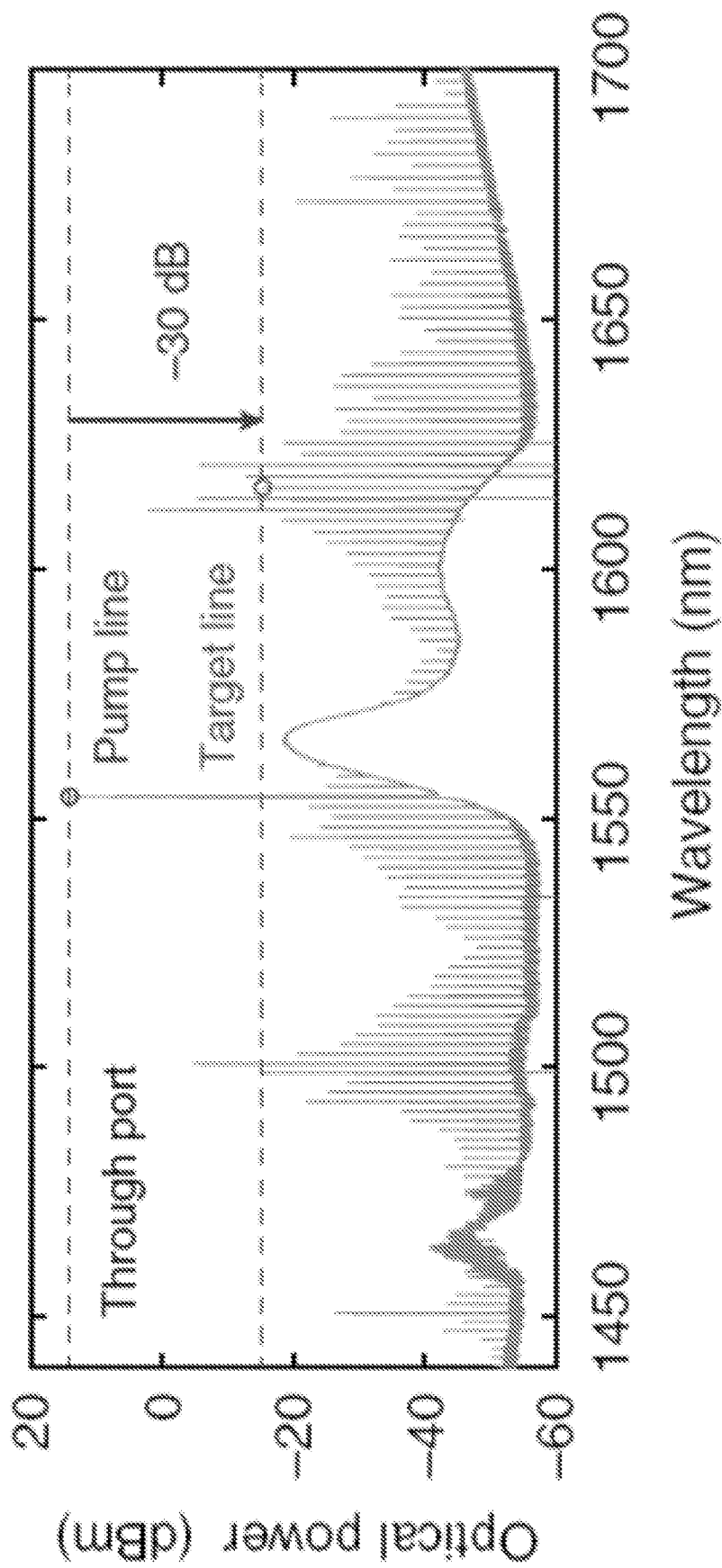
FIGS. 21B-D are plots of the measured optical spectra at points along a filter according to embodiments of the present disclosure.
Figure 21C:
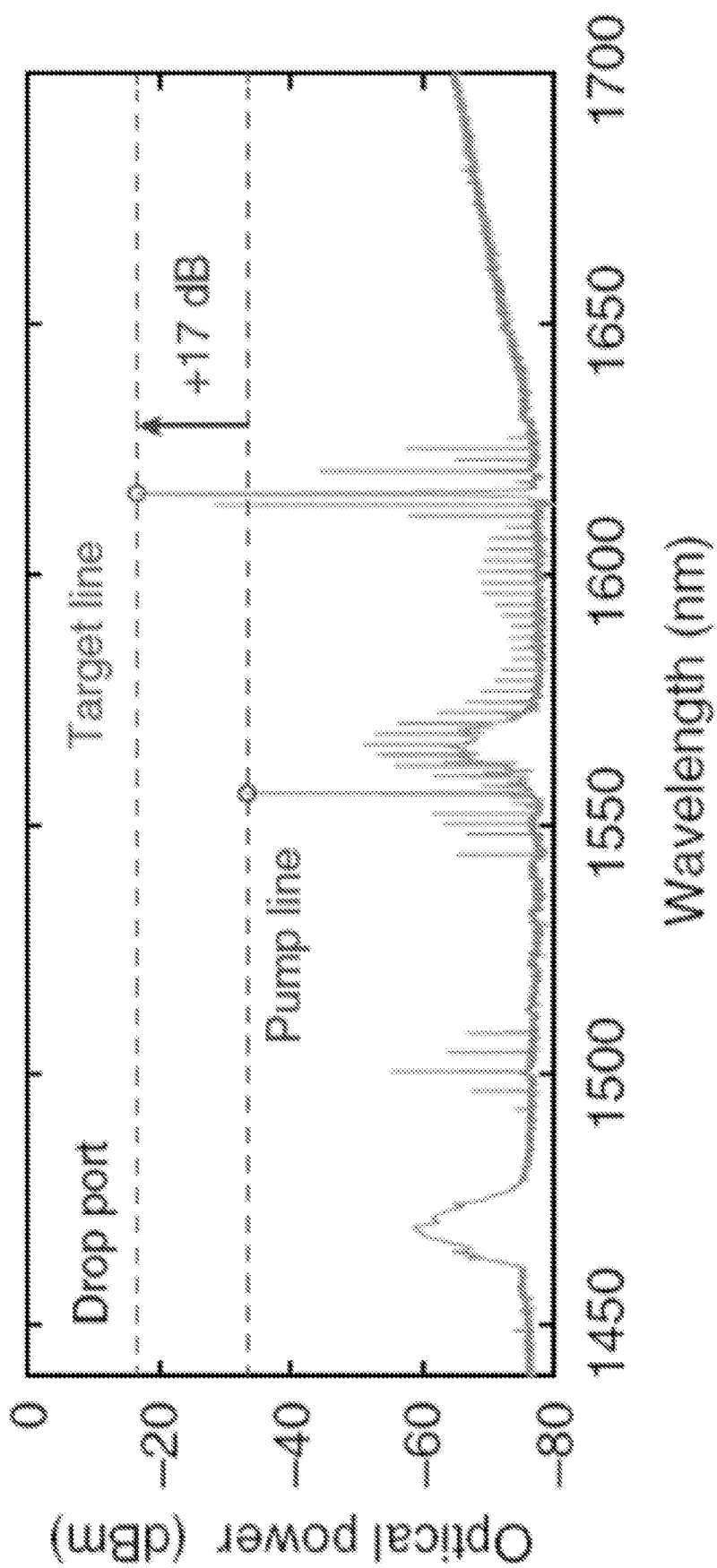

Referring to FIGS. 21B-C, plots of the measured optical spectra at points along a filter according to embodiments of the present disclosure are shown. FIG. 21B and FIG. 21C correspond to the measured optical spectra at the through and drop ports of filter 2101, respectively, with a picked out target comb line at 1616 nm. A DC bias voltage is applied to align the filter frequency with a target comb line at 1616 nm. A pump frequency at ~1556 nm exhibits a 730 pm mismatch with the filter resonance, resulting in an experimentally measured 47 dB rejection of the pump power in the drop port. The filter also exhibits a ~20 dB extinction for the comb lines adjacent to the target line.

Figure 21D:
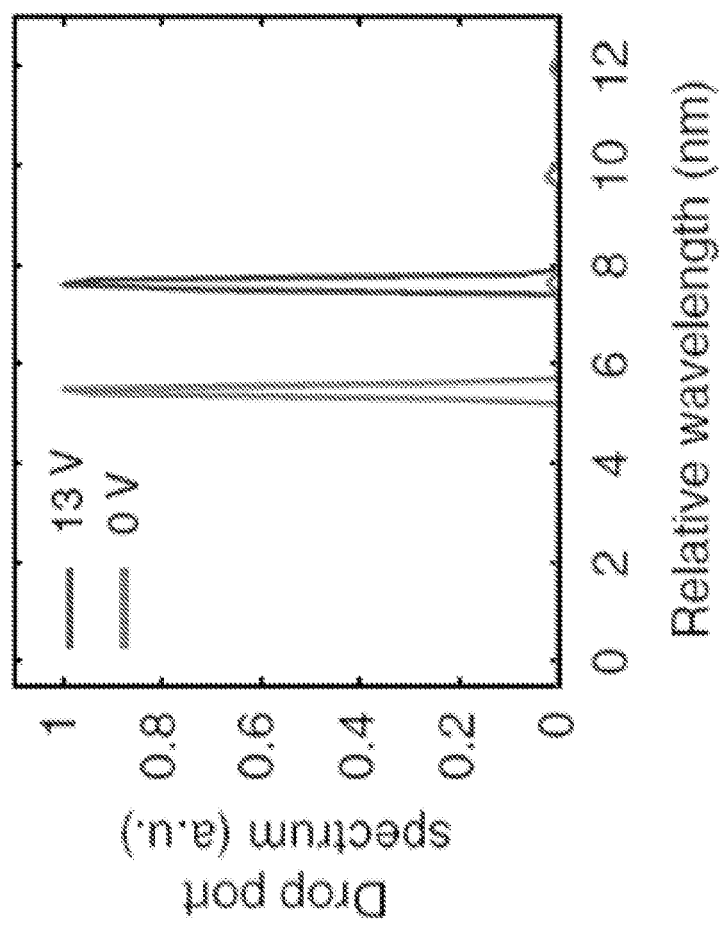

Referring to FIG. 21D, a plot of the measured optical spectra at points along a filter according to embodiments of the present disclosure is shown. Different comb lines can be selected by applying different bias voltages to filter 2101. FIG. 21D shows a zoomed in view of the drop port output spectra of the filter for DC bias voltages of 0 V (left peak) and 13 V (right peak). Applying a bias voltage of 13 V shifts the target from one comb line to the next one.

Figure 21E:
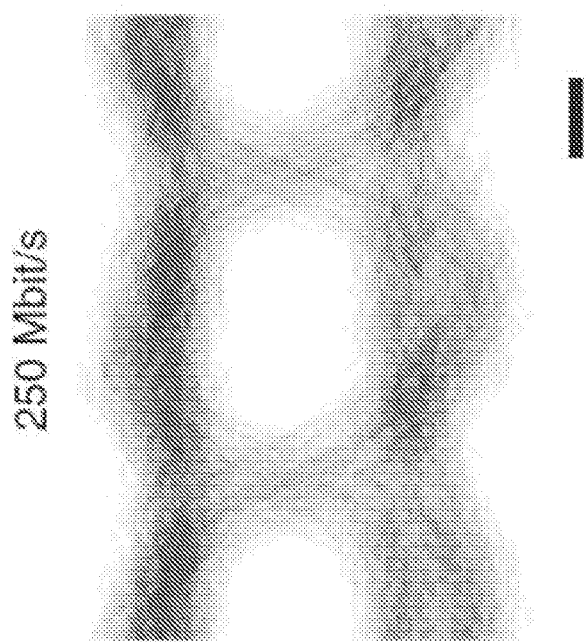
FIGS. 21E-F are eye diagrams of the output of a filter according to embodiments of the present disclosure.
Figure 21F:
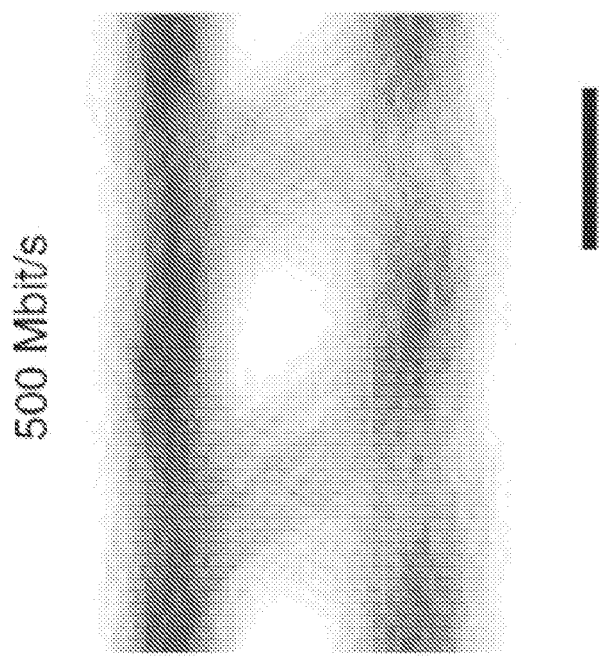

Referring to FIGS. 21E-F, eye diagrams of the output of the filter according to embodiments of the present disclosure are shown. An arbitrary waveform generator (AWG) is used to deliver random-binary voltage sequences to the electrodes of the filter ring, and the real time output optical power is monitored, resulting in the eye diagrams of FIG. 21E and FIG. 21F, corresponding to data rates of 250 Mbit/s and 500 Mbit/s, respectively. The peak to peak modulation voltage is 1.5 V, which is sufficient to tune the filter passband (~3 pm wide) away from the target comb line. The scale bars in FIGS. 21E-F correspond to a scale of 1 ns. In various embodiments, the modulation speed can be improved to beyond 100 Gbit/s by integrating a Mach-Zehnder modulator after the tuneable microring filter.

In various embodiments, frequency comb characterization is achieved with a continuous-wave (CW) light from a tuneable telecom laser (Santec TSL-510), amplified using an erbium-doped fiber amplifier (EDFA, Amonics). A 3-paddle fiber polarization controller is used to control the polarization of input light. Tapered lensed fibers are used to couple light into and out from the waveguide facets of the LN chip. The output light is sent into an optical spectrum analyzer (OSA, Yokogawa) for analysis. For filter control and manipulation, TE polarized modes are used to exploit the highest electro-optic tuning efficiency. DC signals from a voltage supply (Keithley) and AC signals from an arbitrary waveform generator (AWG, Tektronix 70001A) are combined using a bias T, before being sent to the filter electrodes using a high-speed ground-signal (GS) probe (GGB Industries). The output optical signal from the drop port is sent to a 12-GHz photodetector (Newport 1544A), and analyzed using a 1-GHz real-time oscilloscope (Tektronix).

In various embodiments, electro-optic modulation can be embedded in the comb generator, leading to active mode locking of a Kerr frequency comb. In various embodiments, the frequency comb source can be integrated with a multiplexer/demultiplexer and ultrafast electro-optic modulators on the same chip to provide compact and low-cost dense-wavelength division multiplexing (DWDM). This may be applied in ultra-broadband optical fiber communication networks. Furthermore, fast and independent control of the amplitude and phase of each comb line is useful for chip-scale LiDAR systems, programmable pulse shaping and quantum information processing.

Type II Comb Generation: Electro-Optic Comb

EO combs are generated based on $\chi(2)$ process, where light in a resonator is phase modulated by an EO material. The modulation frequency closely matches the free-spectral-range of the ring resonator. EO combs can be generated using bulk crystal LN and off-chip cavities. The present disclosure provides for generating EO comb in on-chip lithium niobate waveguide structures and photonic circuits based on that.

The migration of optical frequency comb generators to integrated devices is motivated by a desire for efficient, compact, robust, and high repetition-rate combs. Various approaches to on-chip frequency comb generation rely on the Kerr (third-order, $\chi^{(3)}$) nonlinear optical process, where a continuous wave (CW) laser source excites a low-loss optical microresonator having a large Kerr nonlinear coefficient. This approach enables wide-spanning Kerr frequency combs from the near- to mid-infrared in many material platforms such as silicon, silicon dioxide, silicon nitride and magnesium fluoride. Sophisticated control protocols are typically required to keep Kerr combs stabilized.

An alternative frequency comb-generation method uses the electro-optic (EO) effect in materials with second-order ($\chi^{(2)}$) nonlinearity. EO frequency comb generators can be created by passing a continuous wave (CW) laser through a sequence of discrete phase and amplitude modulators. Such EO comb generators can feature high comb power and flat spectra, and can support flexible frequency spacing. They usually have narrow frequency span, however, comprising only tens of lines and spanning only a few nanometers. Therefore, highly nonlinear fiber is typically required to further broaden the comb spectrum, increasing the system complexity and size. Broader EO combs can be generated using an optical resonator to increase the nonlinear interaction strength.

Figure 22:
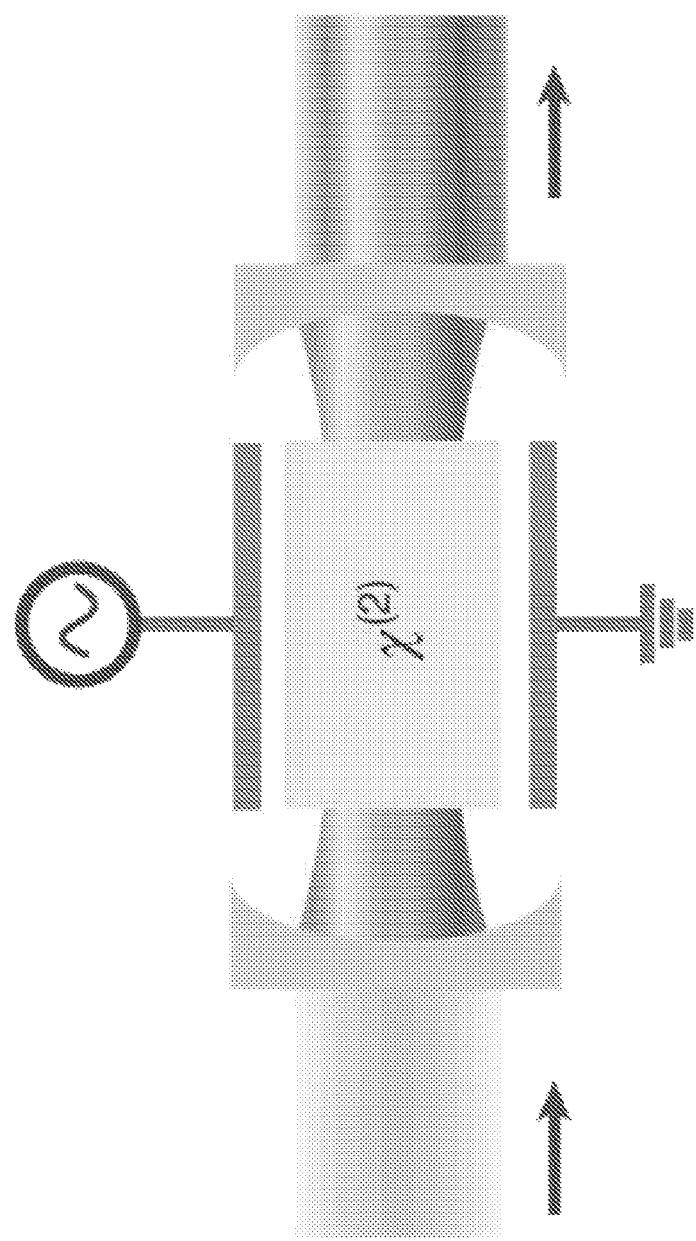
FIG. 22 is a schematic view of an electro-optic comb generator according to embodiments of the present disclosure.

Referring to FIG. 22, a schematic of an exemplary EO comb generator according to embodiments of the present disclosure is shown. The EO comb generator of FIG. 22 comprises an EO ($\chi^2$) phase modulator inside a Fabry-Pérot (FP) resonator. In a such a resonator-based EO comb generator, a CW laser is coupled to a bulk nonlinear crystal resonator containing an EO phase modulator, and comb lines are generated solely through the $\chi^2$ process.

Figure 24:
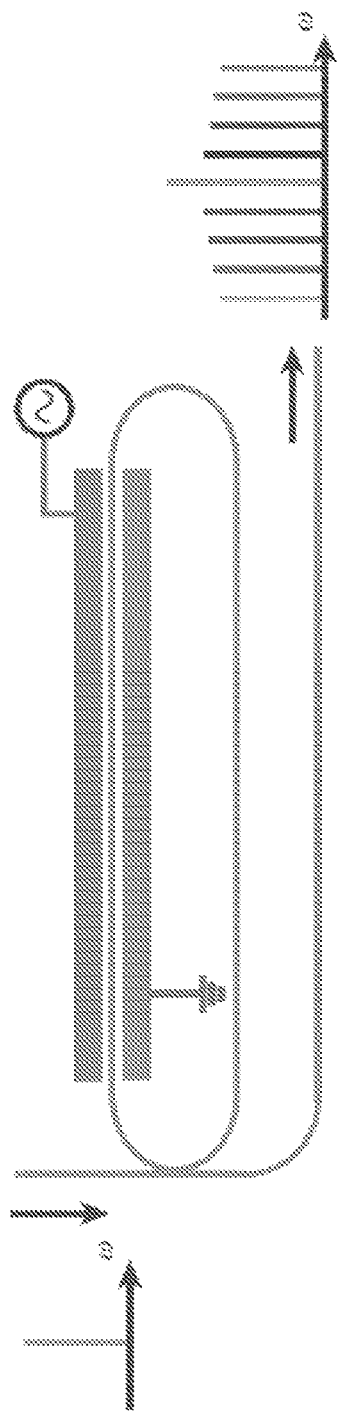
FIG. 24 is a schematic view of an integrated microring electro-optic comb generator according to embodiments of the present disclosure.

A waveguide-based comb generator is shown in FIG. 24. A single-frequency input with electric field $E_{in}(t)=\hat{E}_{in} e^{i\omega_0 t}$ is coupled, with power coupling coefficient k and insertion loss $\gamma$, to a resonator having round trip time T at center frequency $\omega_0$ and round trip power loss $\alpha$. The resonator contains a phase modulator driven with modulation index $\beta$ and frequency $\omega_m$. The output electric field is $$E_{out}(t) = \sqrt{(1-\gamma)(1-k)}\, E_{in}(t) - k\sqrt{\frac{1-\gamma}{1-k}} \sum_{n=1}^{\infty} r^n e^{-i\beta F_n(\omega_m t)} E_{in}(t-nT) \quad \text{Equation 1}$$

where $r=\sqrt{(1-\gamma)(1-k)}\alpha$ is the round trip electric field transmission and $F_n(\omega_m t)=\Sigma_{i=1}^{n} \sin \omega_m(t-iT)$ is the modulator coherence function.

The parameter $l=1-r$, corresponding to the round-trip electric field loss, is used in the main text for simplicity. When the optical carrier is resonant in the resonator ($\omega_0 T=2\pi m_1$) and the microwave drive signal is resonant ($\omega_m T=2\pi m_2$), the modulator coherence function becomes $F_n(\omega_m t)=n \sin \omega_m(t-iT)$ and the output electric field can be simplified to $$E_{out}(t) = \left[\sqrt{(1-\gamma)(1-k)} - k\sqrt{\frac{1-\gamma}{1-k}} \frac{re^{-i\beta \sin \omega_m t}}{1-re^{-i\beta \sin \omega_m t}}\right] E_{in}(t) \quad \text{Equation 2}$$

This output electric field corresponds to an optical frequency comb spaced at the modulation frequency. The power in the qth comb line away from the center frequency can be found by rewriting Equation (3) as $$E_{out}(t) = \sqrt{(1-\gamma)(1-k)}\, \hat{E}_{in} e^{i\omega_0 t} - k\sqrt{\frac{1-\gamma}{1-k}} \sum_{n=1}^{\infty} r^n e^{-i\beta n \sin \omega_m t} \hat{E}_{in} e^{i\omega_0(t)} = \quad \text{Equation 3}$$
$$\sqrt{(1-\gamma)(1-k)}\, \hat{E}_{in} e^{i\omega_0 t} - k\sqrt{\frac{1-\gamma}{1-k}} \sum_{q=-\infty}^{\infty} \hat{E}_{in} e^{i(\omega_0+q\omega_m)t} \sum_{n=1}^{\infty} r^n J_q(\beta n),$$

where $J_q$ is the qth order Bessel function of the first kind. The power of the qth (nonzero) comb line is then $$P_q = k^2 \frac{1-\gamma}{1-k} P_{in} \left|\sum_{n=1}^{\infty} r^n J_q(\beta n)\right|^2 \quad \text{Equation 4}$$

An approximation for the power of the qth comb as $$P_q \propto e^{-\frac{|q|(1-r)}{\beta}}$$

may be computed.

In the presence of optical and microwave detuning from resonance, the comb spectrum can still be calculated. When the optical carrier is off resonance, the total round-trip phase is $\omega_0 T=2\pi m_1+\phi_{opt}$. Similarly, when the microwave carrier is off resonance the total round-trip phase is $\omega_m T=2\pi m_2+\phi_{micro}$. Using these expressions in Equation 1, we can find the following expression for the power in the qth comb line:

$$P_q = k^2 \frac{1-\gamma}{1-k} P_{in} \quad \text{Equation 5}$$

-continued $$\left|\sum_{p=-\infty}^{\infty}\sum_{n=1}^{\infty}(re^{i\phi_{opt}})^n e^{ip\frac{\pi}{2}} J_{q-p}(\beta_o(\phi_{micro},n)) J_p(\beta_e(\phi_{micro},n))\right|^2$$

The modified even and odd modulation indices ($\beta_e$ and $\beta_o$, respectively) are $$\beta_e(\phi_{micro},n) = \beta\left[\frac{1}{2}\cot\phi_{micro}/2 - \frac{\cos\left(n+\frac{1}{2}\right)\phi_{micro}}{2\sin\phi_{micro}/2}\right] \quad \text{Equation 6}$$

$$\beta_o(\phi_{micro},n) = \beta\left[-\frac{1}{2} + \frac{\sin\left(n+\frac{1}{2}\right)\phi_{micro}}{2\sin\phi_{micro}/2}\right] \quad \text{Equation 7}$$

In the regime of low optical detuning, the slope of the comb decreases by a factor of $\cos(\phi_{opt})$. The effect of microwave detuning is harder to visualize, but results in a destructive interference condition for large values of q in Equation 5. This effect is demonstrated experimentally and theoretically in FIG. 27.

The optical phase noise of the comb lines is important in applications that require high optical signal-to-noise ratios, such as high-capacity optical communications. It is well known that the optical phase noise contribution from the pump laser does not increase with increasing comb line index. By contrast, the phase noise contribution from the microwave modulation signal increases in power with comb line quadratically with q. This can be shown by modifying the modulator coherence function to include the effects of microwave modulation phase noise $\theta(t)$:

$$F_n(\omega_m t) = \sum_{i=1}^{n}\sin\omega_m(t - iT + \theta(t - iT)) \quad \text{Equation 8}$$

The output optical field can then be written as:

Equation 9

$$E_{out}(t) = \sqrt{(1-\gamma)(1-k)}\,\hat{E}_{in}e^{i\omega_0 t} - k\sqrt{\frac{1-\gamma}{1-k}}\,\hat{E}_{in}\sum_{q=-\infty}^{\infty}\sum_{n=1}^{\infty}r^n J_q(\beta n)e^{i(\omega_0+q\omega_m)t+iq\theta(t)}. \quad (11)$$

The phase noise amplitude increases linearly with increasing comb line index q, corresponding to a quadratic increase in phase noise power.

For applications that require few comb lines, this increase in microwave phase noise is often negligible because quartz crystal oscillators have very low phase noise. For applications requiring many comb lines, however, the effect of microwave phase noise may be noticeable. Microwave phase noise suppression may be provided in EO comb generators. When the optical and microwave frequencies are resonant, higher order comb lines do not experience a quadratic increase in phase noise power. Instead, high frequency phase noise components are attenuated such that the high frequency phase noise is comparable for all comb lines. Furthermore, detuning the optical and microwave frequencies from the resonator FSR can further reduce the phase noise power. This indicates that EO comb generators can generate low-noise comb lines over their entire dispersion-limited bandwidth. Additionally, integrated platforms, such as the one presented herein, enable additional filtering cavities and structures to be readily included in the resonator structure.

To include the effect of dispersion, a round-trip phase model is introduced. In particular, the destructive interference that occurs due to the microwave detuning motivates a phase-based resonance approximation for the viable comb bandwidth. A mathematical treatment of the dispersion limits of resonator-based EO comb generators in provided, including clarification of the physical interpretation of the round-trip phase model. Its application to combs of arbitrary bandwidth within a given dispersion-limited window is demonstrated.

The resonance condition of an optical frequency $\omega_q$ in a microresonator without EO modulation is $|\omega_q T - 2\pi N| < 2|$, where the total round-trip phase offset $\Delta\phi_q = \omega_q T - 2\pi N$, $T = 1/\text{FSR}$ is the round-trip time and N is the number of optical cycles per round-trip that ensures that $|\Delta\phi_q| < 2\pi$. Frequency components outside of the resonance are attenuated by destructive interference, and thus do not resonate. When the resonance condition is satisfied, the optical fields constructively interfere inside the resonator at every time and spatial location.

In a resonator containing an EO phase modulator, the (now time-dependent) resonance condition becomes $|\Delta\phi_q + \beta \sin 2\pi f_m t| < 2|$, where $\beta$ is the modulation index and $f_m$ is the modulation frequency. Here, it is clear that the resonance condition can be satisfied for much larger round-trip phase offsets $\Delta\phi_q$ because within the round-trip resonator propagation time, the modulation term oscillates between negative and positive $\beta$ (i.e. $-\beta < \beta \sin 2\pi f_m t < \beta$).

Figure 26:
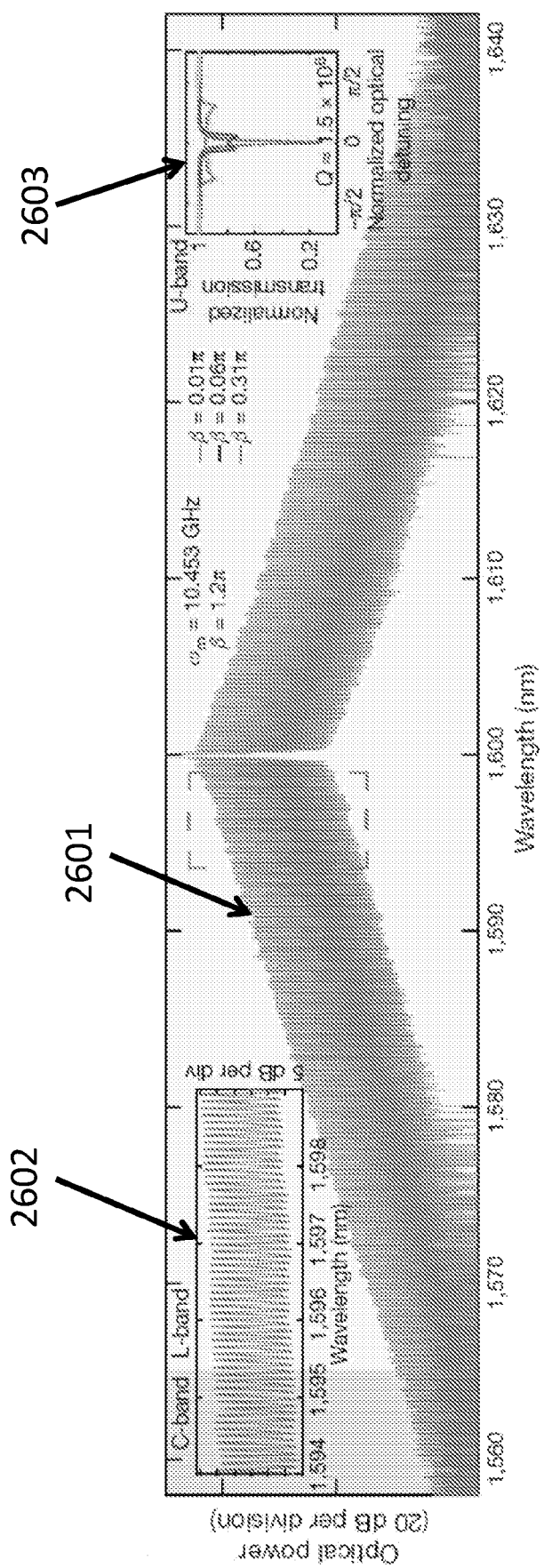
FIG. 26 is a plot of output characteristics of a generated EO comb according to embodiments of the present disclosure.

This effect may be understood by plotting the total transmission of the EO comb generator for various $\beta$, as shown in 2603 of FIG. 26. The transmission is calculated by averaging the output power of a time-domain representation of the electric field given in Equation (3). The optical power output depends primarily on the interference between the input optical field and the optical field inside the resonator. As in a microresonator without EO modulation, the dips in the transmission spectrum correspond to a large built-up field inside the resonator. For various values of $\beta$, the width of the resonance increases, indicating that for large modulation indices, the resonance condition can be satisfied for various detuning values. As shown in FIG. 26, the amount of detuning is approximately equal to the modulation index $\beta$, as is predicted by the phase model when $\Delta\phi_q = \phi_{opt}$.

The contributions to the optical phase offset $\Delta\phi_q$ as a function of frequency can now be determined. The optical phase offset, as discussed previously, does not induce frequency-dependent phase shifts. However, microwave signal detuning and dispersion effects are frequency dependent.

Once the resonator has reached steady state, the output field is an EO comb spaced at the modulation frequency $f_m$, such that the qth comb line frequency is $f_q = f_0 + qf_m$. A mismatch between the microwave frequency and the resonator free spectral range, $\Delta f_m$ results in a frequency-dependent phase offset $\phi_{micro}(q) = 2\pi q \Delta f_m T$.

For an arbitrary dispersion profile, it is possible to find the frequency-dependent phase offset by integrating the group velocity dispersion profile of the waveguide. However, if the dispersion is approximately linear with frequency, the dispersion-related phase offset is $\Delta\phi_{disp}(q) = 2\pi(qf_m)^2\beta_2 L$ where $\beta_2 L$ is the round-trip group velocity dispersion in $fs^2/mm$.

A model for the total phase offset as a function of frequency to first order is obtained, $\Delta\phi_q = \Delta\phi_{opt} + \Delta\phi_{micro}(q) + \Delta\phi_{disp}(q)$. In fact, this model agrees with alternative analytical models for the output comb shape. In the case of maximum comb bandwidth, corresponding to zero microwave detuning and optical detuning satisfying $\phi_{opt}+\beta=0$, the maximum dispersion-limited bandwidth is $$\Delta f_{comb} = \frac{1}{\pi}\sqrt{\frac{2\beta}{\beta_2 L}},$$

agreeing with up to a factor of $\sqrt{2}$ due to the difference in FSR of a Fabry-Pérot resonator and ring resonator of identical length.

Figure 28:
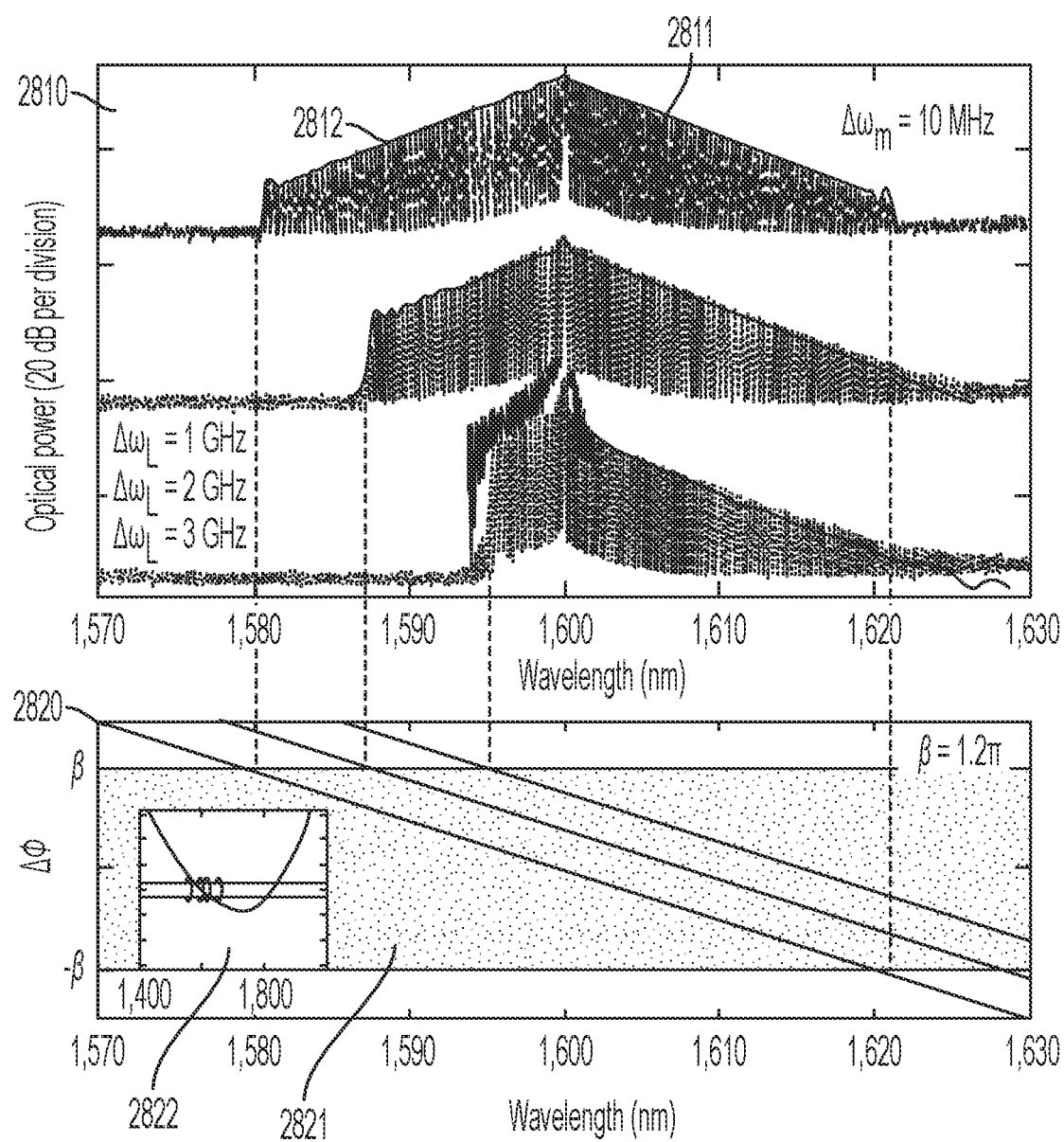
FIG. 28 is a plot of the measured electro-optic comb output spectrum and calculated round-trip phase for various values of optical frequency detuning according to embodiments of the present disclosure.

Using this model, it is a straightforward optimization problem to start with the frequency-dependent round-trip resonance condition and alter the optical and microwave detuning so that the resonance condition is satisfied only for a desired frequency region, as is done to demonstrate the one-sided comb in FIG. 28.

Figure 23:
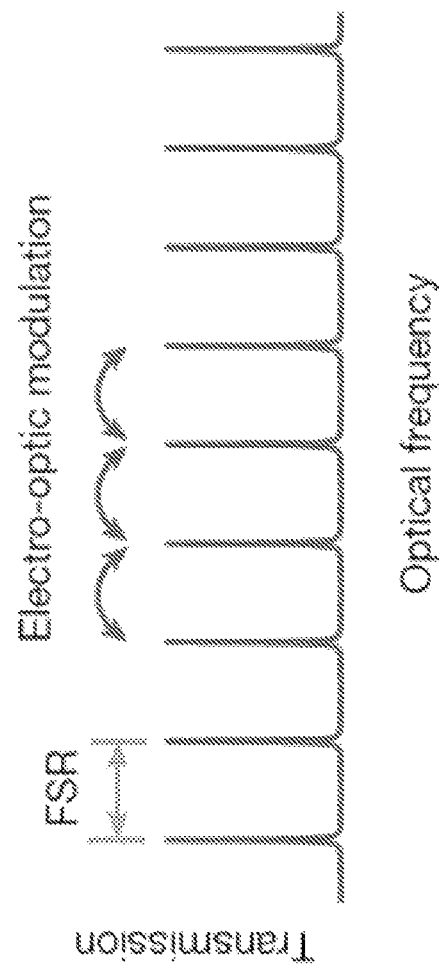
FIG. 23 is a visualization of a sideband generation process according to embodiments of the present disclosure.

Referring to FIG. 23, a visualization of the sideband generation process according to embodiments of the present disclosure is shown. A microwave signal, with modulation frequency equal to the free spectral range of the optical resonator, couples light between different resonator modes. When the modulation frequency matches a harmonic of the resonator FSR, the optical sidebands generated by the phase modulator are resonant. In a low-loss resonator, the light passes through the modulator many times before being dissipated or coupled out, efficiently generating many comb lines spaced at the modulation frequency. The modulation index determines the strength of coupling between nearby frequency components after passing through the modulator.

The output frequency comb can be predicted accurately by closed-form solutions with spacings equal to the modulation frequency. The overall flatness of the comb strongly depends on the round-trip modulation strength and the optical resonator loss. In particular, at frequencies away from the pump frequency, the comb line power decreases exponentially: the optical power in the qth comb line is $$P_q \propto e^{\frac{|q|l}{\beta}},$$

where $\beta=V_p/V_\pi$ is the phase modulation index, $V_p$ is the microwave drive peak amplitude, $V_\pi$ is the half-wave voltage of the phase modulator, $$l = \frac{\kappa}{FSR}\pi$$

is the round-trip electric-field loss coefficient of a resonator with damping rate $$\kappa = \frac{\omega_0}{Q},$$

Q is the resonator quality factor, and $\omega_0$ is the optical frequency. Strong phase modulation (large $\beta$) and a high-Q optical resonator (small l) are therefore needed for generating flat and broad EO combs. Furthermore, dispersion sets a limit on the total comb bandwidth by introducing frequency-dependent phase shifts that cause comb lines far from the pump frequency to fall out of resonance. EO frequency combs generated by free-space or fiber-based optical cavities are still limited to a few tens of nanometers of comb width by a combination of weak modulation and limited dispersion engineering.

The present disclosure provides for overcoming these limitations by monolithically integrating an EO comb generator on a thin film lithium niobate (LN) nanophotonic platform. By leveraging the large $\chi^{(2)}$ nonlinearity, strong microwave and optical field overlap, and ultra-low loss optical waveguides enabled by this platform, EO combs with performance superior to bulk EO comb generators are created. Compared to alternative integrated EO combs based on indium phosphide (InP) and silicon (Si) platforms, where the effective EO modulation processes, created either by doping (Si) or operating near the material's absorption band edge (InP), induce high optical losses, embodiments of the present disclosure may achieve increases in comb width of nearly two orders in magnitude.

Referring to FIG. 24, a schematic of an integrated microring EO comb generator according to embodiments of the present disclosure is shown. The Fabry-Pérot resonator of FIG. 22 is replaced by a microring resonator that is EO-modulated at a frequency matching the FSR of the microring. A continuous-wave laser coupled into the ring resonator is converted to a frequency comb in the output optical waveguide.

In various embodiments, an EO frequency comb is generated with over 900 unique frequencies spaced by 10.453 GHz, spanning 80 nm over part of the telecommunication C-band, the entire L-band and part of the U-band.

Figure 25:
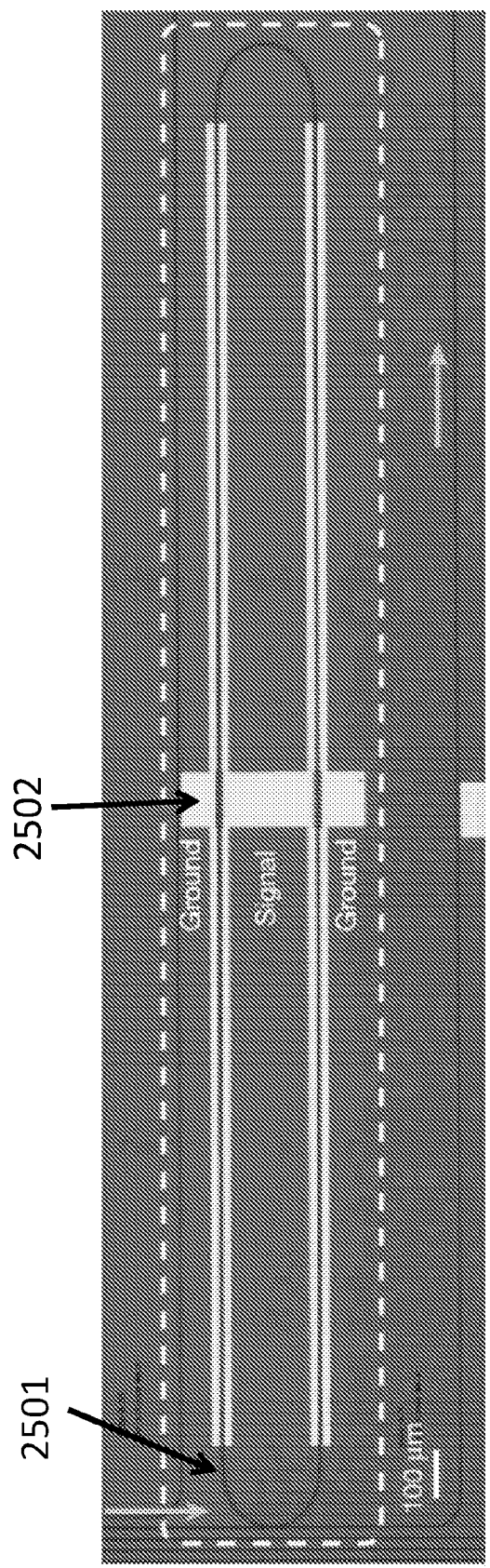
FIG. 25 is a micrograph of a fabricated lithium niobate microring resonator according to embodiments of the present disclosure.

Referring to FIG. 25, a micrograph of a fabricated LN microring resonator according to embodiments of the present disclosure is shown. The black lines 2501 are etched optical waveguides and the lighter regions 2502 are gold microelectrodes. The gold electrodes are driven so that the phase shifts on the two sides of the microresonator are opposite, which is required to break the symmetry of different azimuthal order optical modes, allowing for phase matching between the microwave and circulating optical field, and enabling efficient frequency conversion. A comb generator using this resonator uses a low-loss LN microring resonator with loaded Q of ~1.5 million, which is integrated with microwave electrodes for efficient phase modulation via the strong second-order nonlinearity of LN ($r_{33}$=30 pm/V). The tight confinement of the light (waveguide width=1.4 µm) allows for gold electrodes 2502 to be placed only 3.3 µm away from the edge of the resonator, resulting in efficient microwave delivery to achieve strong phase modulation while not affecting the resonator Q factor.

In various embodiments, the EO comb generators are fabricated on x-cut single crystalline thin-film lithium niobate (LN) wafers (NANOLN). The wafer stack comprises a 600 nm thin-film LN layer, a 2 µm thermally grown $SiO_2$ layer and a 500 µm silicon handle layer. Standard electron-beam (e-beam) lithography is used to pattern optical waveguide and micro-racetrack resonators. The patterns are then transferred into the LN layer using argon ($Ar^+$) plasma etching in an inductively coupled plasma reactive ion etching (ICP-RIE) tool. The etch depth is 350 nm, leaving a 250 nm thick LN slab behind, which enables efficient electric field penetration into the waveguide core. Gold contact patterns are then created using aligned e-beam lithography, and the metal is transferred using e-beam evaporation methods and lift-off processes. The chip is then diced and the facets are polished for end-fire optical coupling. A 10 GHz FSR micro-racetrack measures 200 µm by 6.2 mm. For illustration purposes, a 25 GHz FSR ring with otherwise the same design measuring 200 µm by 2.7 mm is displayed in FIG. 25, where the straight section has a reduced length.

In various embodiments, a 10 GHz microwave drive signal is used. The 10 GHz microwave drive signal is generated by a radio-frequency (RF) synthesizer and amplified by an electrical power amplifier. The amplified electrical signal is passed through a microwave circulator and delivered to the microelectrodes. As the microelectrodes represent a capacitive load, most of the electrical driving signal is reflected back to the circulator and terminated at the circulator output by a 50-Ω load.

Referring to FIG. 26, a plot of output characteristics of a generated EO comb according to embodiments of the present disclosure is shown. An EO comb generator is set up as described in FIG. 25, with an input optical power of 2 mW. The microresonator is modulated by an external microwave synthesizer with peak voltage $V_p$=10 V ($\beta$=1.27$\pi$) at a frequency near the resonator FSR. The generated comb spectrum 2601 demonstrates a bandwidth exceeding 80 nm and more than 900 comb lines with a slope of 1 dB nm$^{-1}$. The signal-to-noise ratio of the comb lines exceeds 40 dB, but is limited by the noise floor and resolution of the optical spectrum analyser. The left inset 2602 shows a magnified view of several comb lines, with a line-to-line power variation of about 0.1 dB. The right inset 2603 shows the measured transmission spectrum for several different modulation indices ft. When the modulation is turned on, the optical resonance is broadened by twice the modulation index. This behavior is predicted well by the round-trip phase model described herein.

In various embodiments, light from a tunable laser (SANTEC TS510) is launched into, and the comb output is collected from, the LN waveguides by a pair of lensed optical fibers. The output comb is passed to an optical spectrum analyser (OSA) having a minimum resolution of 20 pm. This finite resolution accounts for the limited signal-to-noise ratio observed in FIG. 26 (~20 dB). The shot-noise-limited signal-to-noise ratio is much higher, as the comb shot noise lies below the OSA noise floor. Although the measurement in the present disclosure is chosen to center at 1600 nm, the frequency comb center wavelength can be flexibly chosen between 1500 nm to 1680 nm of the tunable laser's range without affecting much of the generated comb width.

There are four resonator parameters that fully characterize the EO comb spectrum: the internal round-trip transmission coefficient $\alpha$, the power coupling coefficient k, the coupler insertion loss of the coupler $\gamma$, and the phase modulation index $\beta$. Finding each of these four parameters by fitting to the comb spectrum of the equation $$P_q = k^2 \frac{1-\gamma}{1-k} P_{in} \left| \sum_{n=1}^{\infty} r^n J_q(\beta n) \right|^2 \qquad \text{Equation 10}$$

is difficult because the output comb can be fully determined by a subset of these independent parameters (e.g., increasing the modulation index has the same effect as decreasing the loss in the resonator). Instead, each of the parameters must be measured separately. $\alpha$ and k may be found by measuring the total transmitted power without phase modulation (see 2603 in FIG. 26). Fitting to the expected transmission of an all-pass ring resonator results in values of Q=1.5×10$^6$, $\alpha$=0.95, and k=0.027. Then a grid search optimization for $\gamma$ and $\beta$ is performed, comparing the measured output spectrum (FIG. 26) with the spectrum determined from the output time-domain electric field of equation $$E_{out}(t) = \sqrt{(1-\gamma)(1-k)} E_{in}(t) - k\sqrt{\frac{1-\gamma}{1-k}} \sum_{n=1}^{\infty} r^n e^{-i\beta F_n(\omega_m t)} E_{in}(t-nT) \qquad \text{Equation 11}$$

A best fit is found for $\gamma$=−0.004 dB and $\beta$=1.2 T$\pi$, where the average difference between experimental and theoretical comb line power is 0.6 dB. The relative uncertainty in the measurement of $\beta$ in this case is ±4%, calculated by finding the furthest fit within a 95% confidence interval and calculating the resulting $\beta$. The output power transmission for nonzero modulation indices (2603 in FIG. 26) is calculated by sampling the output electric field with the above equation and averaging the power over more than 100 modulation periods.

Figure 29:
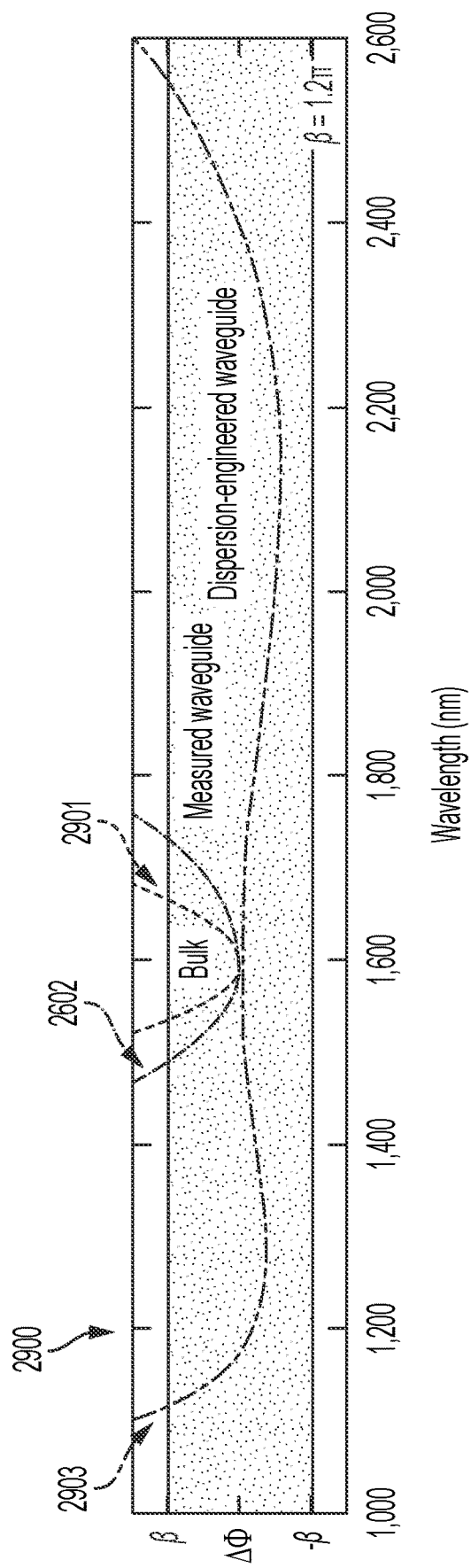
FIG. 29 is a plot of the round trip phase for various electro-optic comb generators according to embodiments of the present disclosure.

According to embodiments of the present disclosure, to achieve wide-spanning EO combs, the waveguide dispersion is engineered such that the group velocity (or the FSR) of the ring is roughly a constant across the entire frequency range. The dispersion of the waveguide was simulated using finite element methods (LUMERICAL Mode Solutions). The simulation accounts for the LN material anisotropy and the finite waveguide etching angle (around 70° from horizontal). The round-trip phase of the light inside the resonator is calculated by integrating the simulated group velocity dispersion twice to determine the total frequency-dependent phase-shift. For various embodiments, with a waveguide ridge height of 350 nm, waveguide width of 1.4 µm, slab thickness of 250 nm, and SiO$_2$ top cladding of 1.5 µm, the dispersion of the waveguide is weakly normal and supports an EO comb cut-off bandwidth of ~250 nm. It was found that for an air-cladded waveguide with a 600 nm thin-film LN layer, 550 nm etch depth and 1.8 µm waveguide width, a comb spanning~1.3 octave can be generated with a round-trip modulation frequency of 50 GHz and strength of $\beta$=1.2 $\pi$, as shown in FIG. 29. The waveguide dispersion can be tailored for low microwave drive powers at the expense of a smaller comb span. For an air-cladded waveguide with a 650 nm thin-film LN layer, etch depth of 620 nm and width 2400 nm, an octave spanning comb can be generated with a phase modulation strength of only 0.37$\tau$. These results are presented in FIGS. 31-33

Figure 31A:
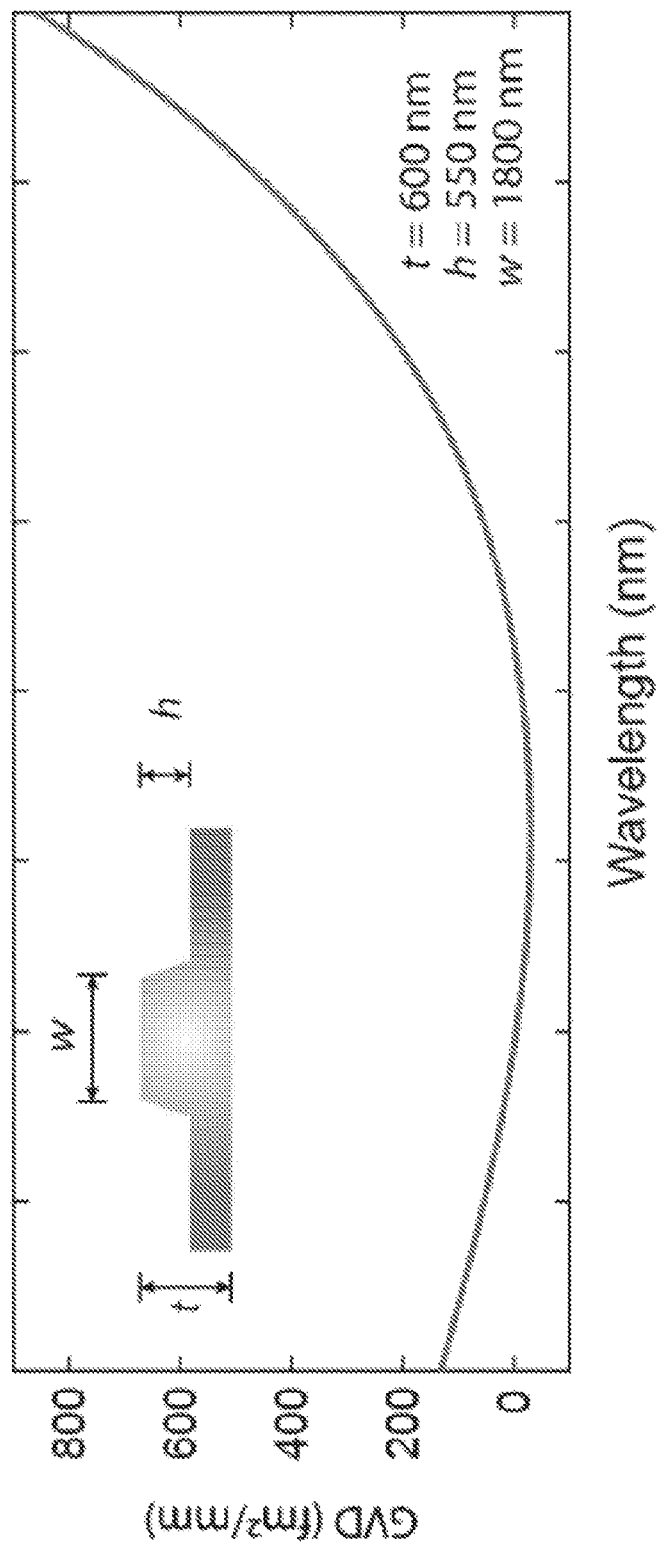
FIGS. 31A-B are plots of the simulated dispersion and phase matching condition for an LN waveguide according to embodiments of the present disclosure.
Figure 31B:
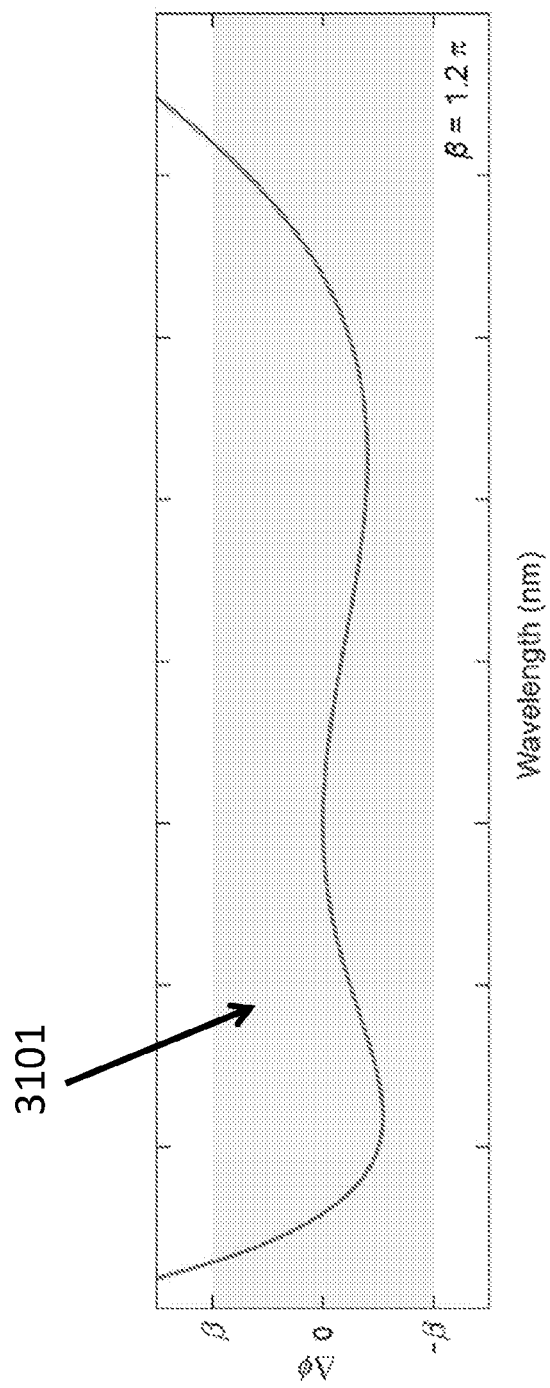

Referring to FIGS. 31A-B, plots of the simulated dispersion and phase matching condition for an LN waveguide according to embodiments of the present disclosure are shown. FIG. 31A shows the simulated dispersion for an air-clad lithium niobate ridge waveguide with top width w=1,800 nm, film thickness t=600 nm, and etch depth h=550 nm. FIG. 31B shows the phase matching condition for generating EO comb sidebands. Gray area 3101 shows the region of phase matching, with round-trip modulation strength $\beta$. With a 50 GHz microwave drive and =1.2 $\pi$, an EO comb spanning 1.3 octaves can be generated.

Figure 32A:
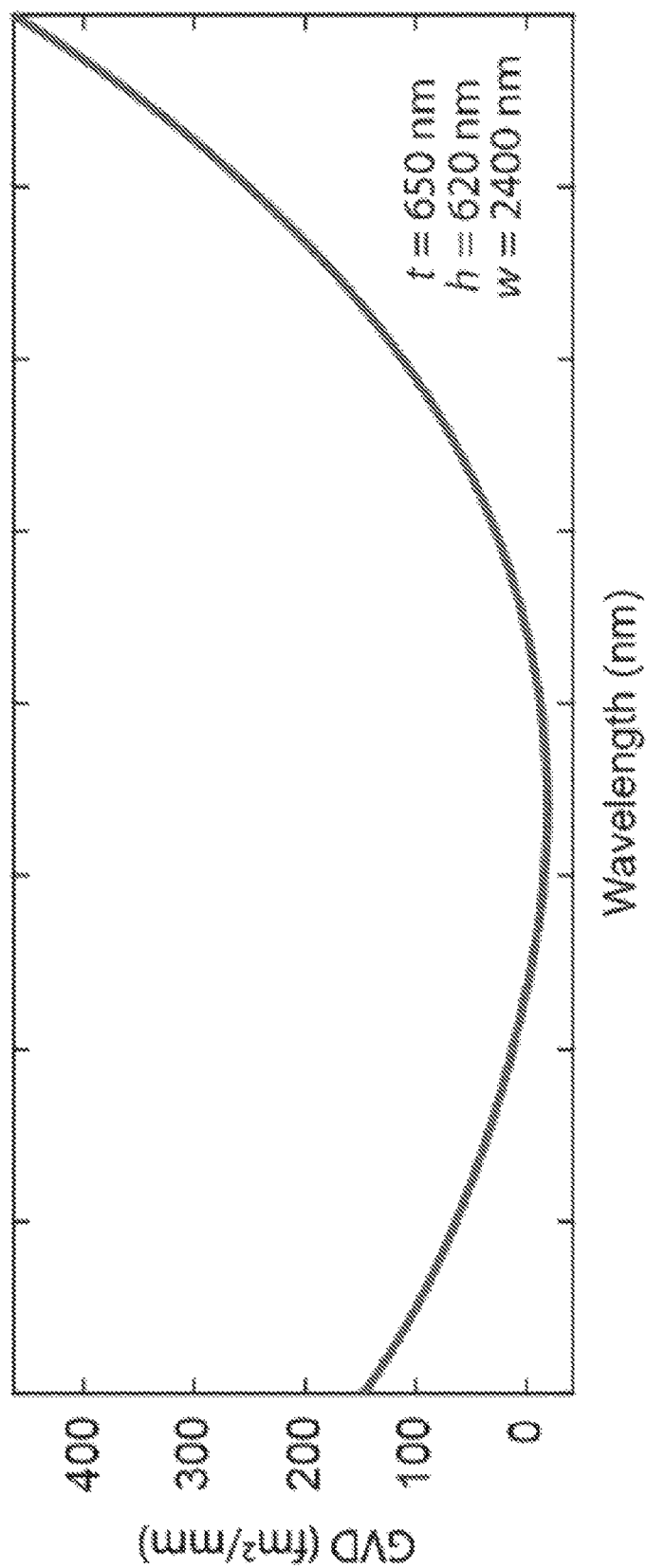
FIGS. 32A-B are plots of the simulated dispersion and phase matching condition for a lithium niobate waveguide according to embodiments of the present disclosure.
Figure 32B:
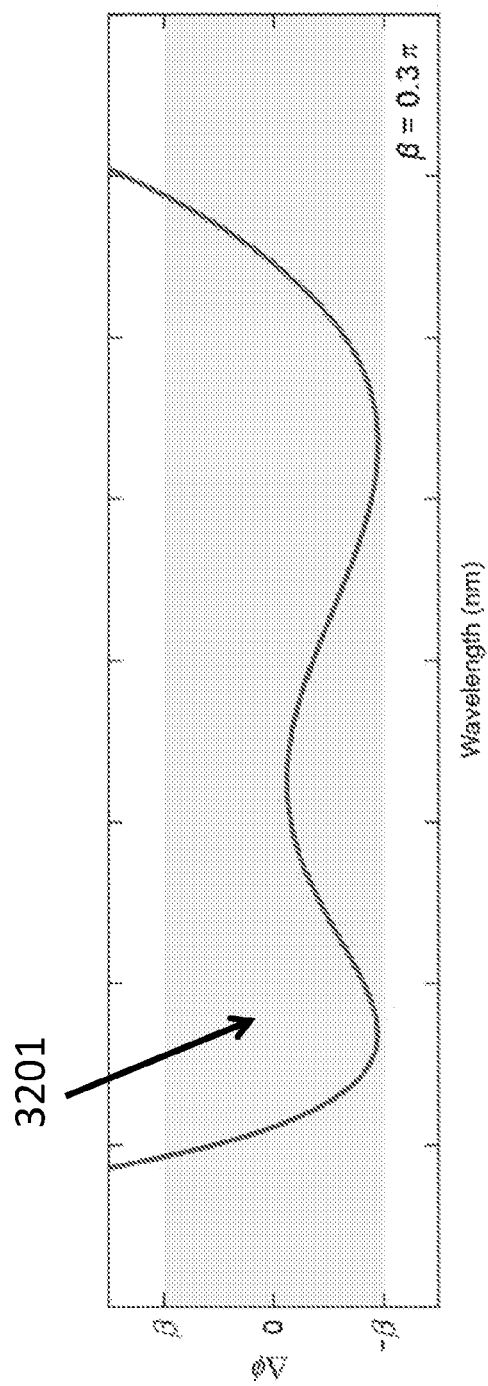

Referring to FIGS. 32A-B, plots of the simulated dispersion and phase matching condition for an LN waveguide according to embodiments of the present disclosure are shown. FIG. 32A shows the simulated group velocity dispersion (GVD) for an air-clad lithium niobate waveguide with a different geometry optimized for an octave-spanning comb with small microwave driving amplitude. The waveguide has top width w=2,400 nm, film thickness t=650 nm, and etch depth h=620 nm. FIG. 32B shows the phase matching condition for generating EO comb sidebands. Gray area 3201 shows the region of phase matching, with round-trip modulation strength β. With a 50 GHz microwave drive and =0.3 π, an octave spanning EO comb can be generated.

Figure 33A:
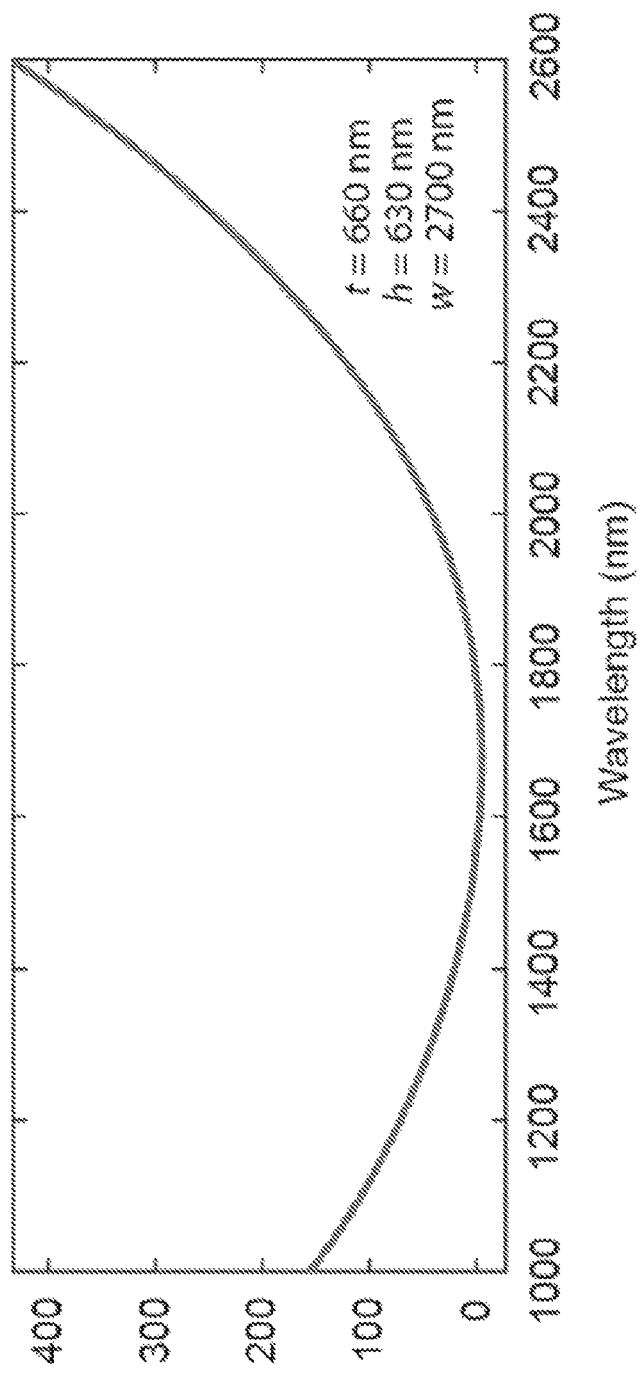
FIGS. 33A-B are plots of the simulated dispersion and phase matching condition for a lithium niobate waveguide according to embodiments of the present disclosure.
Figure 33B:
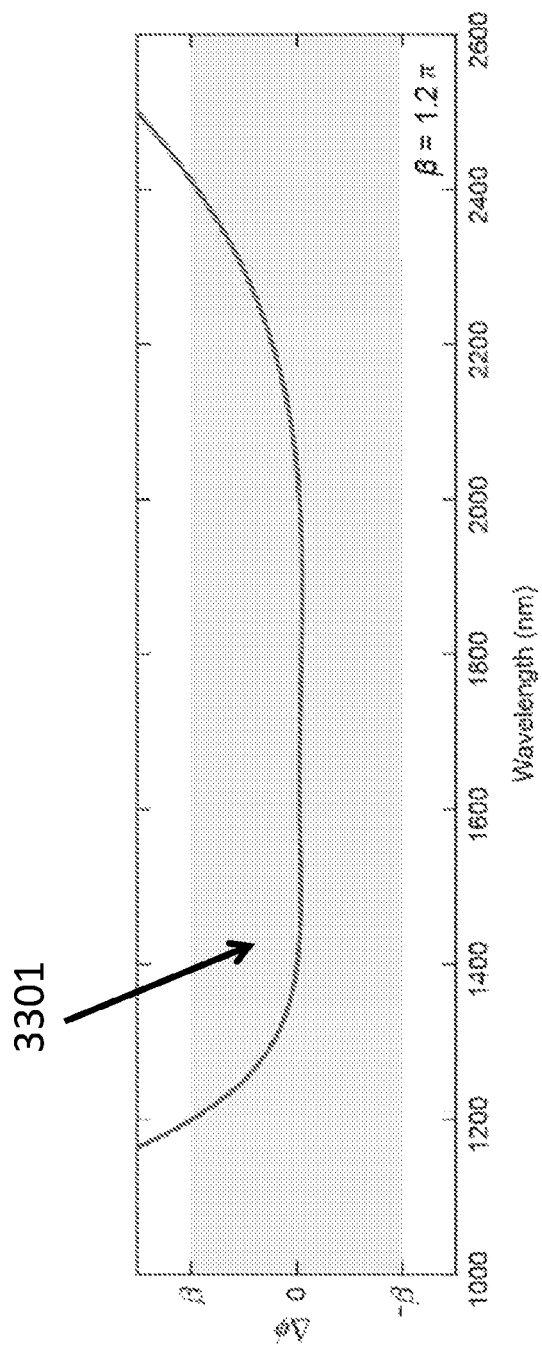

Referring to FIGS. 33A-B, plots of the simulated dispersion and phase matching condition for an LN waveguide according to embodiments of the present disclosure are shown. FIG. 33A shows the simulated dispersion for an air-clad lithium niobate waveguide, dispersion engineered for broad comb generation. The waveguide has top width w=2,700 nm, film thickness t=660 nm, and etch depth h=630 nm. FIG. 33B shows the phase matching condition for generating EO comb sidebands. Gray area 3301 shows the region of phase matching, with round-trip modulation strength β. With a 50 GHz microwave drive and =1.2 π, a broad EO comb spanning less than an octave can be generated in devices with small microwave modulation amplitudes and high-Q optical resonators. Such EO comb generation features a flat response over 600 nm.

In various embodiments, an EO comb generator features a direct capacitive drive electrode design, where the electrical power consumption $P_E$ can be estimated as $$P_E = \frac{1}{2}CV_p^2\omega_M \qquad \text{Equation 12}$$

where C≈200 fF is the estimated capacitance, $V_p$ is the peak voltage and $\omega_M$ is the microwave frequency. For the broad comb shown in FIG. 26, the calculated electrical power consumption is about 630 mW.

There are several ways to reduce the electrical power consumption of an EO comb generator according to embodiments of the present disclosure. In some embodiments, the electrode gaps are not optimized and can be reduced to directly increase the electro-optic efficiency. A microwave resonator with a quality factor of $Q_M$ can be used to dramatically enhance the driving voltage, as only a narrow band microwave source is required. A microwave resonator has an enhanced voltage $V_{p,eff}$ of $$V_{p,eff} = \sqrt{\frac{2P_E Q_M}{\omega_M C}} \qquad \text{Equation 13}$$

Comparing Equation 13 with Equation 12, the effective pumping power is increased by a factor of $Q_M$. This means that for a moderate $Q_M$=20 at 10 GHz, the power consumption can be reduced to about 30 mW.

To estimate the minimum electrical power required to generate an octave spanning EO comb, a case in considered wherein the resonator is driven to $1.2V_\pi$ at 50 GHz FSR. Here, the capacitance of the device is reduced by a factor of 5 as the ring resonator becomes smaller to achieve a 50 GHz FSR. At the same time, the $V_\pi$ also increases by a factor of 5 due to the shorter electrodes. For $Q_M$=20, the calculated power consumption is ~750 mW. Through dispersion engineering and higher optical Q microresonators, it is possible to achieve an octave spanning EO comb even at low drive voltages of $V_p$=0.3 $V_\pi$. In this case, the electrical power consumption is further reduced to only ~45 mW.

A theoretical model is provided to quantify the fundamental limits of the wide spanning EO combs generated on an integrated platform. EO comb span in alternative approaches is limited to a narrow width by a combination of weak microwave modulation strength and native material dispersion, which hinders the constructive interference needed for cascaded frequency conversion to generate comb lines far from the pump frequency. In contrast, the integrated EO comb generators of the present disclosure feature large modulation strength and the ability to engineer dispersion, which enables broader EO comb generation. To understand the limitations of the EO comb generation process, the resonance condition for a comb line at optical frequency $\omega_q$ was analyzed. In a traditional resonator, the round-trip constructive interference condition is given by $|\Delta\phi_q|<2l$, where $\Delta\phi=\omega_q T-2\pi N$ is the accumulated round-trip phase, T is the round-trip time, and N is the number of optical cycles per round-trip (chosen to minimize $|\Delta\phi_q|$).

For optical frequencies that satisfy this condition, the optical field interferes constructively within the resonator. When the resonator length is modulated, as in an EO comb generator, the resonance condition is modified into a dynamic one, where constructive interference occurs periodically at the microwave modulation frequency $\omega_m$ inside the resonator (i.e., $|\Delta\phi_q+\beta \sin \omega_m t|<2l$). Any frequency that does not satisfy this dynamic resonance condition will halt the frequency conversion process, thus limiting the comb width. This condition is reflected in the measured transmission spectrum of a microring resonator under microwave modulation (FIG. 26, right inset 2603). With no microwave modulation (β~0), the transmission spectrum exhibits a Lorentzian shape. By contrast, when the electrodes are strongly modulated (large β) the half-width at half-maximum of the transmission spectrum broadened by a factor of approximately β, confirming that the tolerable absolute accumulated phase $|\Delta\phi_q|$ is increased to β. It is therefore clear that it is the strong phase modulation achieved in our EO comb generator allowed for the continued cascade of phase modulation even in the presence of dispersion.

Figure 27:
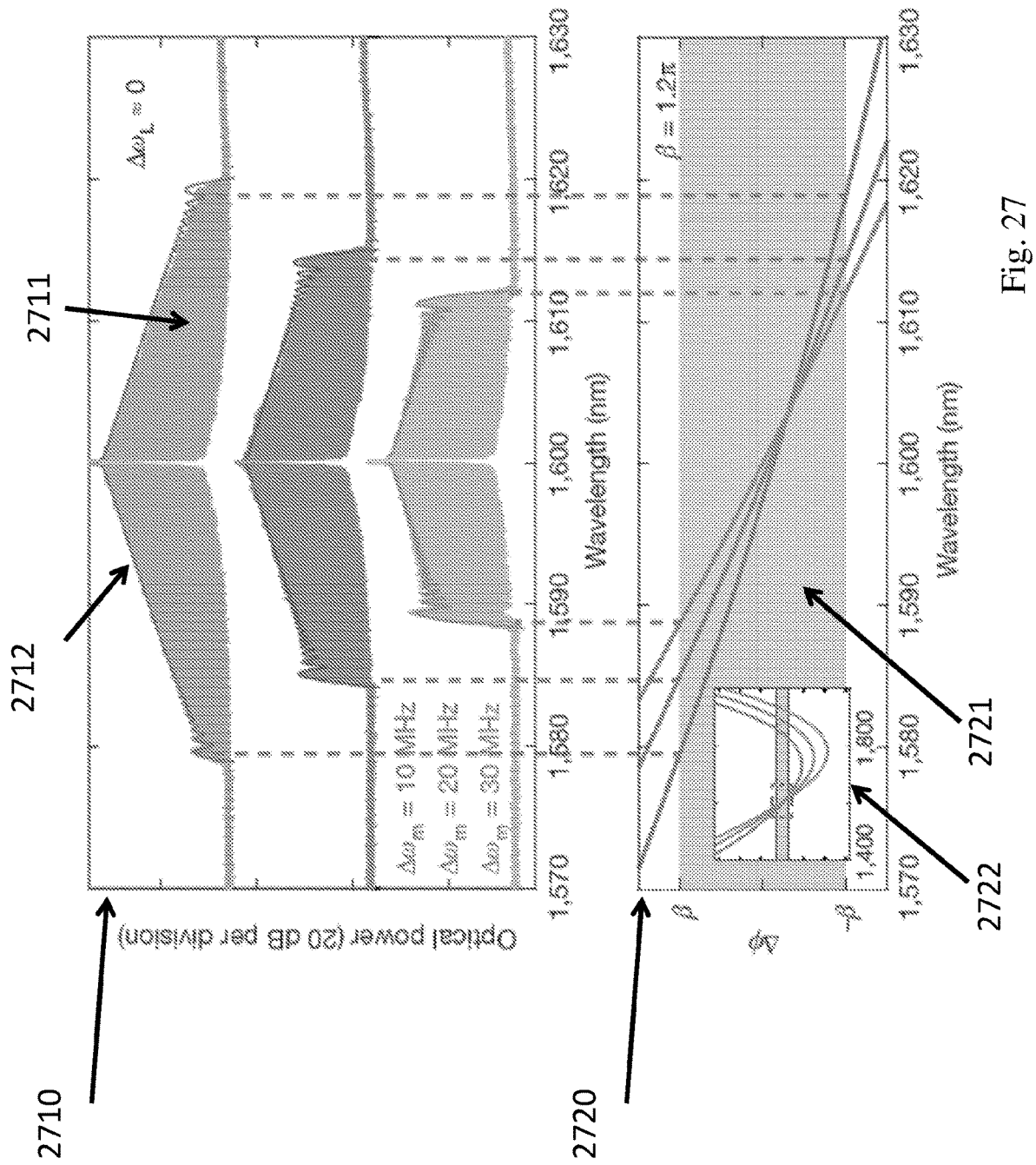
FIG. 27 is a plot of the measured electro-optic comb output spectrum and calculated round-trip phase for various values of modulation frequency detuning according to embodiments of the present disclosure.

To verify the round-trip phase model experimentally, the optical and microwave frequencies were detuned to generate different comb shapes and widths. Referring to FIG. 27, a plot of the measured EO comb output spectrum and calculated round-trip phase for various values of modulation frequency detuning according to embodiments of the present disclosure is shown. Plot 2710 shows three EO comb output spectra vs wavelength for various values of modulation frequency detuning from the resonator free spectral range ($\Delta\omega_m$). The three plots, from top to bottom, correspond to a $\Delta\omega_m$ of 10 MHz, 20 MHz, and 30 MHz, respectively.

Shaded region 2711 and envelope 2712 correspond to measured and numerically simulated values, respectively. By increasing the microwave detuning up to 30 MHz, a significant reduction in the comb frequency span was observed, which is predicted well by round-trip phase model 2720. Calculated round trip phase model 2720 shows the round trip phase Δϕ versus wavelength for the modulation frequency detuning values in 2710. Gray shaded region 2721 highlights the constructive interference condition region beyond which EO comb generation is suppressed. This region is bounded by ±β, the round trip modulation index.

Inset 2722 shows a zoomed out view of the round-trip phase versus wavelength plot 2720. The calculated cut-off frequency matches well with experimental data, as shown by the dashed lines extending to 2710. Any frequency components having total accumulated phases larger than β cannot resonate, thus limiting the comb bandwidth.

Taking advantage of this dynamic resonance condition, asymmetric combs can be generated by appropriately choosing the optical and microwave detuning. Referring to FIG. 28, a plot of the measured EO comb output spectrum and calculated round-trip phase for various values of optical frequency detuning according to embodiments of the present disclosure is shown. Plot 2810 shows three EO comb output spectra versus wavelength in the presence of both optical ($\Delta\omega_l$) and microwave ($\Delta\omega_m$) detuning. The three plots, from top to bottom, correspond to a $\Delta\omega_l$ of 1 GHz, 2 GHz, and 3 GHz, respectively, with all three having a $\Delta\omega_m$ of 10 MHz. Shaded region 2811 and envelope 2812 correspond to measured and numerically simulated values, respectively. By modifying the detuning values, different comb shapes, such as a single-sided EO comb, can be generated. Calculated round trip phase model 2820 shows the round trip phase $\Delta\phi$ versus wavelength for the modulation frequency detuning values in 2810. Gray shaded region 2821 highlights the constructive interference condition region beyond which EO comb generation is suppressed. This region is bounded by $\pm\beta$, the round trip modulation index. Inset 2822 shows a zoomed out view of the round-trip phase versus wavelength plot 2820. The calculated cut-off frequency matches well with experimental data, as shown by the dashed lines extending to 2810. EO combs driven off resonance, could be used as low-noise sources for optical communications due to the noise-filtering properties of the optical resonator.

Referring to FIG. 29, a plot of the round trip phase for various EO comb generators according to embodiments of the present disclosure is shown. Plot 2900 shows simulated round-trip phase versus wavelength for traditional bulk devices (curve 2901), a measured integrated device (curve 2902), and a dispersion engineered integrated device (curve 2903). The simulations demonstrate that integrated EO combs can achieve larger dispersion-limited bandwidths than devices based on bulk crystals, and dispersion engineering can enable octave spanning EO combs. Traditionally, the span of EO comb generators is restricted by the dispersion of bulk materials, whereas the EO comb generators of the present disclosure tightly confine light in optical waveguides, enabling fine tuning of dispersion. In various experiments, simulations have shown that with a higher microwave modulation frequency of 50 GHz, a higher optical pump power (currently only 2 mW in experiments conducted on embodiments of the present disclosure), and a dispersion engineered LN rib waveguide resonator that minimizes variation in FSR, it is possible to generate an EO comb spanning over an octave.

Figure 30:
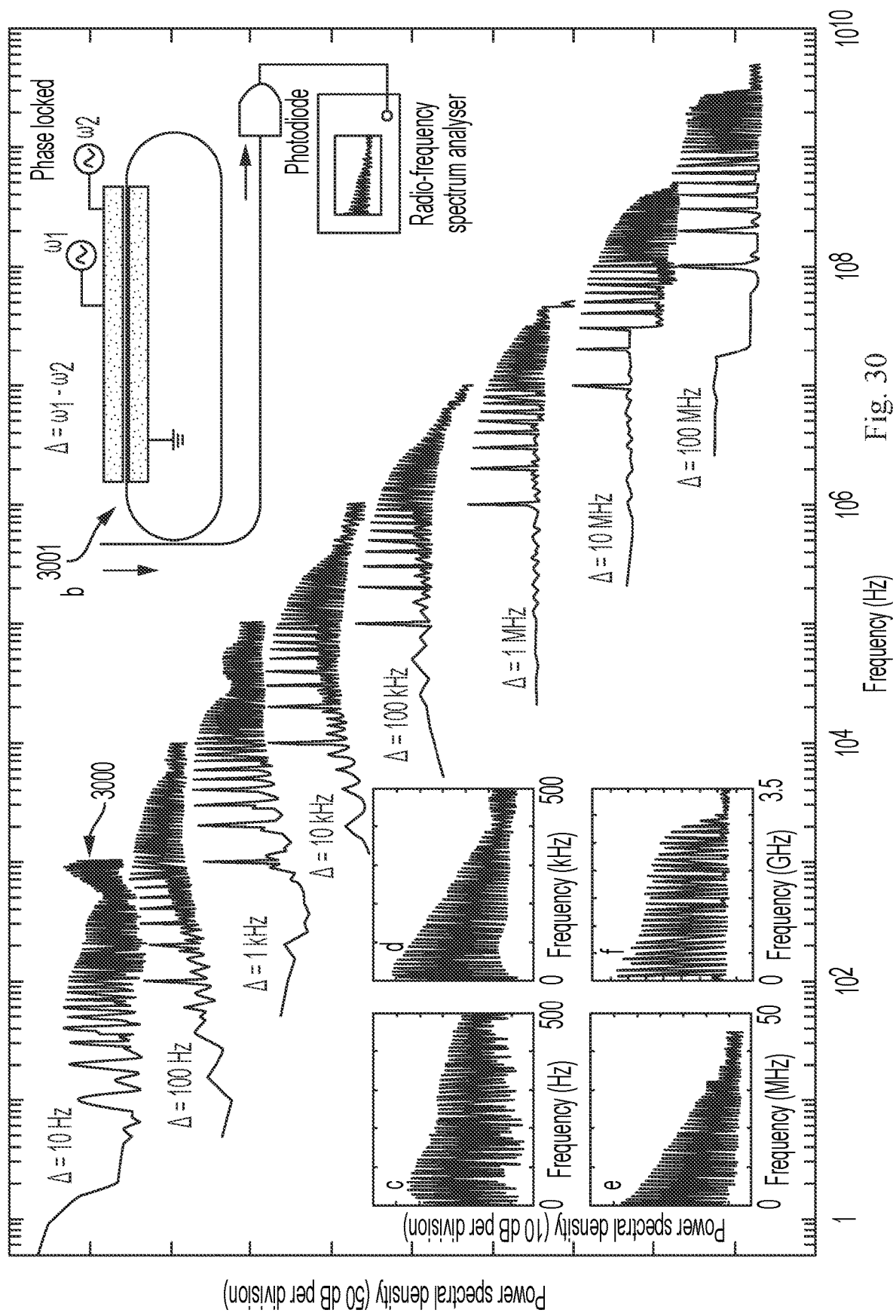
FIG. 30 is a plot of beats of an electro-optic comb and an experimental setup for their generation according to embodiments of the present disclosure.

Referring to FIG. 30, a plot of beats of an EO comb and an experimental setup for their generation according to embodiments of the present disclosure are shown. An attractive property of EO comb generators are their excellent configurability and stability. Plot 3000 shows a measured power spectral density on a logarithmic scale as a function of frequency. The measured power spectral densities of plot 3000 show coherent beating of an EO comb according to embodiments of the present disclosure.

Experimental setup 3001 may be used to generate such results. In experimental setup 3001, the EO comb generator is driven by a superposition of two phase-locked microwave signals with various values of frequency offset $\Delta$. The comb generator is optically pumped close to zero detuning at a resonance near 1600 nm, and the optical output is detected by a fast photodiode or other high-speed photodetector. The beat notes are detected by a radio-frequency spectrum analyzer. Thus, coherent beating between comb lines may be observed. Due to the strong phase modulation, this dual-driven EO comb contains frequency components far beyond the ring resonator linewidth without modulation (120 MHz). Leveraging the high tolerance to the detuning of the modulation frequency from the resonator FSR, the microresonator electrodes are driven with two phase-locked microwave sources at various frequency offsets from 10.453 GHz, spanning over seven orders of magnitude, ranging from 10 Hz to over 100 MHz.

The ability to vary the frequency spacing of resonator-based EO combs over seven orders of magnitude is in stark contrast with Kerr-based combs, whose frequency offset is predetermined by the fabricated resonator dimensions. Insets c, d, e, and f show magnified views of the individual beat notes for various comb spacings on a linear frequency scale. This demonstrates frequency components well beyond the resonator bandwidth in the absence of modulation, confirms that phase modulation changes the resonance condition to tolerate large microwave detuning. Additionally, this demonstrates the extreme flexibility in comb frequency spacing, which may enable applications requiring reconfigurable dynamic range, such as dual-comb spectroscopy or comb-based ranging. In various embodiments, two independent microresonators can be integrated onto the same LN chip with high fabrication tolerance to avoid potential aliasing of the comb lines.

In the dual-drive EO comb generation experiment, two RF synthesizers are phase-locked via a common 10 MHz clock and are free to operate at different frequencies. The two sinusoidal microwave signals are power balanced and combined using an RF power splitter and passed through the amplifier-circulator circuitry described previously. In the dual-drive EO comb measurements, the modulated light is passed to a fast photodetector (New Focus 1544A) and the resulting electrical signal is sent to a RF spectrum analyzer to record the beating in the RF domain.

Devices featuring high-Q microring resonators and highly confined optical waveguides for EO comb generation enable a new generation of integrated EO comb sources. Based on the demonstration of an EO comb that is almost two orders of magnitude larger than prior integrated EO combs, dispersion engineering and high frequency modulation can enable efficient octave-spanning EO comb generators. The approaches demonstrated herein can be used to realize EO combs all over the LN transparency window, including visible and near-IR, simultaneously. With the added ability to integrate filters and resonators adjacent or inside EO comb generators on the same chip, comb line power, and hence SNR, can be further increased by nearly 20 dB. Approaches set forth herein allow for complex EO circuits to be integrated on the same chip, and thus are particularly useful in microresonator frequency comb applications. For example, high-performance EO combs featuring high power and flat combs enable Tb/s optical communications links that rely on stable, low-noise combs as sources for high capacity wavelength-division multiplexed systems on a single chip. Furthermore, the EO comb generator demonstrated herein provides many stable coherent optical frequencies with electrically adjustable frequency spacing, paving the way for efficient dual-comb spectroscopy on a chip or highly-reconfigurable comb-based ranging.

For the EO comb, ring resonators are designed to exhibit high quality factor. In various embodiments, a racetrack resonator is used to maximize the section perpendicular to z-axis of the crystal. The racetrack features an Euler curve connected circle to minimize optical radiation loss when light propagates from the straight to the bent sections.

Electrodes are provided to achieve an anti-phase driving on the two optical waveguides. The two electrodes inside the ring are connected, and the two outside are connected (This is opposite to a ring-modulator configuration). In this configuration, a DC voltage has overall zero effect on the resonance frequency of the resonator as the top and the bottom waveguides have opposite phase shift. However, for a microwave signal with a frequency that matches the circulation of light around the resonator, the microwave is phased-matched with light and can convert light to adjacent optical modes. This process is cascaded for generating the EO comb.

In various embodiments, the microwave driving signal can be single frequency or multiple frequencies. The principle allows for all optical wavelengths supported by the material. The electrodes can also be positioned in a z-cut thin-film LN. In such cases, the electrode would still have opposite connections for the two waveguides on two sides. Instead of an outside-inside relationship to the ring, the electrical + is above the ring, and the other side is below the ring.

In EO comb generation, the waveguide dispersion matters less, as the microwave drive is strong, which overshadows the effect of dispersion.

Integrated optical frequency comb (OFC) generators are useful for applications in precision timing, optical communication, and spectroscopy. One approach is nonlinear OFC generation, where a strong pump is coupled to a microcavity with high Kerr nonlinearity.

Another approach is to generate a frequency comb electro-optically (EO), which offers flexible input optical power and wavelength, low-noise carrier generation and more stable operation in contrast to Kerr comb generators. EO combs may be generated by coupling a single optical carrier into several phase and/or intensity modulators, such as in comb generators based on asymmetric dual-driven Mach-Zehnder modulators. While these devices can be optimized to produce flat combs, the power requirement scales linearly with the number of desired carriers. More efficient EO comb generators based on resonant phase modulation may be designed, but are difficult to achieve on integrated platforms due to large dispersion, high optical loss and low EO efficiency.

The present disclosure provides for generating an EO comb spanning more than 50 nm in the telecom L-band using an ultrahigh-Q lithium niobate (LiNbO$_3$) racetrack microresonator with integrated microwave electrodes.

Figure 4A:
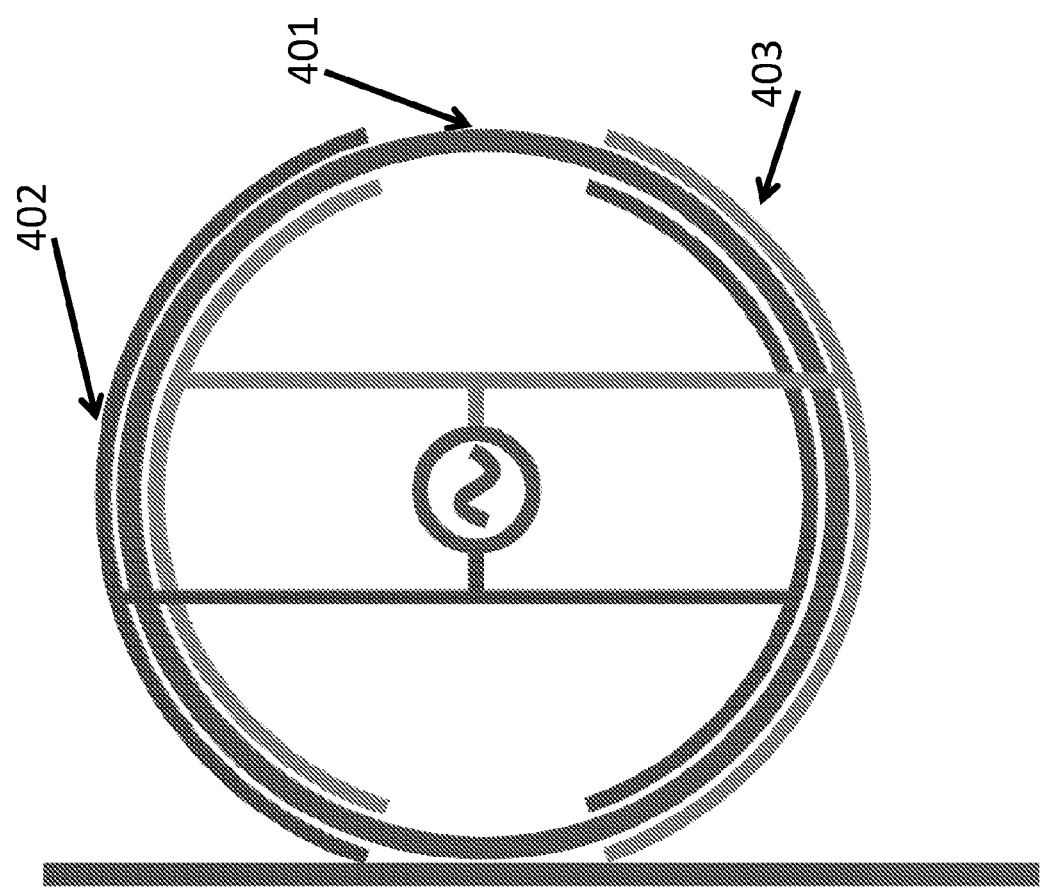
FIG. 4A is a schematic of a microwave electrode geometry according to embodiments of the present disclosure.
Figure 4B:
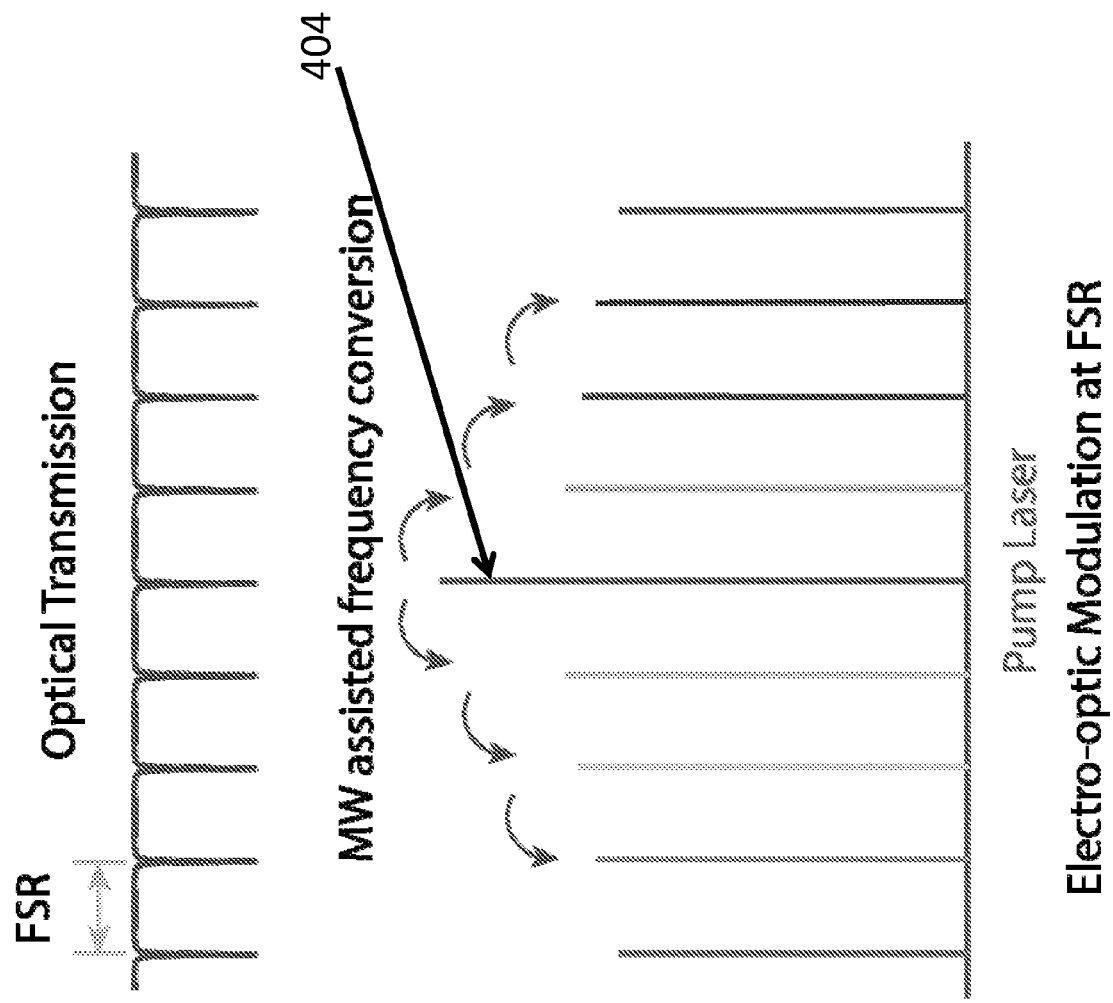
FIG. 4B is a visualization of the sideband generation process according to embodiments of the present disclosure.
Figure 4C:
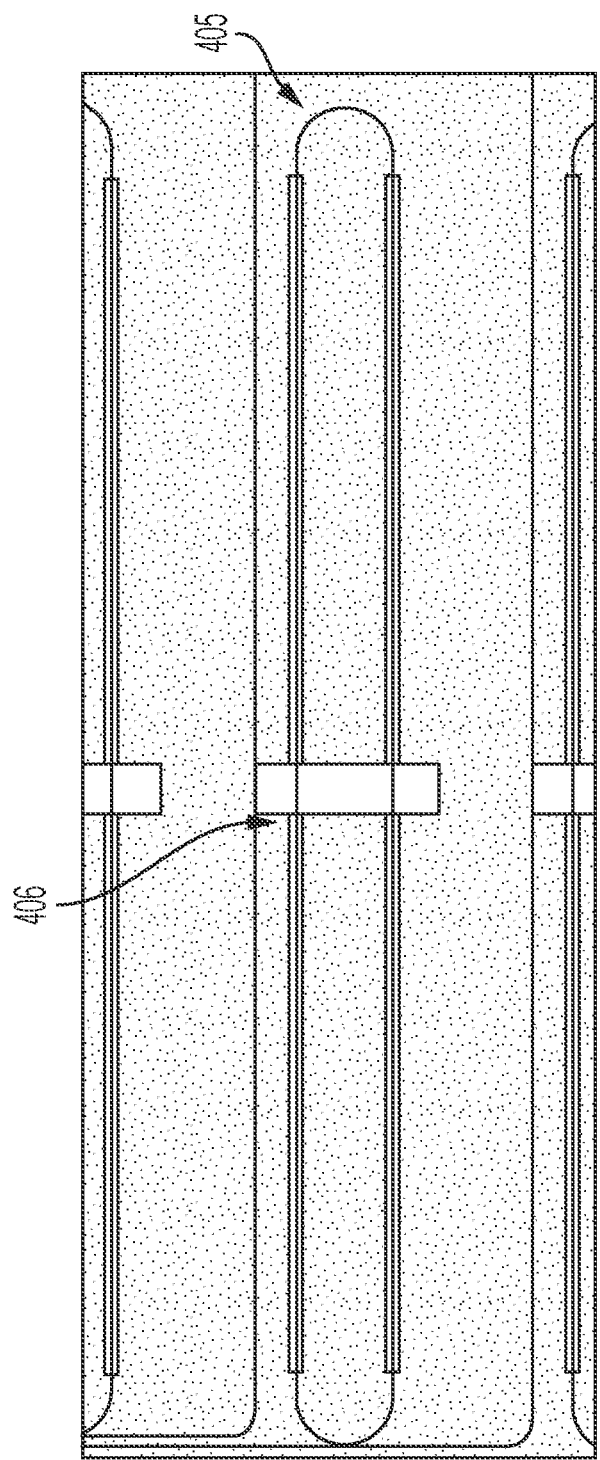
FIG. 4C is a microscope image of a fabricated lithium niobate resonator with microwave electrodes according to embodiments of the present disclosure.

FIG. 4A is a schematic of a microwave electrode geometry according to embodiments of the present disclosure. FIG. 4B is a visualization of the sideband generation process. High temporal confinement in high-Q resonators enhances cascaded sideband generation and flat comb output. FIG. 4C is a microscope image of a fabricated lithium niobate resonator with microwave electrodes.

FIGS. 4A-C illustrate the principle of operation of an exemplary device according to embodiments of the present disclosure. Optical microring resonator 401 is engineered to exhibit a periodic transmission spectrum with nearly equal free-spectral-range (FSR), while microwave electrodes 402 and 403 positioned along the circumference of the microring resonator modulate the refractive index of the ring (FIG. 4A). In various embodiments, the optical waveguide comprises lithium niobate or other electro-optic materials.

Electrodes 402 and 403 have opposite polarities, therefore, the index shift achieved by the top half of the electrodes is opposite in sign to the index shift achieved by the bottom half of the electrodes. This breaks the orthogonality between different optical modes in the ring resonator, thereby facilitating conversion to other modes. In alternative embodiments, mode conversion is achieved by only partially modulating the ring resonator, at the cost of halved efficiency.

Continuous-wave light is resonantly coupled into the cavity. When the electrodes are driven at a frequency equal to the FSR of the cavity, the newly generated optical carriers resonate in the cavity, enhancing the sideband generation process (FIG. 4B). For low-loss resonators, the power in the $m^{th}$ line away from the central carrier 404 is proportional to $$\exp\left(\frac{-|m|l}{\beta}\right),$$

where l is the round trip loss and $\beta$ is the modulation index. This indicates that a higher drive voltage and a lower internal loss will result in a flatter and broader comb.

A fabricated LiNbO$_3$ resonator is shown in FIG. 4C. It consists of waveguides 2 µm wide and 350 nm thick, residing on a 250 nm LiNbO$_3$ slab. Racetrack 405 comprises two straight arms that are 2.35 mm long, connected by two half-circles with a bending radius of 80 µm. The gold microwave electrodes 406 are placed 7 µm apart to preserve the optical quality factor while delivering high EO efficiency. The device, after integrating the microwave electrodes, exhibits a loaded quality factor of 3.3 million (l=1.47%).

Figure 5:
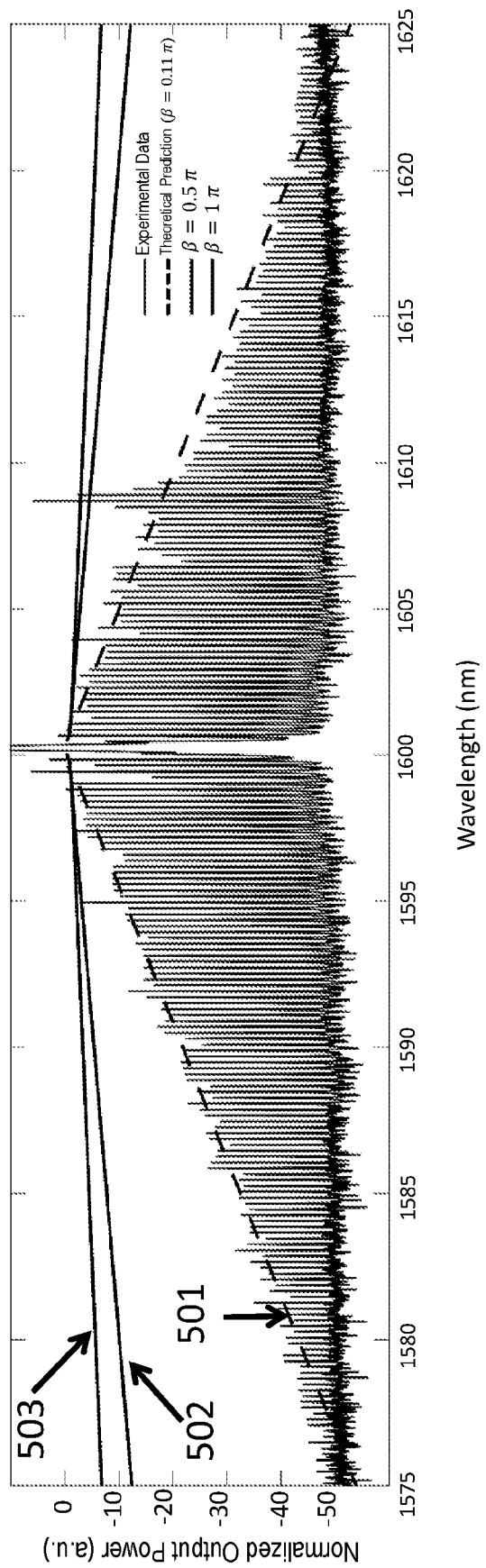
FIG. 5 is an optical power spectrum of the EO comb, normalized to the first generated carrier according to embodiments of the present disclosure.

FIG. 5 is an optical power spectrum of the EO comb, normalized to the first generated carrier, showing excellent agreement with theoretical prediction 501 (black dashed line). Calculated comb spectra with higher modulation indices $\beta$=0.5 $\pi$ and 1.5 $\pi$ (lines 502 and 503, respectively) show that an even flatter comb output is achievable.

FIG. 5 shows the output optical spectrum of the EO comb for a pump wavelength of 1600 nm and ~25 dBm microwave power at 23.93 GHz (modulation index $\beta$~0.11$\pi$). The calculated envelope 501 of the power spectrum is overlaid onto the experimental spectrum, showing excellent agreement. In addition, the theoretical output comb spectra at higher microwave powers (larger $\beta$) are plotted (lines 502 and 503). This can be achieved by increasing the efficiency of the modulator, further reducing the optical loss, and/or utilizing additional microwave amplifiers.

FIGS. 4A-C and FIG. 5 demonstrate an EO comb generator composed of an integrated LiNbO$_3$ microring resonator with microwave electrodes. The generated comb spectrum spans over 50 nm and matches well with the theoretical model. With improved design and higher driving voltage, it is possible to generate even wider EO combs. This integrated EO comb platform enables frequency comb generation at flexible wavelengths and with predictable comb line powers, opening paths forward for novel optical communication schemes and spectroscopy applications.

An integrated EO comb uses a relatively strong microwave driving power (>1 W). To mitigate the power requirements, the following design can be implemented (on-chip).

Figure 6A:
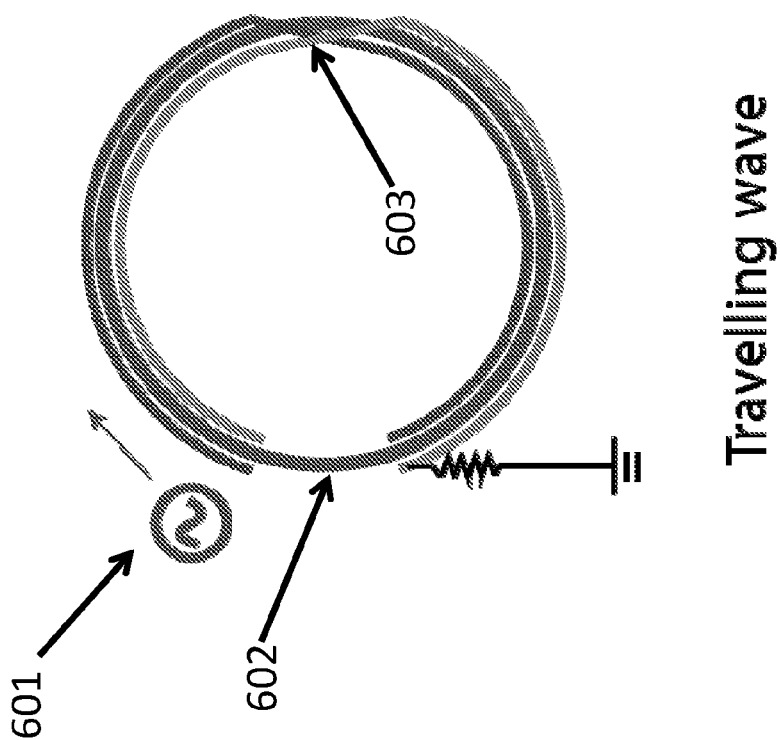
FIGS. 6A-B are schematic views of resonators configuration according to embodiments of the present disclosure.
Figure 6B:
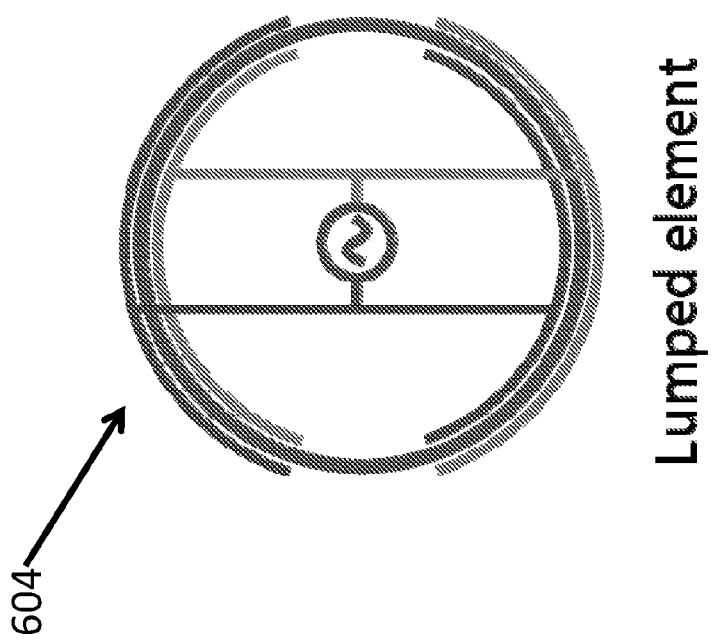

In FIG. 6, traveling microwave 601 is used as the driving electrodes. The travelling wave electrodes are designed in the same way as a traveling wave modulator, where the microwave co-propagates with light around resonator 602.

The microwave signal travels together with the light around the microring resonator with similar group velocities. At crossover point 603, the electrodes cross over each other, ensuring that the index induced on top and bottom halves of the ring resonator have the same electric field direction, thereby inducing refractive index changes of the same sign in both halves. This is in contrast to the non-traveling wave design 604 and that shown in FIG. 4A.

In this configuration, a much higher microwave bandwidth can be achieved, circumventing the RC bandwidth limit of the existing design.

Figure 7:
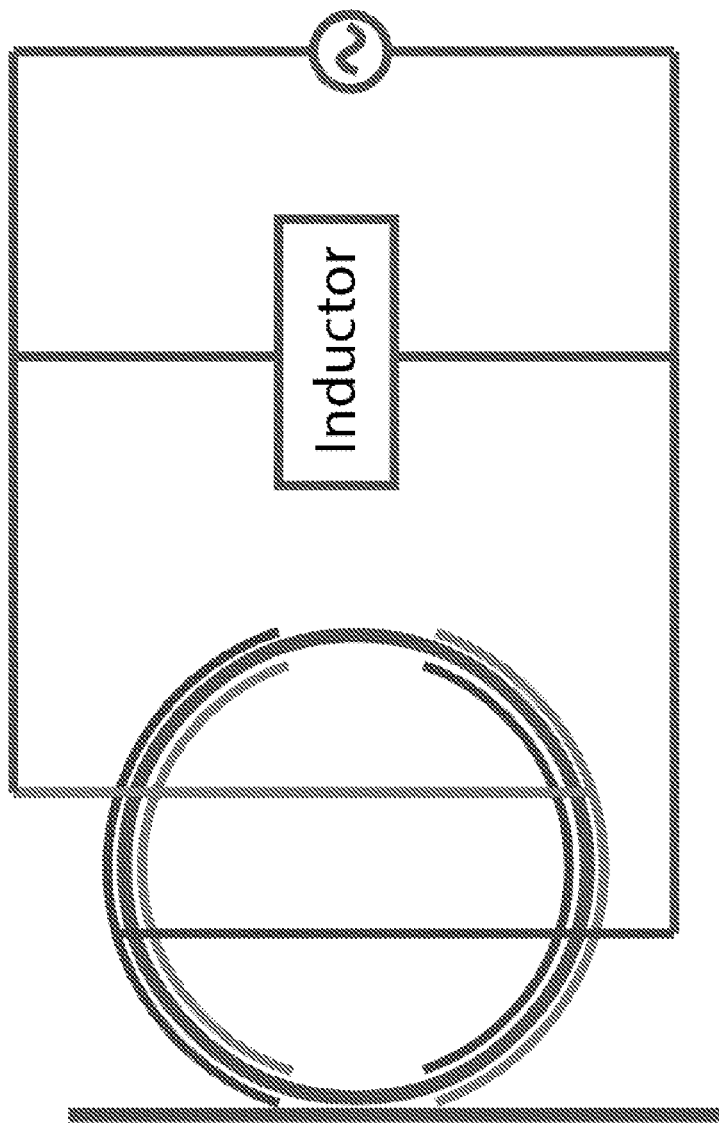
FIG. 7 is a schematic view of a resonator configuration according to embodiments of the present disclosure.

In FIG. 7, LC microwave resonators are used for efficiency microwave driving. Another design involves using a LC microwave resonator for enhanced microwave driving. Since only a narrowband microwave source is used, a high Q microwave resonator can amplify the microwave driving strength. This design can also be combined with the travelling wave design to simultaneously achieve strong and high frequency microwave modulation.

Combining $\chi(2)$ and $\chi(3)$ Combs.

EO comb and Kerr comb maybe achieved on the same device. In this device, the EO comb is fabricated as described above, and the waveguides are also designed to have anomalous GVD. The comb may be operated with either a strong microwave driving strength (EO comb dominated), or strong optical power (Kerr comb dominated) or anywhere in between (a dynamic combination or synchronization of any stable output states) where both EO and Kerr effects are strong.

The combined $\chi(2)$ and $\chi(3)$ comb has several benefits. In a Kerr comb, it is difficult to achieve locking (phase coherence between each lines). An EO comb can address this. An EO comb is difficult to achieve over a large bandwidth. A Kerr comb can address this. Synchronizing the two combs can allow for low noise, low power operations, and provide a method to synchronize remote frequency combs through a common microwave source.

$\chi(2)$ and $\chi(3)$ Combs Integrated Circuits

The integration of EO and Kerr combs on lithium niobate (or other $\chi(2)$) material allows for full scale active photonic circuits to be constructed. In comb generation materials other than LN, fast modulation cannot be achieved. Only LN integrated circuits can achieve both EO, Kerr and fast modulation at the same time. This enables comb generation and fast modulation on the same chip. Comb generation and nonlinear conversion on the same chip may include periodically-poled lithium niobate (PPLN) waveguides.

Figure 8:
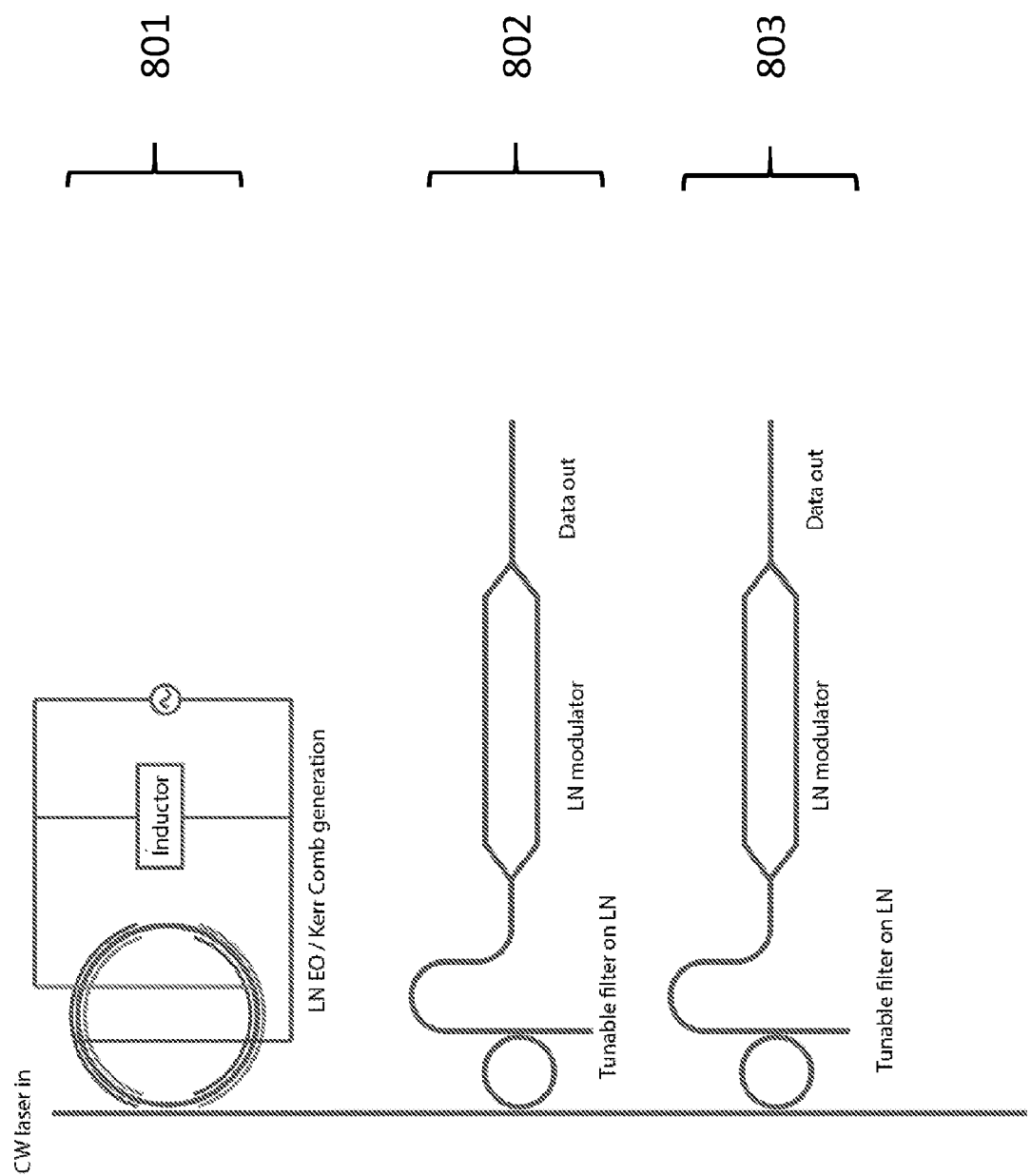
FIG. 8 is a schematic view of a resonator configuration according to embodiments of the present disclosure.

Referring to FIG. 8, integration of array of filters and modulators for coherent telecommunication applications is illustrated. Here the combs are generated on the first device 801 (EO, Kerr or EO+Kerr). Then the comb is passed through a series of filters 802 (here is ring add-drop filters) where individual comb lines are picked out. These lines may be individually processed (e.g., here modulated) through integrated LN electro-optic modulators 803 and then used or recombined using wavelength-division multiplexing for high bandwidth data communication.

Using a similar geometry, filters and modulators may be used for quantum entanglement control and generation.

The integrated combs may have soliton optical outputs (light bullets), that can be used for ranging and sensing. Here the comb would be integrated with arrays of phase modulators on the same chip and an output device (e.g., grating) for ranging.

Comb generating structure may be integrated with PPLN structures to allow converting comb frequencies on chip or in-situ.

Figure 34:
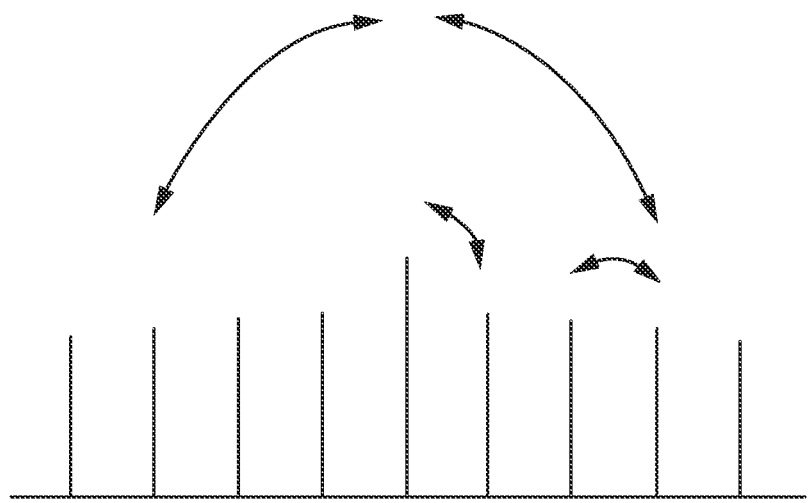
FIG. 34 is a visualization of a sideband generation process according to embodiments of the present disclosure.
Figure 34:
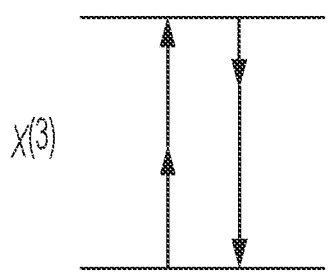

Referring to FIG. 34, a visualization of a sideband generation process according to embodiments of the present disclosure is shown. This sideband generation process is characteristic of Kerr combs, which rely on a spontaneous four-wave mixing process that is efficient to generate broad combs. In this process, two pump photons are converted to a signal and idler photon through the spontaneous process. Yet, the spontaneous process necessities a threshold to generate combs and the combs respond highly nonlinearly with respect to input optical power.

Figure 35:
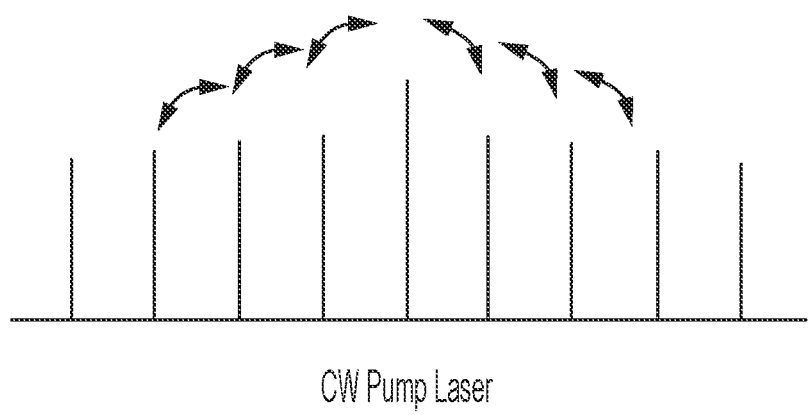
FIG. 35 is a visualization of a sideband generation process according to embodiments of the present disclosure.
Figure 35:
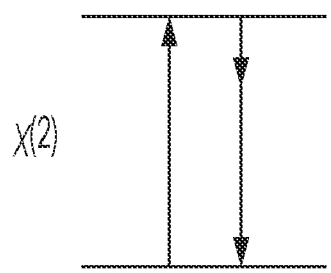

Referring to FIG. 35, a visualization of a sideband generation process according to embodiments of the present disclosure is shown. This sideband generation process is characteristic of EO combs, which rely on a seeded sum and difference frequency generation mechanism, which indicates a threshold-less comb generation process. Frequency combs are generated from the electro-optic effect, where the new frequencies are generated by sum and difference frequency generation between one optical pump photon and one microwave pump photon. However, to generate a broad EO comb, very strong EO modulation is required as the cascading EO process is inherently inefficient for generating a broad comb compared to the Kerr process.

Kerr combs based on $\chi^{(3)}$ nonlinearity and electro-optic frequency combs based on $\chi^{(2)}$ nonlinearity can be achieved separately on integrated lithium niobate (LN) nanophotonic platform, owing to LN's low loss and simultaneous strong material $\chi^{(2)}$ and $\chi^{(3)}$ nonlinearities. A microresonator with both EO and Kerr nonlinearities could combine the benefits of each mechanism and generate broad combs at low microwave and optical powers.

In the present disclosure, frequency combs generated from a microring resonator with simultaneous Kerr and electro-optic nonlinearities are disclosed. Experimental results show that in a tested resonator, the combined Kerr and EO processes can produce a broader comb than each individual process alone.

Figure 36:
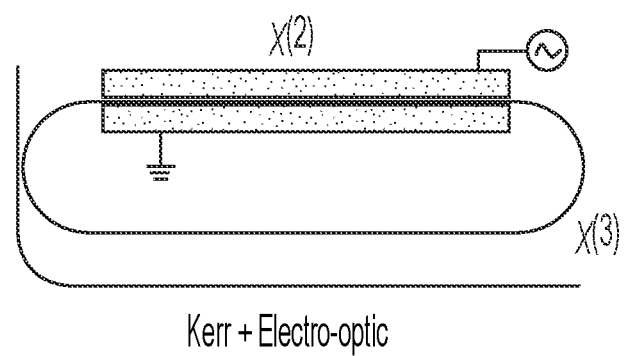
FIG. 36 is a schematic view of a combined Kerr and electro-optic comb generator according to embodiments of the present disclosure.

Referring to FIG. 36, is a schematic of a combined Kerr and EO comb generator according to embodiments of the present disclosure. In various embodiments, a micro-racetrack resonator is fabricated on a x-cut thin film lithium niobate on insulator platform. In this embodiment, the resonator is designed to combine dispersion engineering and electro-optic microwave drives to enable simultaneous Kerr and EO nonlinearity. The micro-racetrack resonator is designed to have a free-spectral-range (FSR) of ~30 GHz, which is accessible by microwave drivers. Typical loaded quality factors of such micro-racetracks are about $2 \times 10^6$.

Figure 37:
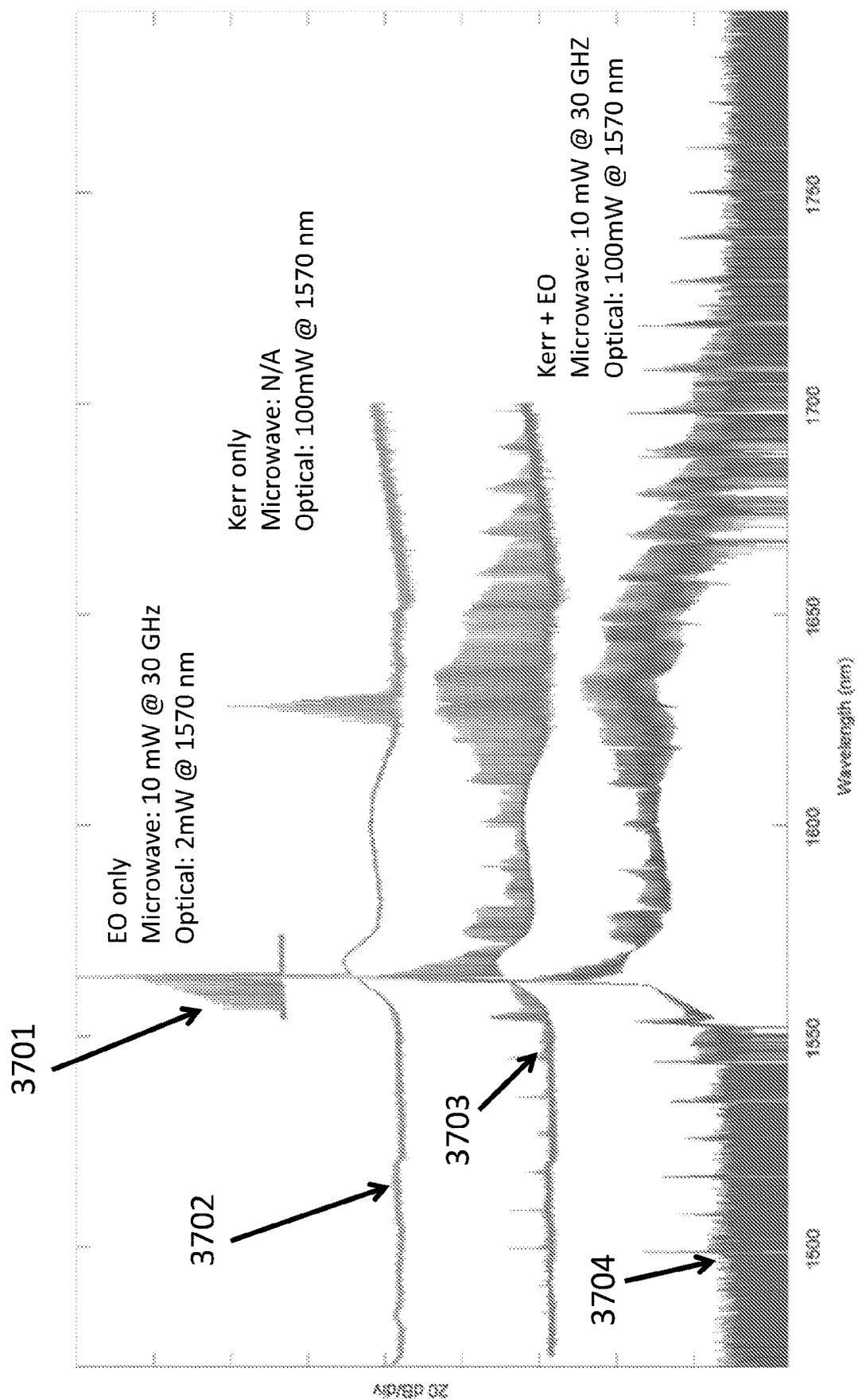
FIG. 37 is a plot of frequency combs generated by various comb generators according to embodiments of the present disclosure.

Referring to FIG. 37, a plot of frequency combs generated by various comb generators according to embodiments of the present disclosure is shown. In various experiments, a microring resonator was investigated under solely EO drive, at a low optical pump power of ~2 mW. No observable optical nonlinearity was induced. With the same resonator, a microwave drive at 10 mW and an optical drive of 2 mW, frequency comb 3701 is generated. The frequency comb is a narrow and single sided EO comb spanning 9 nm with sharp cutoff frequencies. This is due to the strong negative dispersion of the waveguide and mode crossing near the pump wavelength. Frequency comb 3702 is the result of driving by only a strong optical pump. The same microring resonator is used with a high optical pump power of ~100 mW, with no EO drive, and the outputted comb 3702 contains frequencies generated by only Raman shift and Kerr processes. A strong Raman peak is seen, shifted by ~55 nm to the red side of the pump at 1570 nm. The Raman peak further generated a mini-comb spanning~8 nm through the Kerr process. When the EO drive is set to 10 mW and the optical pump power is set to ~100 mW, combs 3703 and 3704, spanning over 300 nm, observed. Due to the high amplified spontaneous emission (ASE) noise in the EDFA used in the experiment, the comb lines are measured above an optical noise floor of ~−60 dBm. Combs 3703 and 3704 have the same microwave and optical driving powers, but are measured on different optical spectrum analyzers. Thus, EO and Kerr pumped resonators have the potential to generate broader frequency combs that that beyond the span of either mechanism alone.

Figure 9:
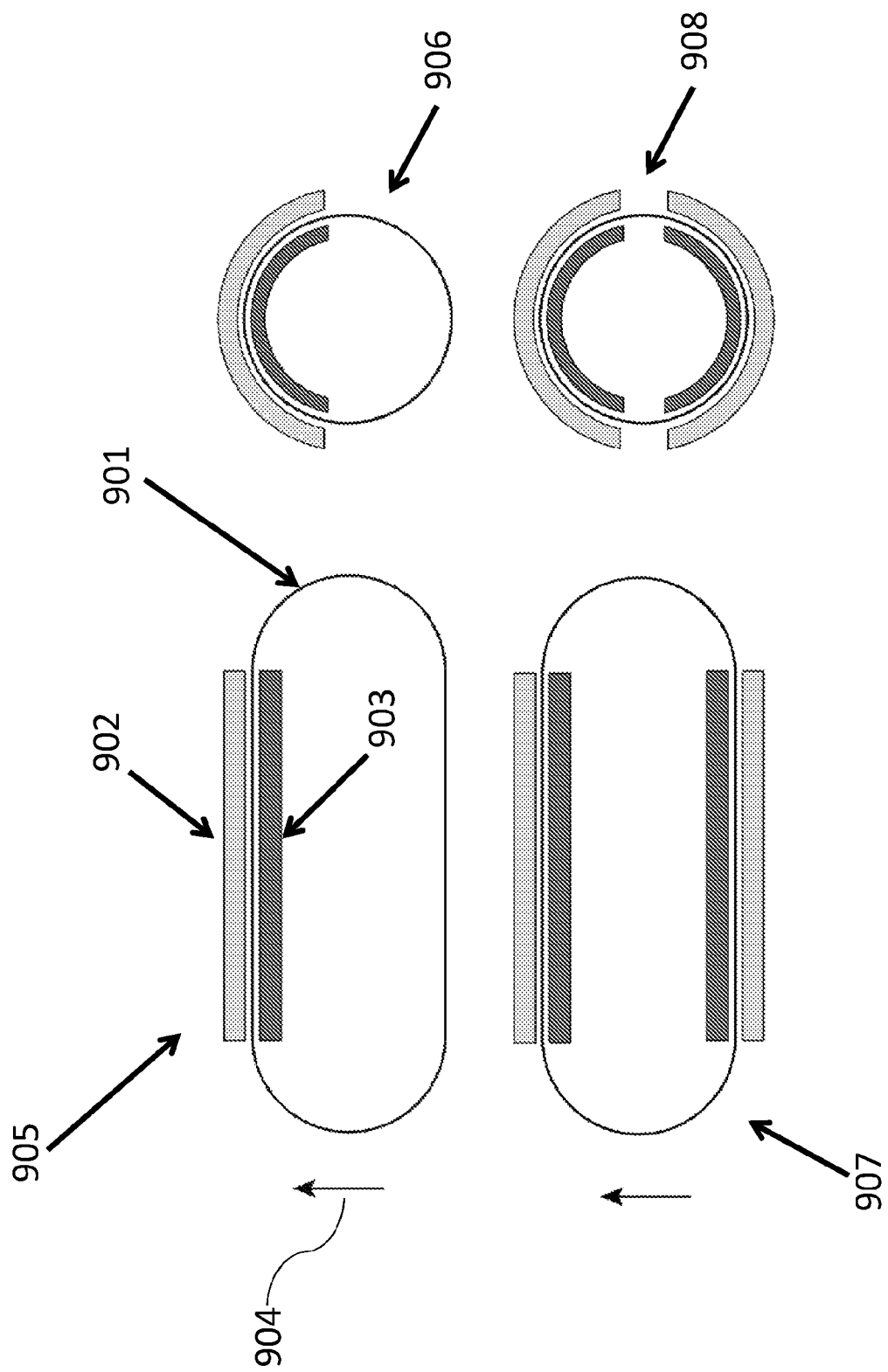
FIG. 9 is a schematic view of electrode configurations according to embodiments of the present disclosure.

Referring to FIG. 9, various embodiments of an electrode configuration for an integrated lithium niobate microring resonator are shown. Black lines 901 indicate optical waveguides. Light shaded region 902 and dark shaded region 903 indicate metal electrodes, with the light shaded region and the dark shaded region having opposite electrical polarity. One electrode of a certain polarity is placed on the inside of the waveguide structure 901, and another electrode of an opposite polarity is placed on the outside of the waveguide structure, allowing for an electric field to be present between them. The electric field formed between these two electrodes will have a significant component along the crystal's extraordinary axis, indicated by the direction of arrow 904. If the component of the electric field parallel to the extraordinary axis is in the same direction as the axis, then it will induce a positive index change, and if the component is antiparallel to the axis, then it will induce a negative index change. Thus, in the embodiments of FIG. 9, the electrodes are configured such that the induced index in the top half of optical waveguide is opposite in sign to the induced index in the bottom half. Configurations 905 and 906 contain electrodes only on a portion of the ring resonator, while configurations 907 and 908 have electrodes on both the top and bottom portions of the resonator.

Figure 10:
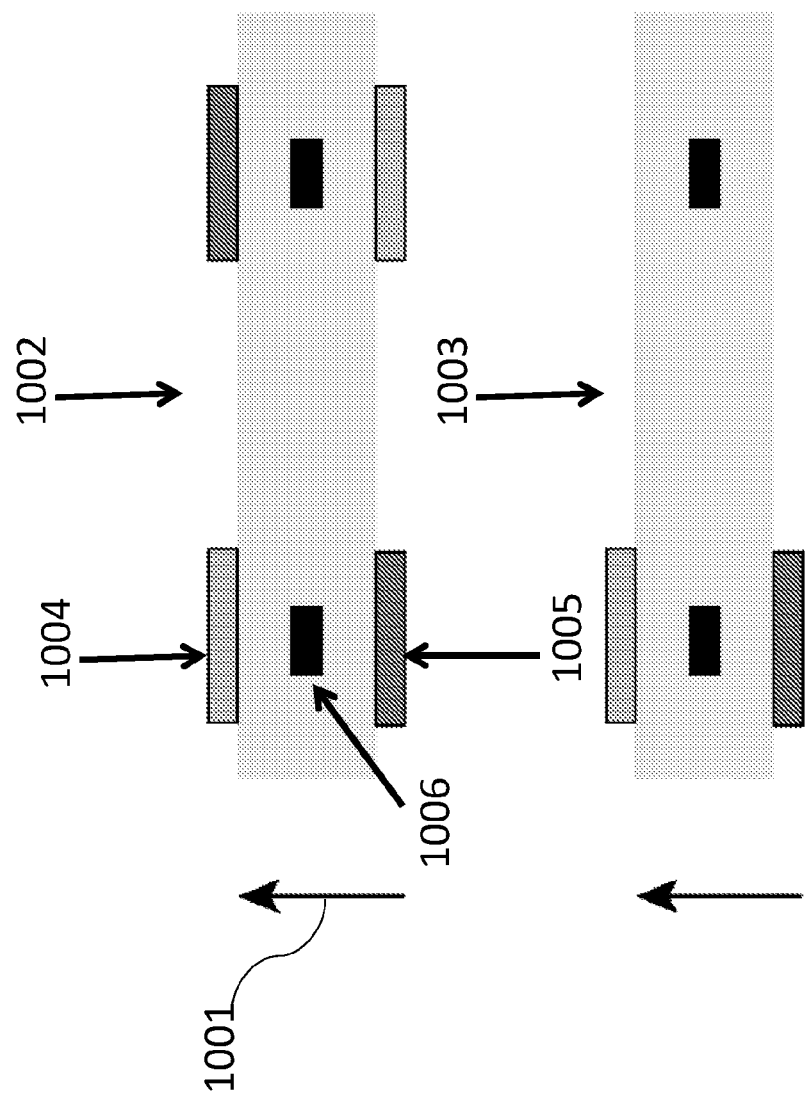
FIG. 10 is a cross-sectional view of electrode configurations according to embodiments of the present disclosure.

Referring to FIG. 10, cross sectional views of two electrode configurations are shown. In this diagram, the crystal's extraordinary axis, represented by the direction of arrow 1001 is perpendicular to the wafer plane. Lightly shaded region 1004 and darkly shaded region 1005 represent electrodes, the lightly shaded region having a polarity opposite that of the darkly shaded region. One electrode of a certain polarity is placed underneath the ring resonator 1006, and another electrode of an opposite polarity is placed above the ring resonator, allowing for an electric field to be present between them with a component either parallel or antiparallel to crystal's extraordinary axis 1001. In embodiment 1002, electrodes are placed above and below the ring resonator on two portions of the ring resonator, such that the electric field generated in the two portions are in opposite direction to each other. In alternative embodiment 1003, electrodes are only placed above and below the ring resonator on one portion of the ring resonator, allowing for partial modulation.

Figure 11A:
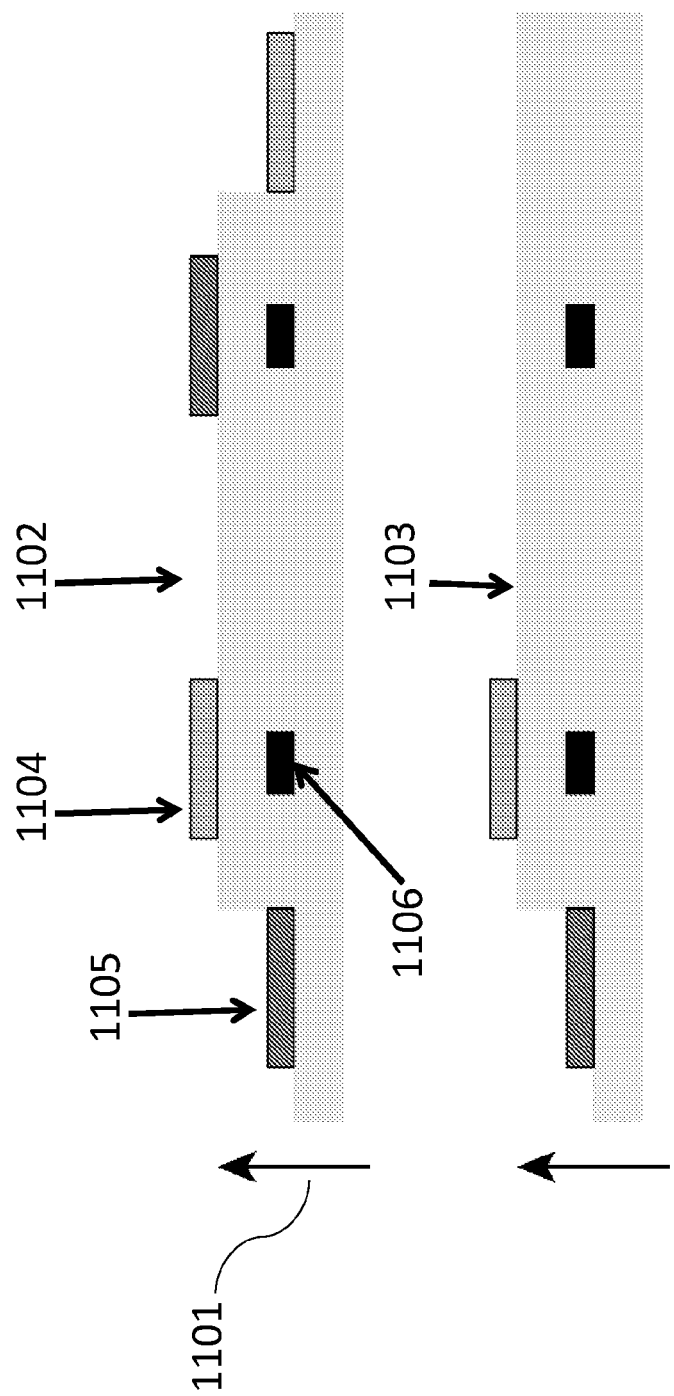
FIG. 11A is a cross-sectional view of electrode configurations according to embodiments of the present disclosure.

Referring to FIG. 11A, cross sectional views of two electrode configurations are shown. In this diagram, the crystal's extraordinary axis, represented by the direction of arrow 1101 is perpendicular to the wafer plane. Lightly shaded region 1104 and darkly shaded region 1105 represent electrodes, the lightly shaded region having a polarity opposite that of the darkly shaded region. One electrode of a certain polarity is placed above the ring resonator 1106, and another electrode of an opposite polarity is placed to the side of the ring resonator, allowing for an electric field to be present between them with a component either parallel or antiparallel to crystal's extraordinary axis 1101. This embodiment of the electrode configuration allows for easier fabrication. In embodiment 1102, electrodes are placed above and to the side of the ring resonator on two portions of the ring resonator, such that the electric field generated in the two portions are in opposite direction to each other. In alternative embodiment 1103, electrodes are only placed above and to the side of the ring resonator on one portion of the ring resonator, allowing for partial modulation.

Figure 11B:
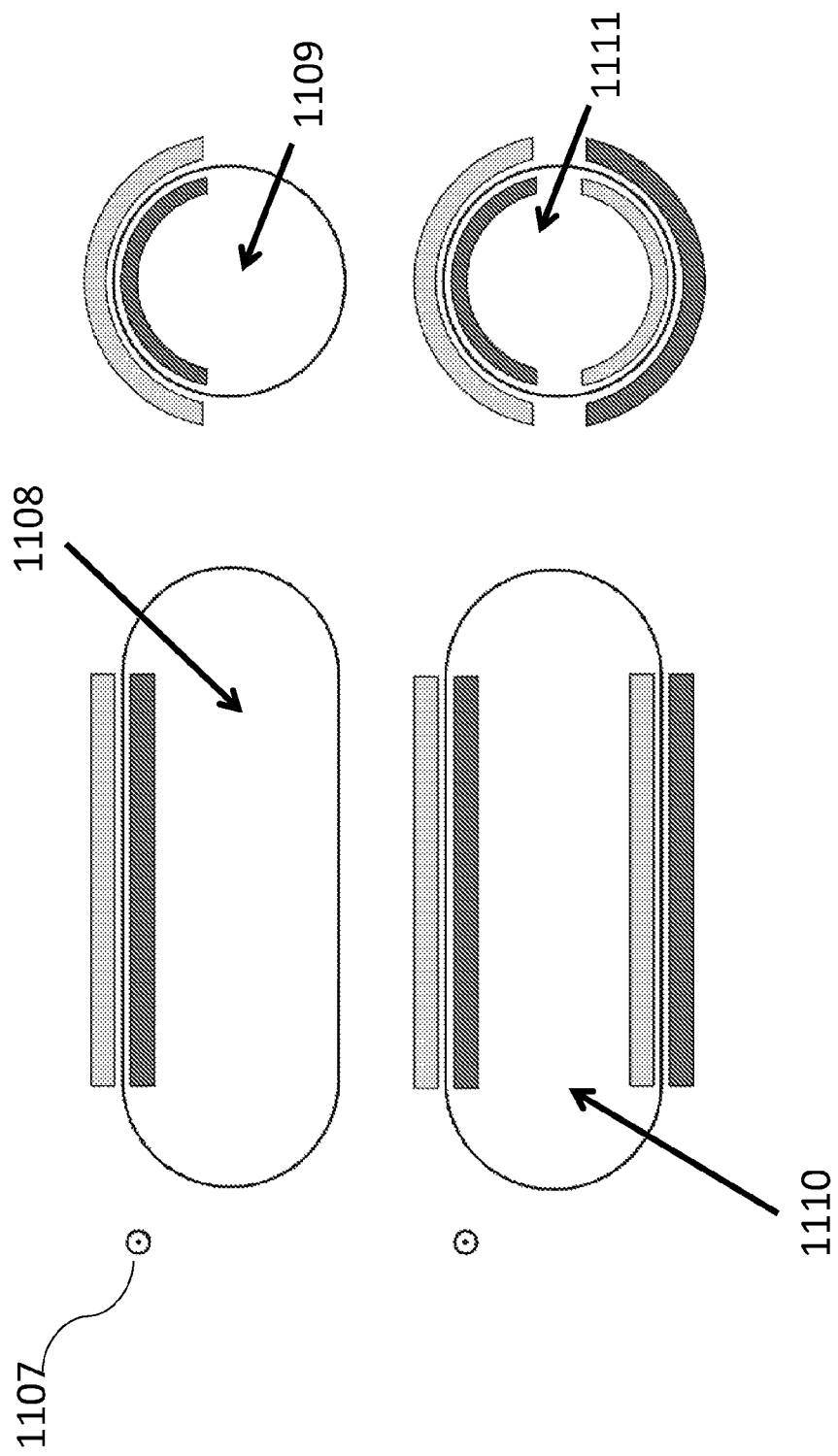
FIG. 11B is a schematic view of electrode configurations according to embodiments of the present disclosure.

Referring to FIG. 11B, top views of the embodiments of FIG. 11A are shown. In this diagram, the crystal's extraordinary axis, represented by the direction of arrow 1107 is perpendicular to the wafer plane, and is shown as coming out of the plane of the page. Electrode configurations 1108 and 1109 correspond to the partially modulated electrode configuration 1103 in FIG. 11A, while electrode configurations 1110 and 1111 correspond to the electrode configuration 112 of FIG. 11A.

Figure 12:
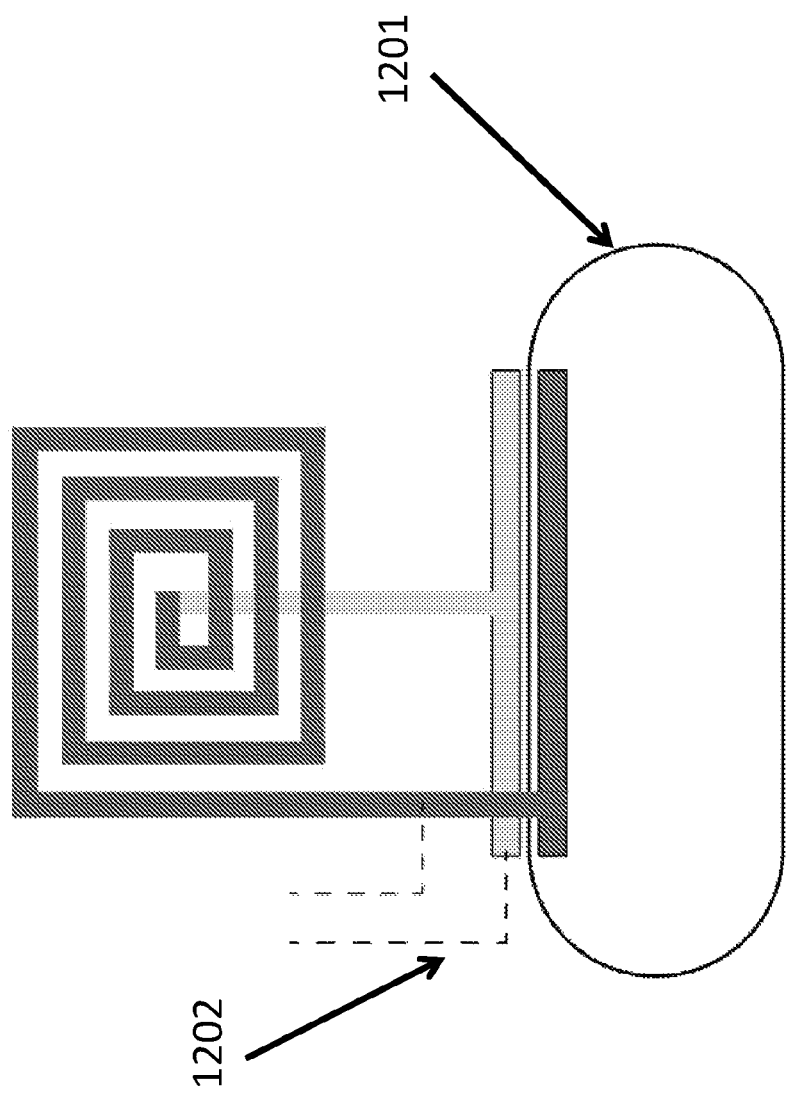
FIG. 12 is a schematic view of an electrode configuration according to embodiments of the present disclosure.

Referring to FIG. 12, a schematic of an electrode configuration is shown. A microwave inductor is used in conjunction with a capacitor driver to achieve microwave resonances that improve the microwave driving efficiency. The capacitor driver is placed around waveguide 1201, and interfaces with external electrical circuits for input and output via a channel represented by dotted lines 1202.

Figure 13:
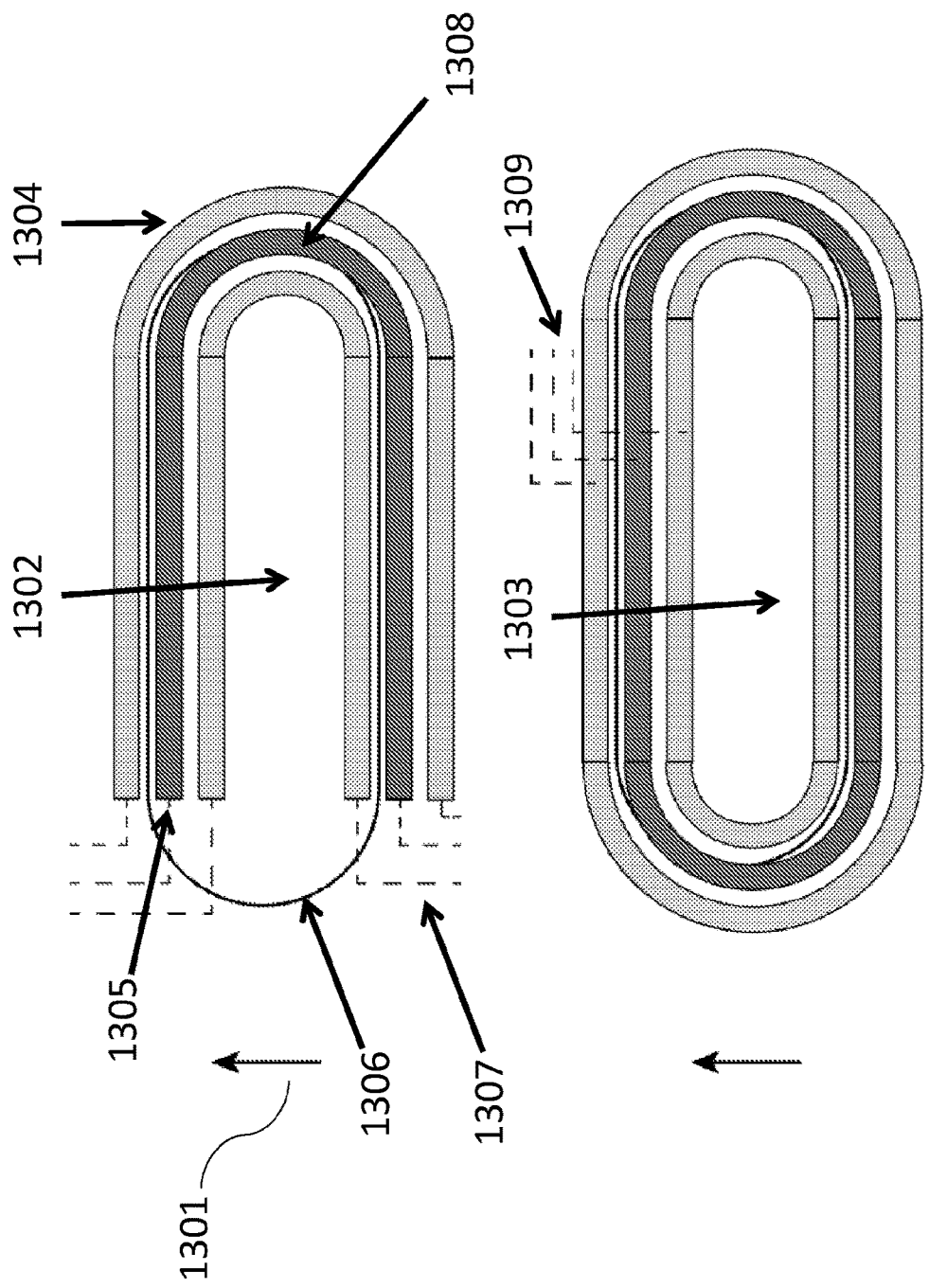
FIG. 13 is a schematic view of resonator configurations according to embodiments of the present disclosure.

Referring to FIG. 13, a schematic of a traveling wave configuration is shown. In this diagram, the crystal's extraordinary axis is indicated by arrow 1301. Lightly shaded regions 1304 and darkly shaded region 1305 represent electrical transmission lines, with the lightly and darkly shaded regions wired to ground and an input signal, respectively, via electrical connections 1307. One of the ground transmission lines 1304 is placed inside waveguide ring 1306, and the other is placed outside of it. Signal transmission line 1305 crosses over the waveguide ring in bending region 1308, so that a portion of it is inside the waveguide ring and a portion is outside of it. This ensures that the index shift induced in the top and bottom regions of the waveguide ring have the same sign. In configuration 1302, the electrical transmission lines only partially cover the waveguide ring. In configuration 1303, the electrical transmission lines are configured in a closed loop, and the external connections 1309 are connected to an inductive or capacitive coupling element that ensures that the microwave driving signal propagates in a direction matching that of the optical circulating signal in the waveguide.

Figure 14A:
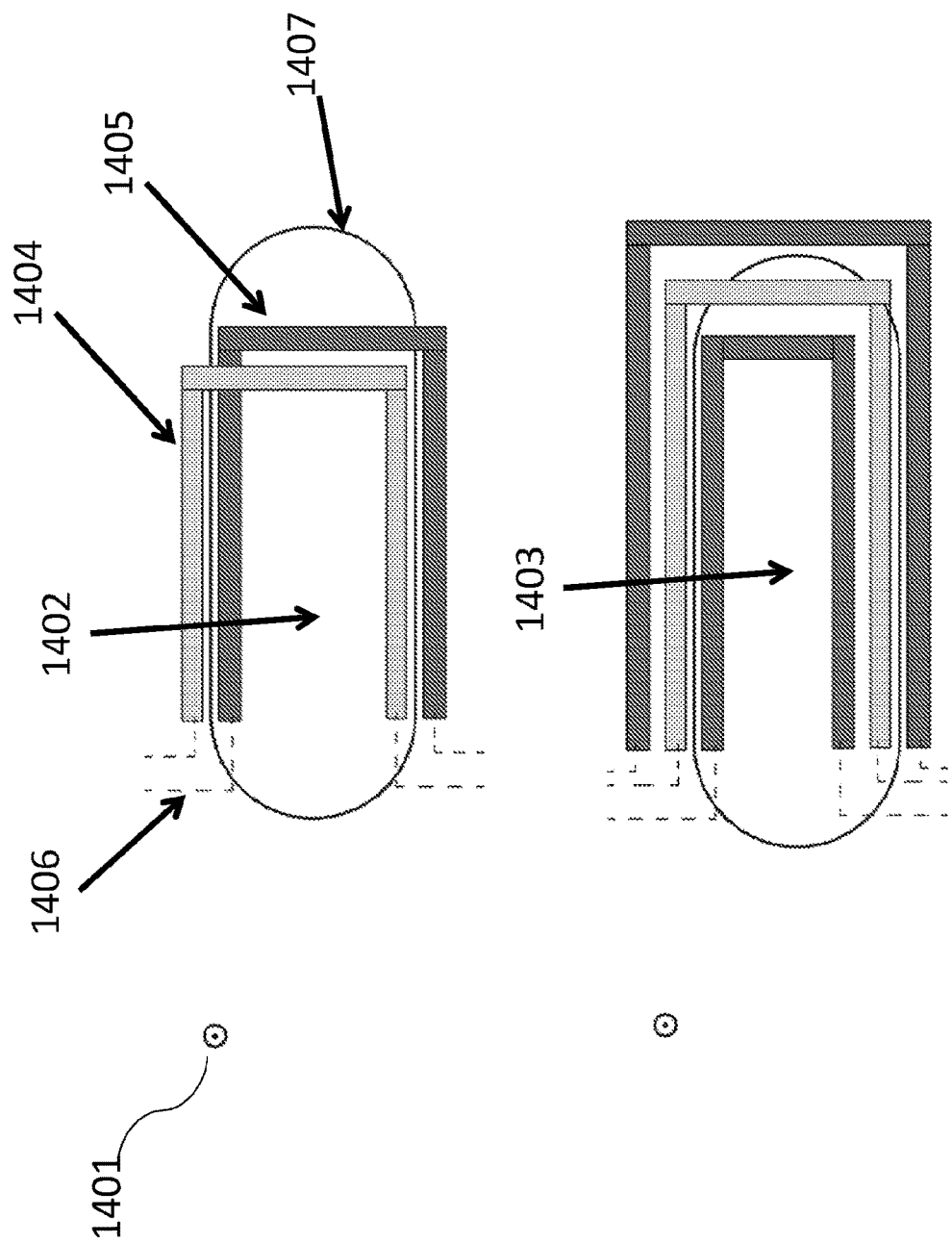
FIG. 14A is a schematic view of resonator configurations according to embodiments of the present disclosure.
Figure 14B:
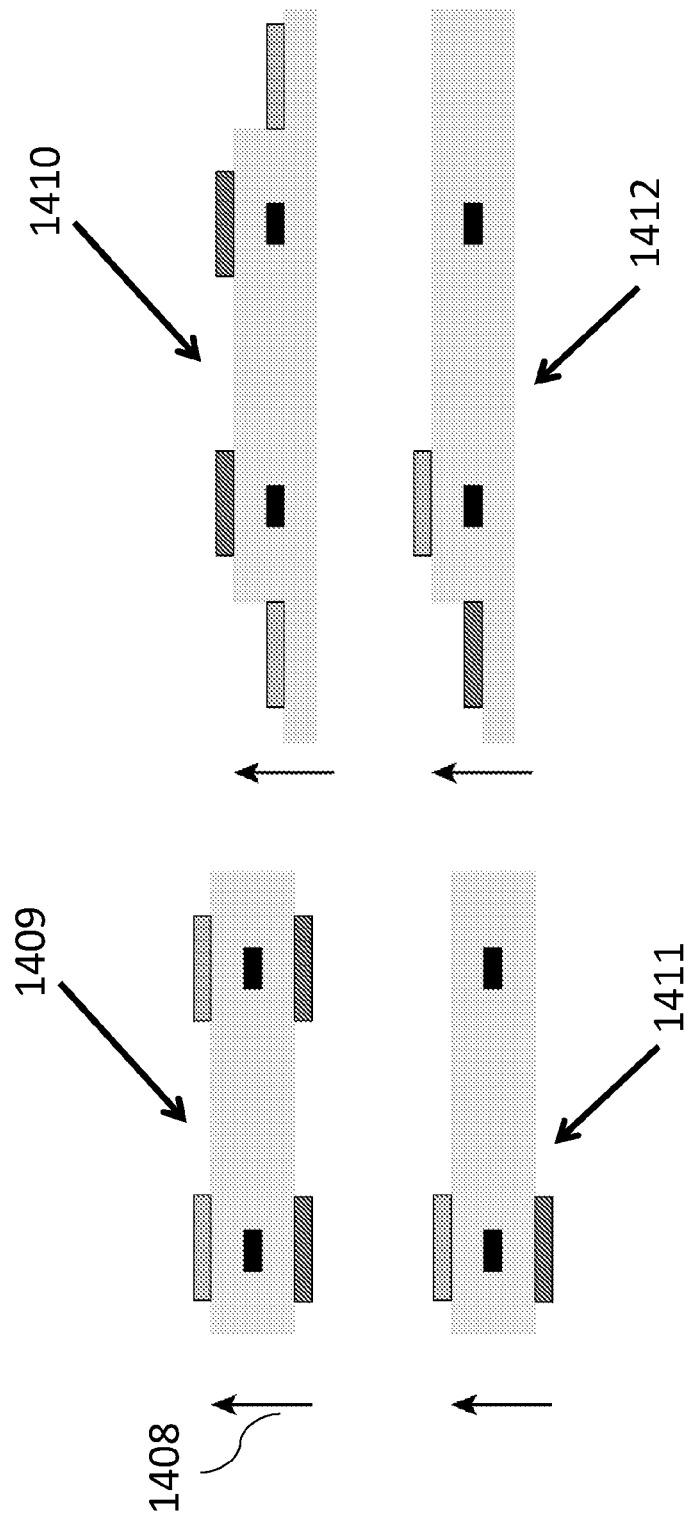
FIG. 14B is a cross-sectional view of resonator configurations according to embodiments of the present disclosure.

Referring to FIGS. 14A-B, a schematic view of a traveling wave configuration is shown. In this diagram, the crystal has a z-cut configuration, with its extraordinary axis indicated by arrows 1401 and 1408. Lightly shaded regions 1404 and darkly shaded region 1405 represent electrical transmission lines, with the lightly and darkly shaded regions wired to an input signal and ground, respectively, via electrical connections 1406. The electrical transmission lines are placed with the signal transmission line 1404 either above, below, or to the side of the waveguide ring 1407, and the ground transmission line placed such that the electric field between the two transmission lines has a component parallel to the crystal's extraordinary axis. This creates an index shift that is in the same direction throughout affected portions of the waveguide ring. Referring to FIG. 14A, configurations 1402 and 1403 vary in the number of transmission lines used and the length of the waveguide covered by the transmission lines. Referring to FIG. 14B, configurations 1409 and 1410 correspond to configurations 1402 and 1403, with configuration 1410 having a transmission line placed to the side of the waveguide, as opposed to below, which allows for easier fabrication. In configurations 1411 and 1412, the transmission lines only partially cover the circumference of the waveguide ring, the configuration 1412 being easier to fabricate.

Figure 15:
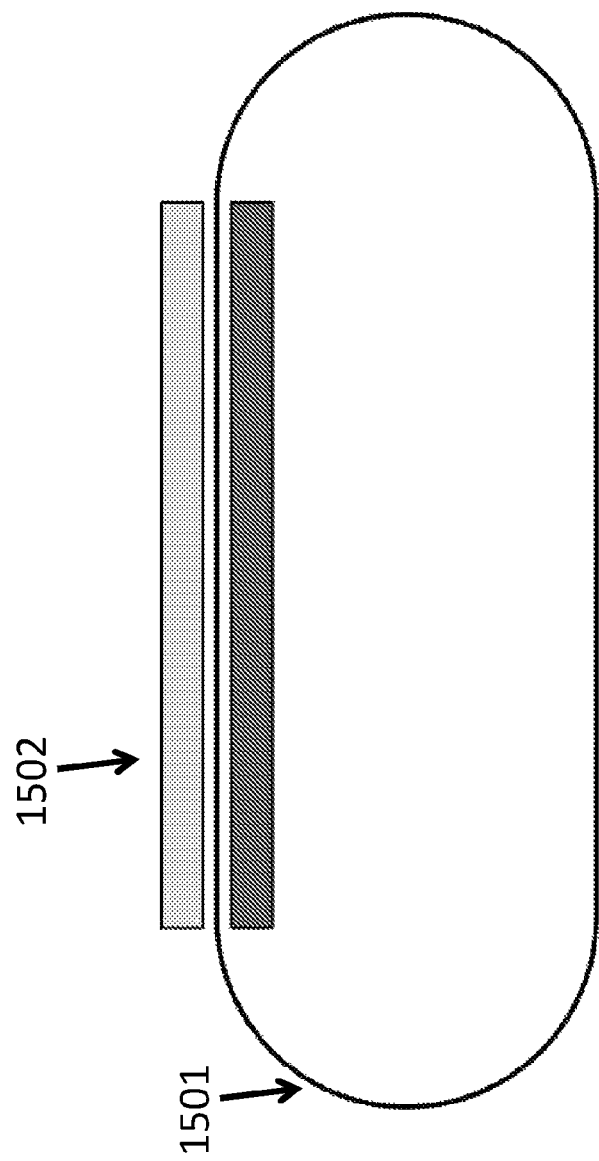
FIG. 15 is a schematic view of a resonator configuration according to embodiments of the present disclosure.

Referring to FIG. 15, a schematic of a combined EO/Kerr comb is shown. The ring 1501 is dispersion engineered to have Kerr nonlinearity, and electrodes 1502 are also placed around the waveguide to achieve the EO effect.

Optical frequency combs are useful for many different areas of science, ranging from sensing to telecommunications. One desirable comb feature is high optical power, which often reduces the effects of noise. A limitation on comb generators based on microresonators, such as lithium niobate ring resonators, is their efficiency in generating the comb. In particular, in order to create flat and broad combs, the interaction between light in the input waveguide and light inside of the resonator must be small. However, this effect results in less light in the output comb.

A way to address this limitation is to try to efficiently trap light inside the microresonator, where the comb is formed. Ideally, this would involve a coupler that was totally transparent at the input light wavelength, but very reflective at all other wavelengths. This way, the input laser is efficiently coupled into the resonator, while the newly generated comb inside the resonator cannot escape, due to the high reflectivity at the other wavelengths. However, a coupler with these properties could be extremely difficult to make and is not a practical solution.

A solution provided below is to use a ring as a wavelength-dependent coupler. By tuning the circumference of the small ring, there is a circumference for which the input laser is efficiently coupled into the larger ring, while other wavelengths are reflected. The details of this effect are discussed below. This design requires an additional waveguide for the output comb. This is provided in this design because the comb cannot travel back through the small ring coupler.

While a ring coupler is extremely useful, and easy to fabricate, there are design trade-offs. For example, this design increases the power in some parts of the comb by 14 dB, a significant improvement. However, for comb wavelengths far away from the input, the power can be the same or even smaller. This effect occurs due to the fact that there are limits on how small of a ring coupler can be made. All rings have a property called the free spectral range (FSR), which in this context is a measure of the total wavelength span over which the ring is periodic. In other words, any ring will be transparent to multiple wavelengths, the FSR is a measure of how far apart those wavelengths are. For the design described below, the FSR limits the total width of the comb because once other wavelengths can travel through the ring coupler, the efficiency of the comb generation process decreases. While a finite FSR does limit the power in some parts of the comb, this effect can also be used to our advantage. By designing or tuning the FSR of the small ring to be a non-integer multiple of the large ring FSR, the comb can be broadened.

Optical frequency combs have uses ranging from metrology and precision time-keeping to spectroscopy and optical communications. Often, these varied applications require combs with vastly different characteristics. For example, precision timing applications require combs that span a full octave, while applications in spectroscopy often require combs whose frequency spacing can be easily change. For use in optical communications, combs may have narrower width than in other applications but must be flat and have high optical power.

Optical frequency combs can be generated by several different methods. Mode-locked lasers, for example, can output wide combs in different wavelength ranges. Frequency combs can also be generated through parametric generation, via the $\chi(3)$ nonlinearity in optical fibers or resonant structures. Comb generators based on high-Q nonlinear resonators have desirable output properties. However, the formation dynamics of these comb generators is complex and their noise properties are still not fully understood. Finally, flat and high-power combs useful for optical communications can be generated by electro-optic (EO) modulation of a single-frequency optical field, but the power consumption of these comb generators is often too high.

Resonator-enhanced electro-optic (RE-EO) comb generators, which couple light into a free-space or fiber-based resonators containing an EO modulator, have been studied for over four decades and are more efficient than comb generators based on cascaded modulation. Early RE-EO comb generators, implemented in lossy free-space resonators with bulky components are sensitive to fluctuations in the input optical frequency and modulation frequency, increasing the locking requirements of the comb generator. Low-loss integrated technologies enable RE-EO comb generators whose modulation frequency can equal the resonator free spectral range (FSR), corresponding to a different regime of operation. The effects due to a non-resonant input optical frequency and modulation frequency have been discussed in experimental contexts, but an exact analytical form for the output has not been determined.

Additionally, low coupling between the input optical field and the resonator is crucial to ensure that the intra-resonator optical field is modulated many times before being output-coupled, but results in conversion efficiencies less than 5%. Nevertheless, free-space RE-EO comb generators with higher conversion efficiencies have been experimentally demonstrated by including an additional coupling resonator before the comb-generating resonator. While this concept is common for free-space comb generators, a dual-resonator design tailored to integrated ring-resonators is not well-known.

The present disclosure provides for analysis of the output spectrum and noise properties of a ring-based RE-EO comb generator for resonant and non-resonant operation, i.e., when the optical and modulation frequencies are resonant and non-resonant with the FSR, respectively. To model frequency-dependent propagation such as dispersion, two numerical models to determine the output comb spectrum were developed and validated. To increase the output optical power of the comb, a dual-ring RE-EO comb generator is proposed that is composed of a small coupling ring, which traps light at the input optical frequency, and a larger comb-generating ring that contains a phase modulator. According to some embodiments, this comb generator design offers an average increase in comb line power of 14 dB and meets the optical signal-to-noise ratio (OSNR) requirements of an inter-data center wavelength division-multiplexed (WDM) optical communications link.

Figure 38:
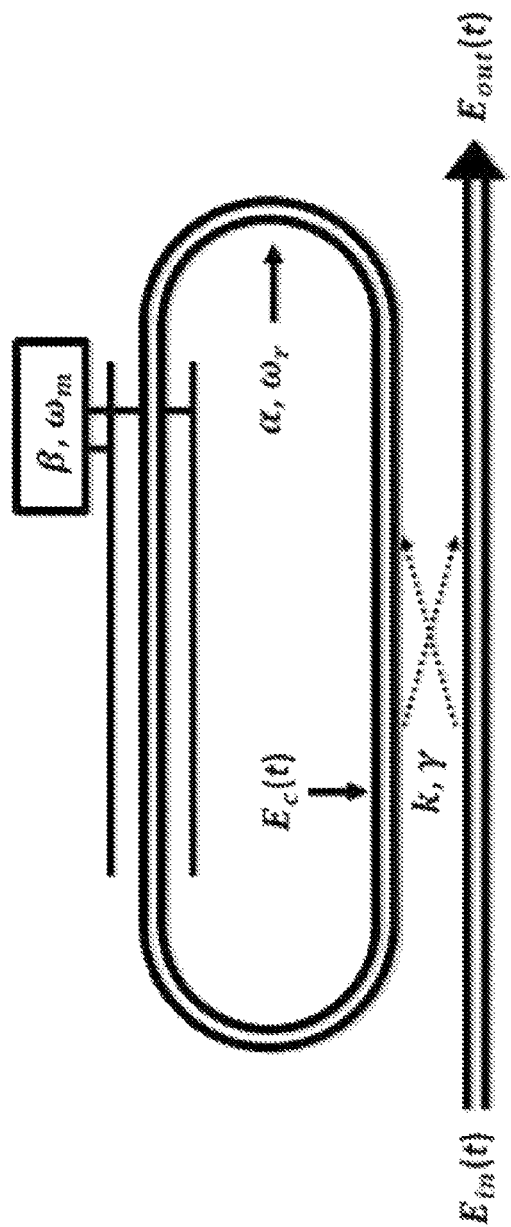
FIG. 38 is a schematic view of a RE-EO comb generator based on a ring resonator according to embodiments of the present disclosure.

Referring now to FIG. 38, a RE-EO comb generator based on a ring resonator is shown. Light is coupled into the resonator with coupler power transmission k and power insertion loss $\gamma$. In the resonator with FSR $\omega_r$, the light experiences round trip power loss $(1-\alpha)$ and ideal, lumped phase modulation with modulation frequency $\omega_m$ and modulation index $\beta$. The intra-resonator field $E_c(t)$ is discussed below. A single-frequency optical field $E_{in}(t)=\hat{E}_{in}e^{i\omega_0 t}$ is coupled into a resonator that contains a phase modulator. Once inside the low-loss resonator, light passes through the phase modulator many times, accumulating a sinusoidal time dependent phase, before being output-coupled into the original waveguide. The complex output optical field, $E_{out}(t)$, can be expressed as an infinite sum of time-shifted, phase-modulated copies of the input optical field $$E_{out}(t) = \sqrt{(1-\gamma)(1-k)}\,E_{in}(t) - k\sqrt{\frac{1-\gamma}{1-k}}\sum_{n=1}^{\infty} r^n e^{i\beta F_n(\omega_m t)} E_{in}(t-nT), \quad (1)$$

where the parameters k and $\gamma$ are the coupler power transmission and the power insertion loss, respectively. The resonator has a FSR of $\omega_r$ at the input optical frequency $\omega_0$ and roundtrip time $T=2\pi/\omega_r$. The cumulative round-trip field gain is $r=\sqrt{\alpha(1-\gamma)(1-k)}$, where the light experiences roundtrip power loss $(1-\alpha)$. Ideal, lumped phase modulation occurs at modulation frequency $\omega_m$ and modulation index $\beta$. A cascaded modulation function $$F_n(\omega_m t) = \sum_{i=1}^{n} \sin\omega_m(t - iT), \quad (2)$$

is defined where the term $\beta F_n(\omega_m t)$ is the accumulated time-dependent phase of the internal field in its nth round trip. Notably, the second term in (1) contains an additional factor of $\sqrt{k/(1-k)}$.

When the optical input frequency and the modulation frequency are resonant with the FSR ($\omega_0 T$ and $\omega_m T$ are integer multiples of $2\pi$, respectively), the output optical field is $$E_{out}(t) = \sqrt{(1-\gamma)(1-k)}\hat{E}_{in}e^{i\omega_0 t} - k\sqrt{\frac{1-\gamma}{1-k}}\frac{re^{i\beta\sin\omega_m t}}{1-re^{i\beta\sin\omega_m t}}\hat{E}_{in}e^{i\omega_0 t}. \quad (3)$$

Figure 39A:
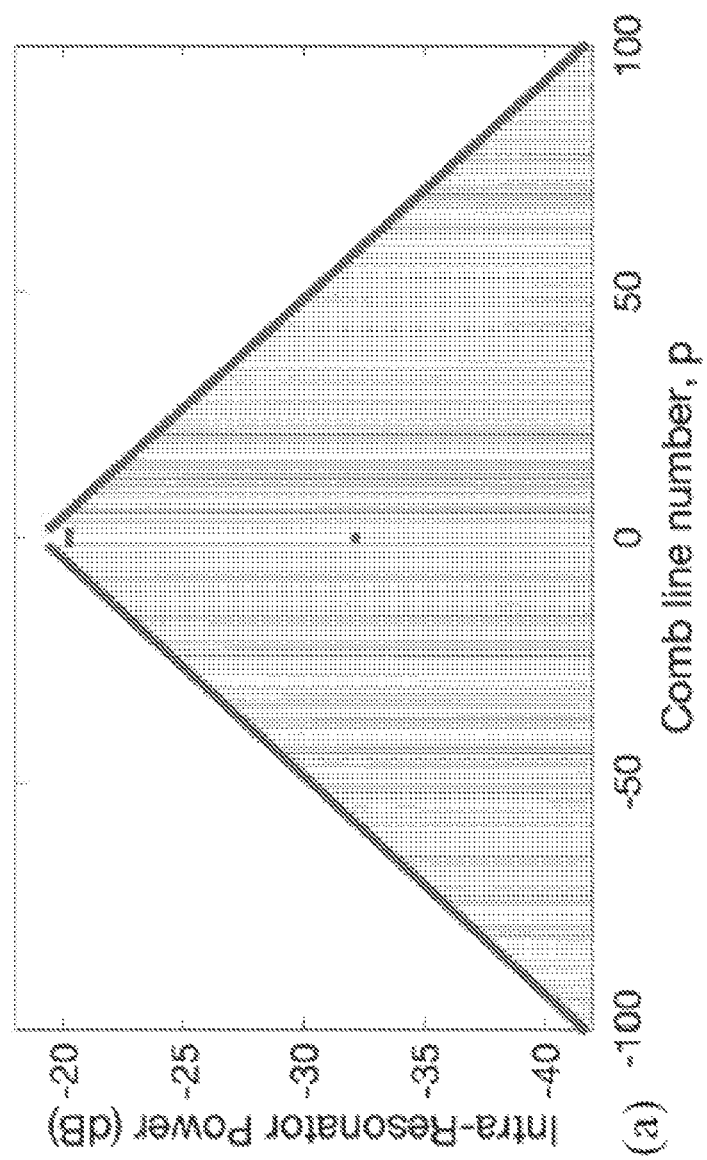
FIGS. 39A-B are plots of the intra-resonator power spectrum according to embodiments of the present disclosure.

Referring to FIG. 39A, the intra-resonator power spectrum for k=0.03, $\gamma$=0, $\alpha$=0.95, $\beta$=$\pi$/2, and $P_{in}=|\hat{E}_{in}|^2$==1 is shown. These values are consistent with state-of-the-art fabrication technology, and unless otherwise noted, these are the default parameters used for the rest of this disclosure. The intra-resonator optical field is composed of hundreds of single frequency components spaced at the modulation frequency, with a large dip at the center frequency. The output comb, however, has a large peak at the input optical frequency due to the unmodulated light that passes through the coupler. The horizontal axis in FIG. 39A is frequency, normalized to the resonator FSR (i.e., p=$\omega/\omega_r$). When comb spectra are plotted, the vertical lines that indicate that the comb is composed of distinct frequency components are omitted, and instead, only the comb envelope is shown.

Figure 39B:
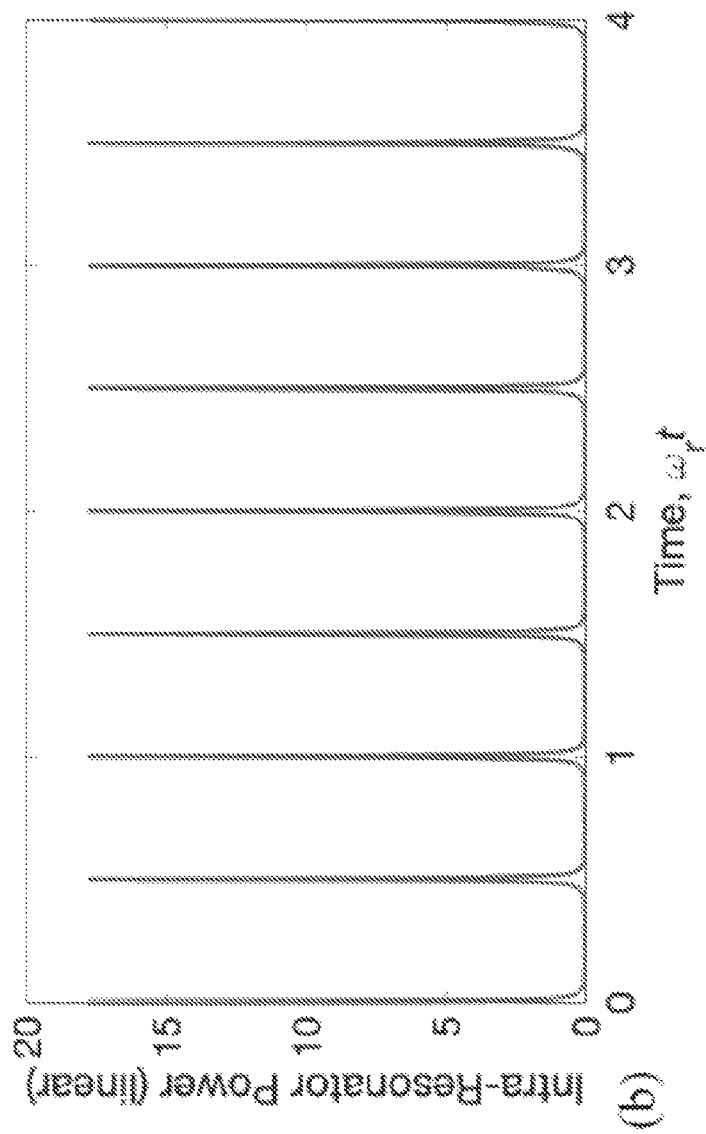

Referring to FIG. 39B, the intra-resonator temporal power profile inside a RE-EO comb generator is shown, demonstrating pulse formation. Inside the resonator, phase modulation induces pulse formation when the previously mentioned resonant conditions are true. However, because the RE-EO comb generator in FIG. 38 has only a single waveguide, the output field contains a superposition of the intra-resonator pulses, as well as the unmodulated input optical field. While the periodicity of the temporal power profile is twice the modulation frequency, the periodicity of the optical field is equal to the modulation frequency due to the time-dependent phase of the output optical field.

Simplified analytical models have been previously developed for RE-EO comb generators based on free-space Fabry-Perot resonators but can be adapted to RE-EO comb generators based on ring resonators. For example, the power in the pth comb line of a ring-based RE-EO comb generator is approximately ($\beta<\pi$, p$\neq$0).

$$P_p \propto e^{\frac{-|p|(1-r^2)}{\beta}}. \quad (4)$$

Increasing the modulation index $\beta$ and round-trip field gain r results in broader comb formation.

An analytical solution valid for all cases can be determined when both the input optical frequency and modulation frequency are resonant. By applying a Jacobi-Anger expansion to (1), the output optical field is $$E_{out}(t) = \quad (5)$$

$$\sqrt{(1-\gamma)(1-k)}\hat{E}_{in}e^{i\omega_0 t} - k\sqrt{\frac{1-\gamma}{1-k}}\hat{E}_{in}\sum_{p=-\infty}^{\infty}\sum_{n=1}^{\infty}r^n J_p(\beta n)e^{i(\omega_0+p\omega_m)t},$$

where $J_p$ is the pth order Bessel function of the first kind. The power in the pth comb line is then $$P_p = (1-\gamma)(1-k)P_{in}\left|\delta_p - \frac{k}{1-k}\sum_{n=1}^{\infty}r^n J_0(\beta n)\right|^2, \quad (6)$$

where $\delta_p$ is the Kronecker delta.

Figure 40A:
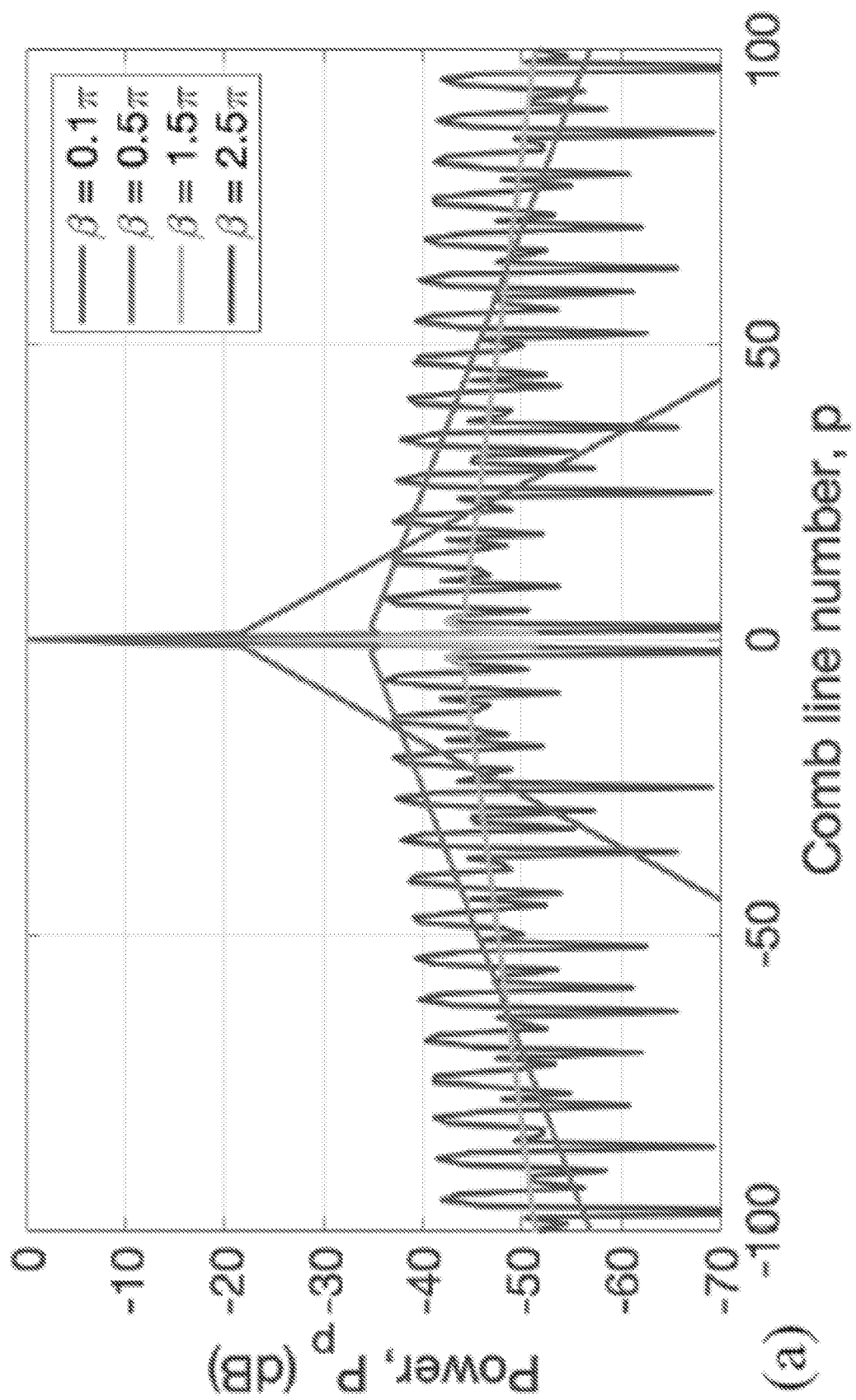
FIGS. 40A-B are plots of the output spectra of a RE-EO comb generator according to embodiments of the present disclosure.

Referring to FIG. 40A, the output spectra of a RE-EO comb generator for various modulation indices is shown. Comb spectra $P_p$ as a function of comb line number p for various parameters is shown for different modulation indices $\beta$. For $\beta>2\pi$, the output comb is highly non-uniform and chaotic. Increasing the modulation index decreases the overall slope of the comb spectrum. However, for large modulation indices ($\beta>2\pi$), the profile of the spectrum becomes nonuniform due to the highly oscillatory nature of the Bessel function in (6). Analytical models exist for free-space RE-EO comb generators driven with large modulation indices, but they will not be discussed further in this disclosure because applications in optical communications require a uniform and flat comb spectra.

Figure 40B:
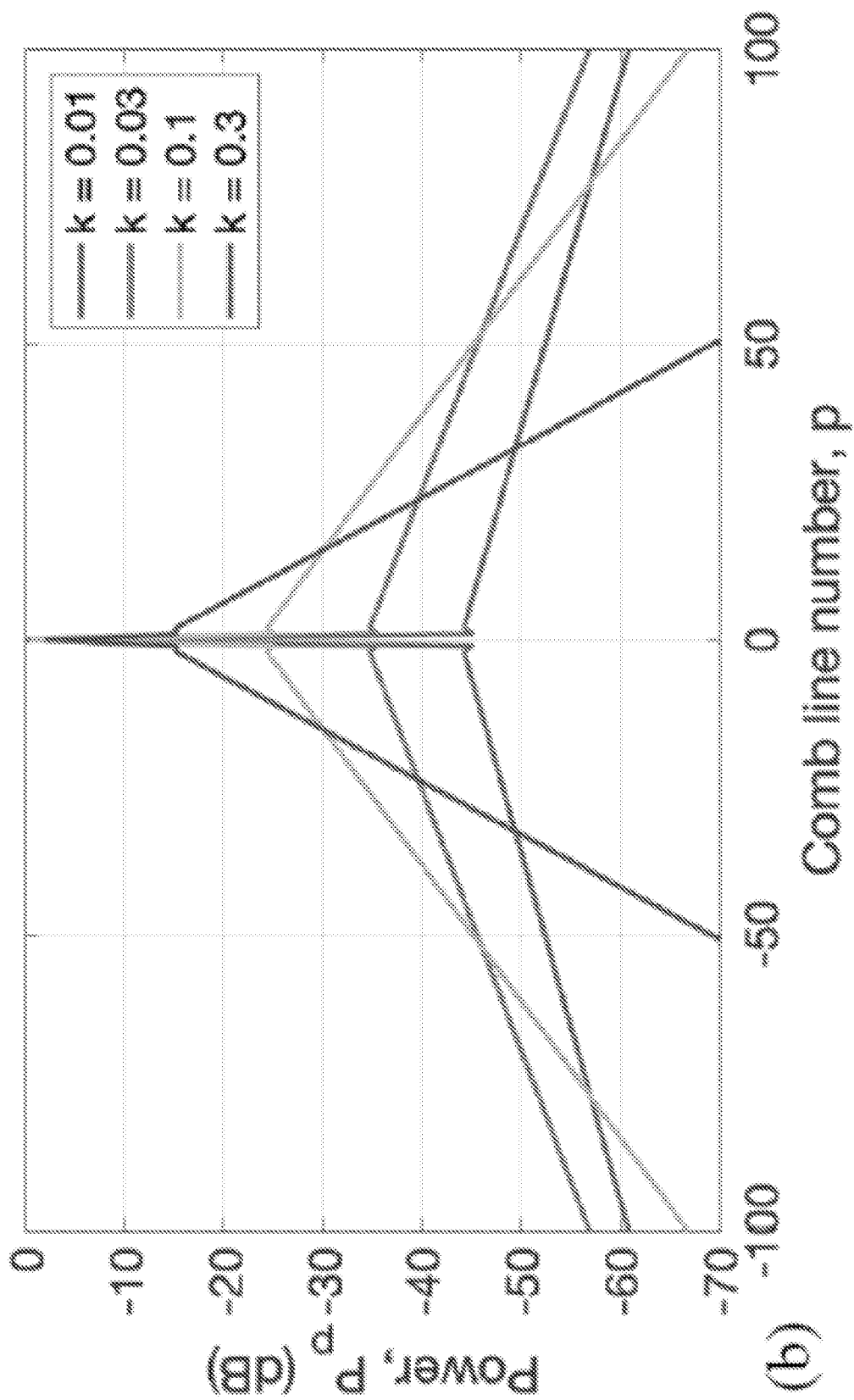

Referring to FIG. 40B, the output spectra of a RE-EO comb generator is shown. The output comb spectra as a function of comb line number p is shown for different coupling power transmissions k for the same parameters as FIG. 40A. Since the intra-resonator power loss $(1-\alpha)$ and the coupler insertion loss $\gamma$ are often fixed, the coupler power transmission k can be tuned to change the output spectrum. As k is decreased, the comb slope decreases and the comb flatness increases because the intra-resonator field is modulated during more round trips before being output-coupled. However, decreasing k also decreases the efficiency $\eta=\Sigma_{p\neq 0}P_p/P_{in}$ of the comb generation process because more of the input optical field is passed directly through the coupler and into the output waveguide.

Output Noise

1) Optical Input Phase Noise:

Previously, it vas assumed that the input optical field contained a single frequency. This assumption is now relaxed, and it is assumed that the input field is $E_{in}(t) = \hat{E}_{in}e^{i\omega_0 t+i\theta_0(t)}$ where $\theta_0(t)$ is the phase noise of the input optical field. The power spectral density (PSD) of $E_{in}(t)$ is $$S_{in}(\omega) = \int_{-\infty}^{\infty}\langle E_{in}(t)E_{in}^*(t+\tau)\rangle e^{-i\omega\tau}d\tau \quad (7)$$

$$= P_{in}\int_{-\infty}^{\infty}\langle e^{i\Delta_\tau\theta_0}\rangle e^{-i(\omega+\omega_\theta)\tau}d\tau,$$

where $\langle . \rangle$ denotes averaging over time t, and $\Delta_\tau\theta_0 = \theta_0(t+\tau)-\theta_0(t)$.

When both the input optical frequency and the modulation frequency are resonant, the output PSD of the pth comb line in the presence of input optical phase noise is $$S_{out,p}(\omega) = k^2 \frac{1-\gamma}{1-k} |\chi_p(\omega)|^2 S_{in}(\omega - p\omega_m), \quad (8)$$

where the frequency-dependent linewidth correction term for the pth comb line is $$\chi_p(\omega) = \sum_{n=1}^{\infty} r^n J_p(\beta_n) e^{-i\omega nT}. \quad (9)$$

From (8), it is evident that multiplication by $|\chi_p(\omega)|^2$ changes the shape of the PSD of the pth comb line phase noise. The calculations to derive this result are detailed below.

Figure 41:
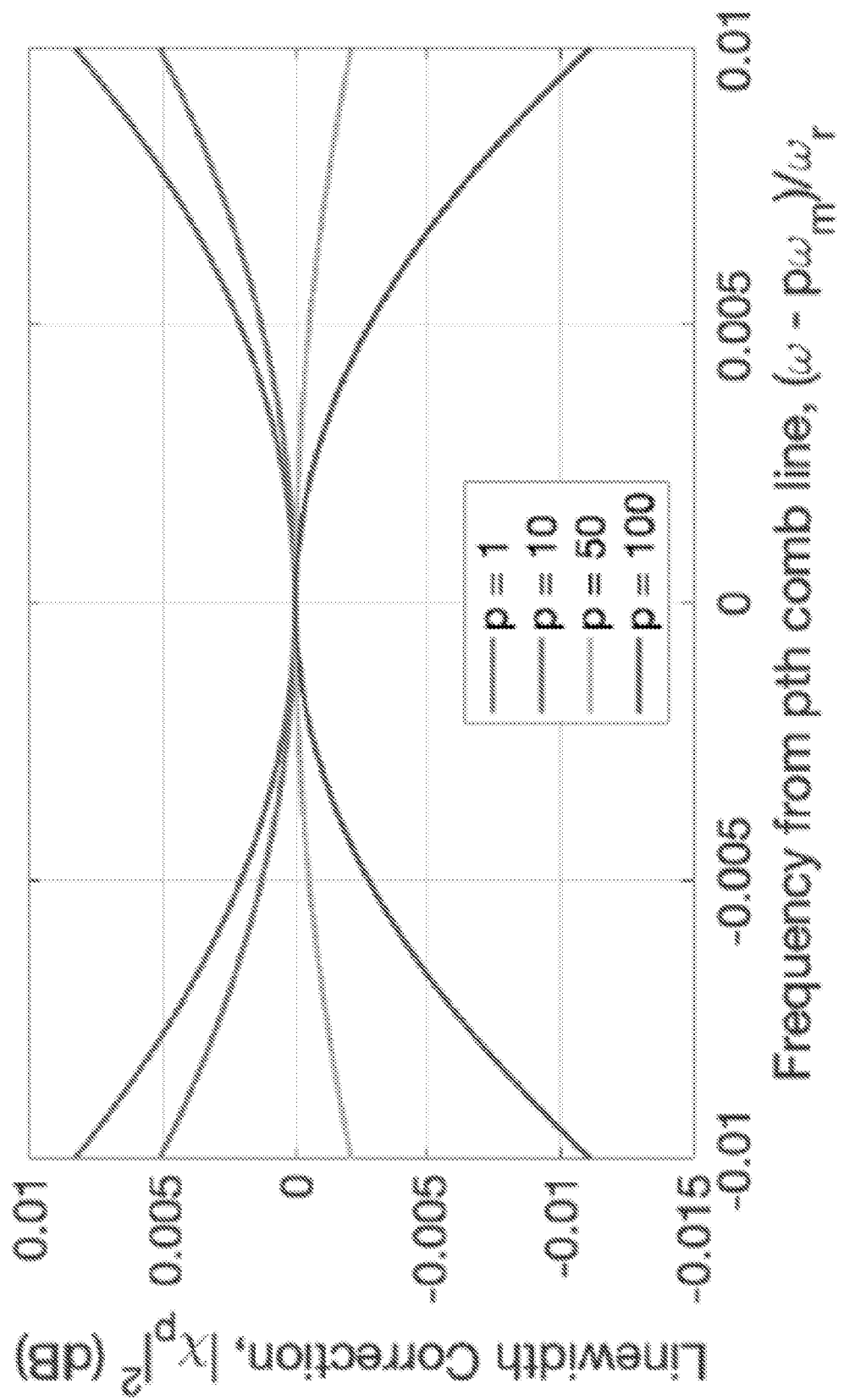
FIG. 41 is a plots of the normalized linewidth correction factor according to embodiments of the present disclosure.

Referring to FIG. 41, plots of the normalized linewidth correction factor $|\chi p(\omega)|^2$ for various comb line numbers p are shown. Because $|\chi_p(\omega)|^2$ is locally flat for w inside the input optical linewidth, the input optical phase noise is approximately copied to each of the comb lines. The horizontal axis is frequency from the center of the pth comb line, normalized to the resonator FSR. For many practical ring resonators, the FSR can be over four orders of magnitude larger than the linewidth of the input optical carrier. For this reason, only the shape of $|\chi_p(\omega)|^2$ near $\omega=\omega_0 A+p\omega_m$ contributes to a change in linewidth. From the vertical scale of FIG. 41 it is clear that the linewidth correction term is locally flat for frequencies within the linewidth of the input optical field. For this reason, the phase noise of the pth comb line is nearly identical to the phase noise of the input optical field.

2) Modulation Phase Noise:

Similar to the above, the impact of modulator phase noise can be analyzed by introducing a time-dependent phase $\theta_e(t)$ into the phase modulation. The cascaded modulation function, including modulation phase noise is $$F_n(\omega_m t) = \sum_{i=1}^{n} \sin[\omega_m(t-iT) + \theta_e(t-iT)] \quad (10)$$
$$\approx n\sin[\omega_m t + \theta_e(t)],$$

where it is assumed that $\theta_e(t)$ is slowly varying over relevant resonator time scales such as the resonator decay lifetime. This is a safe assumption because crystal-controlled microwave oscillators used for modulation have coherence times much longer than those of optical resonators. By inserting (10) into (1) and assuming resonance of the input optical frequency and modulation frequency, the output field of the pth comb line (p≠0) is $$E_p(t) = -k\sqrt{\frac{1-\gamma}{1-k}} \hat{E}_{in} \left[\sum_{n=1}^{\infty} r^n J_p(\beta n)\right] \times e^{i(\omega_0 + p\omega_m)t + ip\theta_e(t)}. \quad (11)$$

The PSD of the pth comb line in the presence of modulation phase noise is then $$S_{out,p}(\omega) = P_p \int_{-\infty}^{\infty} \langle e^{ip\Delta_\tau \theta_e} \rangle e^{-i\omega\tau} d\tau, \quad (12)$$

where Pp is given by (6) and $\Delta_\tau \theta_e = \theta_e(t+\tau) - \theta_e(t)$. If it is assumed that $\Delta_\tau \theta_e$ is a Gaussian random process, then the linewidth of the pth optical field, $\Delta\omega_p$, is related to the phase noise by $$\Delta\omega_p |\tau| = \langle (p\Delta_\tau \theta_e)^2 \rangle. \quad (13)$$

From this relation, it is clear that the linewidth of the pth comb line increases quadratically with p. The quadratic dependence of the linewidth on comb line number can introduce significant noise for applications that require thousands of comb lines, such as precision timing. However, for applications that require hundreds of comb lines or less, the output phase noise is still dominated by input laser phase noise. High-frequency comb line phase noise can be filtered by inputting an optical frequency slightly detuned away from a harmonic of the FSR. This effect results from a frequency dependent filtering term in (11), though a detailed analysis is not presented here.

It was assumed above that both the input optical frequency and the modulation frequency were harmonics of the resonator FSR. In practical systems, this assumption is not always satisfied. In order to maintain this resonance condition, various locking methods may be used to ensure that the desired comb properties are preserved. Here, since the most important comb property for optical communications is comb power, impairments to the output spectrum in the presence of optical frequency offsets and modulation frequency offsets are analyzed.

Non-Resonant Optical Input

It is first assumed that the input field has an optical frequency offset $\Delta\omega_0$ such that the input optical field is $E_{in}(t)=\hat{E}_{in} e^{i(\omega_0+\Delta\omega_0)t}$. The normalized optical frequency offset $\phi_0=\Delta\omega_0 T$ is defined. From (1), the output power in the pth comb line in the presence of an input optical frequency offset is $$P_{p,o} = k^2 \frac{1-\gamma}{1-k} P_{in} \left|\sum_{n=1}^{\infty} (re^{-i\phi_o})^n J_p(\beta n)\right|^2. \quad (14)$$

Figure 42A:
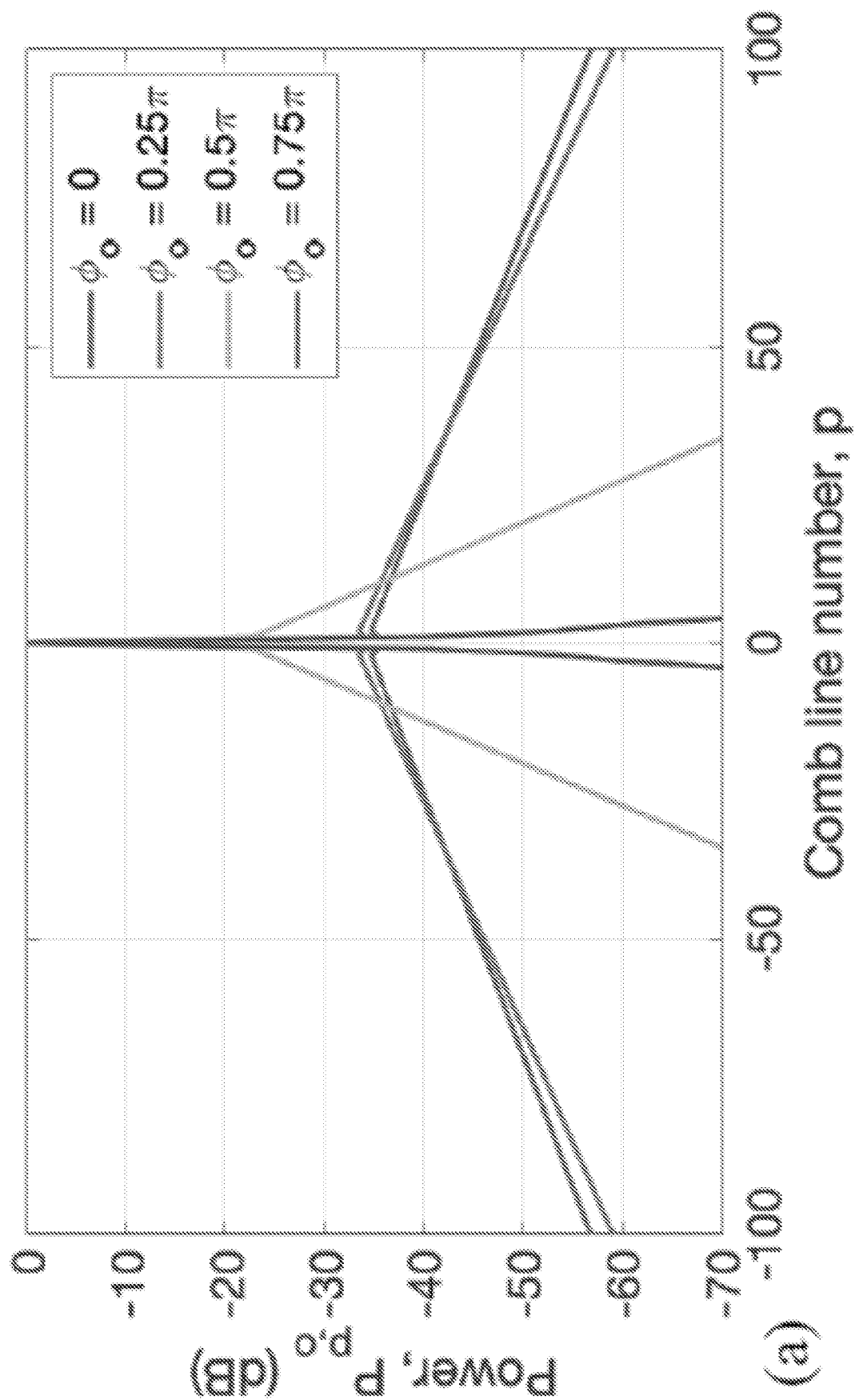
FIGS. 42A-B are plots of power spectra according to embodiments of the present disclosure.
Figure 42B:
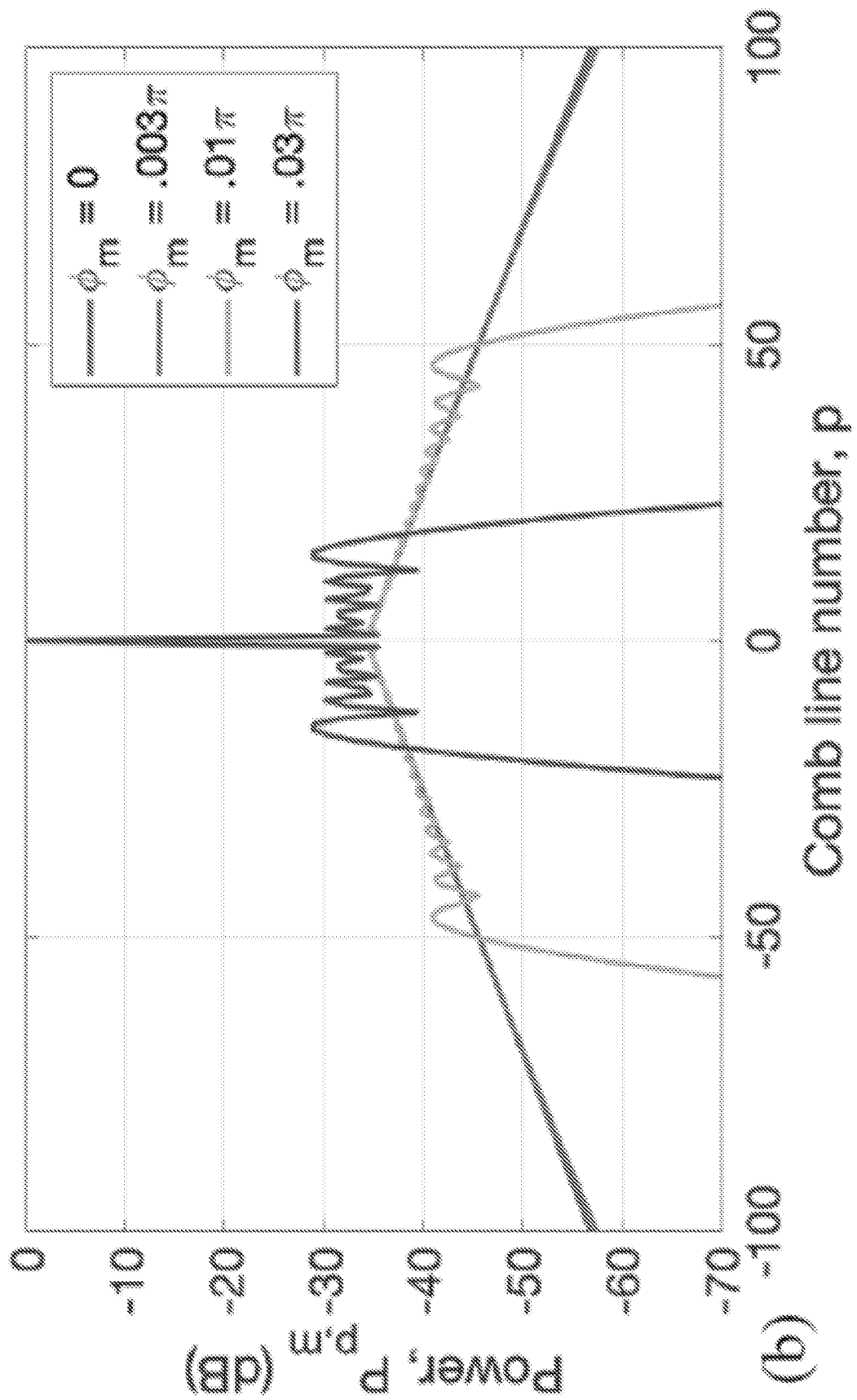

FIG. 42 illustrates output spectra from a non-resonant RE-EO comb generator. FIG. 42A is a plot of power spectra $P_{p,o}$ for different optical frequency offsets. For $\phi_o > \beta$, the comb width is reduced substantially. FIG. 42B is a plot of power spectra $P_{p,m}$ for different modulation frequency offsets, demonstrating reduction of comb width for large $\phi_m$.

FIG. 42A shows the output comb spectrum calculated from (14) for various values of $\phi_0$. For small values of $\phi_0$, the shape of the comb remains unchanged, while for values of $\phi_0$ that approach and surpass the modulation index $\beta$, the comb drastically decreases in size. The absolute phase of each of the comb lines also changes, along with the optical power, but will not be discussed further here. For unmodulated resonators, inputting an optical frequency inside of the resonator linewidth $\Delta\omega_r=(1-r^2)\omega_r/(2\pi)$ is critical to increasing the built-up power in the resonator. Thus, one might expect that inputting an optical frequency outside of $\Delta\omega_r$ into a modulated resonator may reduce the comb generation efficiency. Indeed for some values of $\phi_0$, such as $\phi_0 > 0.5\pi$, the output comb is much less flat. However, flat combs can be generated even in the presence of normalized optical frequency offsets greater than the normalized resonator linewidth, $\phi_r = \Delta\omega_r T = (1-r^2)$. For the default parameters assumed in this paper, $\phi_r = 0.0137r$, while broad comb formation is evident for $\phi_0 = 0.25\pi$ in FIG. 42A. These results agree with previous experimental results from free-space REEO comb generators.

Non-Resonant Modulation

It is now assumed that the modulator is driven with modulation frequency offset $\Delta\omega_m$ and define the normalized modulation frequency offset $\phi_m = \Delta\omega_m T$. From (1), the power in the pth comb line in the presence of a modulation frequency offset is $$P_{p,m} = \frac{(1-\gamma)}{(1-k)} k^2 P_{in} \times \left| \sum_{n=1}^{\infty} \sum_{q=-\infty}^{\infty} r^n i^q J_{p-q}(\beta_o(\phi_m, n)) J_q(\beta_e(\phi_m, n)) \right|^2, \quad (15)$$

where the modified odd and even modulation indices $\beta_o(\phi_m, n)$ and $\beta_e(\phi_m, n)$ are defined as $$\beta_o(\phi_m, n) = \beta\left(\frac{1}{2}\cot(\phi_m/2) - \frac{\cos\left(\left(n+\frac{1}{2}\right)\phi_m\right)}{2\sin(\phi_m/2)}\right) \quad (16)$$

$$\beta_e(\phi_m, n) = \beta\left(-\frac{1}{2} + \frac{\sin\left(\left(n+\frac{1}{2}\right)\phi_m\right)}{2\sin(\phi_m/2)}\right). \quad (17)$$

The calculations to derive (15) from (1) are included in Appendix B. Since (15) introduces an additional infinite summation, the complexity of the calculation increases significantly, especially in cases where the resonator loss is small or modulation index is large. An efficient numerical model is provided that approximates this analytical model. FIG. 42B shows comb spectra in the presence of various modulation frequency offsets. For small modulation frequency offsets, the comb remains flat. An increase in $\phi_m$, however, leads to an inversely proportional decrease of the total width from approximately 120 comb lines to 40 comb lines due to an increase of the modulation frequency offset from $\phi_m = 0.017\pi$ to $\phi_m = 0.037\pi$. As above, the comb spectra in FIG. 42 exhibit behavior that deviates from the behavior of an unmodulated resonator. Comb lines with frequencies that lie far outside of the resonator linewidth still build up in the resonator. For example, for $\phi_m = 0.037\pi$, all of the approximately 40 generated comb frequencies lie outside of the normalized resonator linewidth, $\phi_r = 0.0137\pi$. Large ring resonators, corresponding to large T, are much more sensitive to optical frequency offsets and modulation frequency offsets because the normalized frequency offsets are linearly dependent on the resonator length. For this reason, it is ideal for the modulation frequency to equal the fundamental FSR rather than a harmonic of the FSR in order to increase the tolerable frequency offsets.

While the analytical models above exactly predict the output comb spectra of a RE-EO comb generator in resonant and non-resonant operation, these models cannot include arbitrary frequency-dependent effects such as dispersion. Two methods of numerically approximating the output spectrum of a dispersive RE-EO comb generator are provided.

A. Round-Trip Phase Model

An intuitive understanding of the resonance conditions of an RE-EO comb generator can be approached first from the resonance conditions of an unmodulated resonator, which can be fully explained through the interference of internal and external fields. For example, a typical resonance condition for an input optical field with frequency $\omega_p$ coupled to a resonator with normalized linewidth $\phi_r$, as defined above, is $$|\theta_{p,tot}| < \phi_r/2, \quad (18)$$

where $\theta_{p,tot} = \omega_p T \mod 2\pi$ is the total round-trip accumulated phase offset of the optical field. Frequencies that do not satisfy this condition do not experience constructive interference inside the resonator. However, the intra-resonator phase modulation introduces a time-dependent variation in the resonance condition that results in constructive interference at one or more locations inside the resonator, depending on whether the phase modulation is equal to, or a subharmonic of, the FSR. As a result of this spatially varying constructive interference, intra-resonator pulses are formed. The new condition for constructive interference in the resonator is $|\theta_{p,tot} + \beta \sin \omega_m t| < \phi_r/2$. Since this condition may be satisfied for any time t the resonance condition becomes $$-\beta < \theta_{p,tot} < \beta, \quad (19)$$

where the finite resonator linewidth is omitted because it is often much smaller than the modulation index. This resonance condition explains the comb formation effects, where comb lines were generated even though they were outside of the resonator linewidth. To validate this model, consider a RE-EO comb generator that is modulated exactly at the resonator FSR ($\phi_m = 0$) but has some known optical frequency offset $\phi_0$. In the absence of dispersion, the round-trip accumulated phase of the pth comb line is $\phi_{p,tot} = \phi_0$. For unmodulated resonators, constructive interference inside the resonator can easily be verified by changing the optical frequency offset and measuring a dip in the transmission spectrum. Analogous to (3), the timedependent output field in the presence of optical frequency offset is $$E_{out}(t) = \sqrt{(1-\gamma)(1-k)}\, \hat{E}_{in} e^{i\omega_0 t} - k\sqrt{\frac{1-\gamma}{1-k}} \frac{\left(re^{-i\phi_0}\right)e^{i\beta\sin\omega_m t}}{1-\left(re^{-i\phi_0}\right)e^{i\beta\sin\omega_m t}} \hat{E}_{in} e^{i\omega_0 t}. \quad (20)$$

Figure 43:
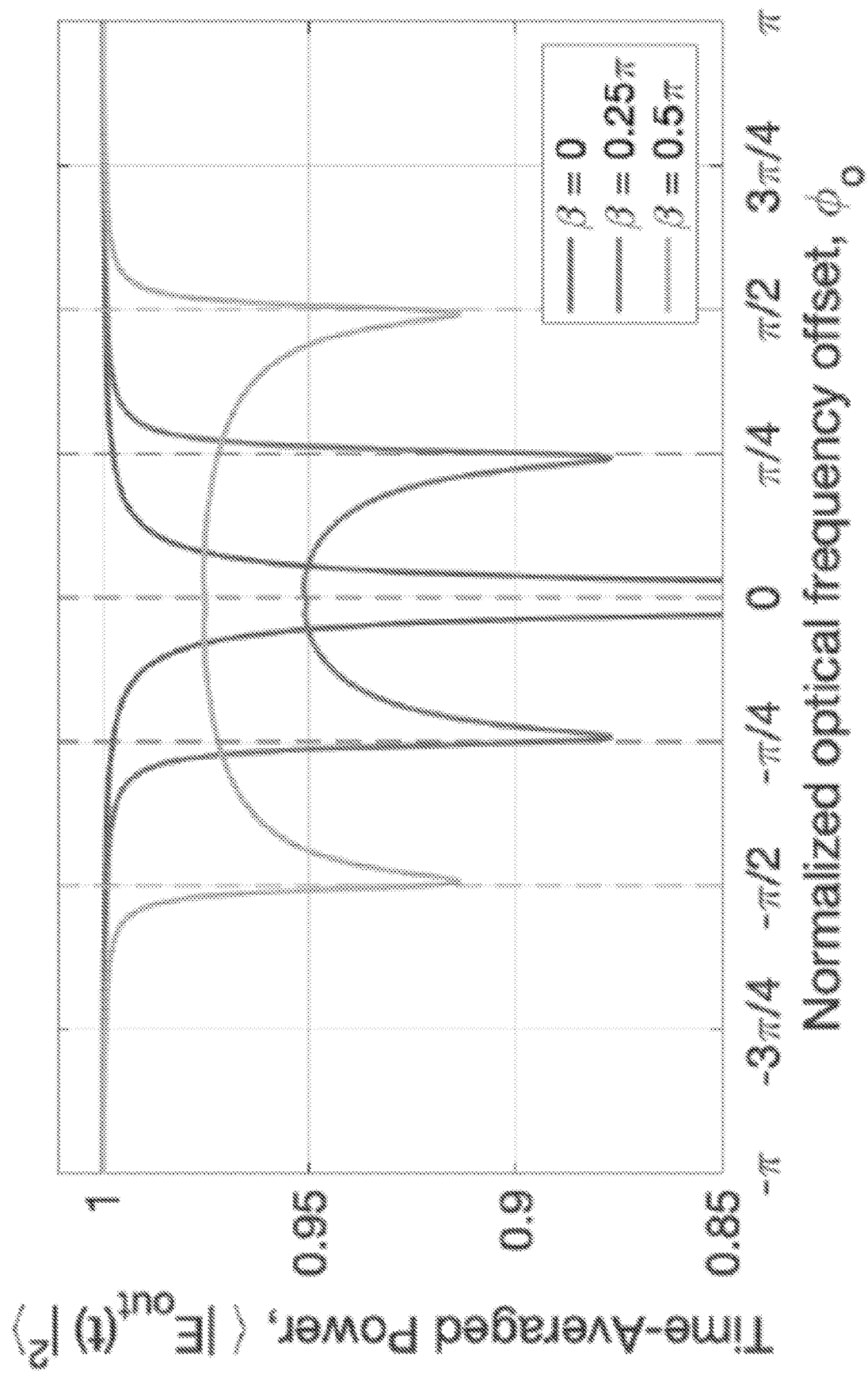
FIG. 43 is a plot of time-averaged power transmission according to embodiments of the present disclosure.

FIG. 43 illustrates time-averaged power transmission $\langle |E_{out}(t)|^2 \rangle$ for various optical frequency offsets $\phi_0$ and modulation indices $\beta$. Dashed lines correspond to the edge of the round-trip phase model resonance condition as described herein.

FIG. 43 shows the time-averaged output power $\langle |E_{out}(t)|^2 \rangle$ as a function of the normalized optical frequency offset for various modulation indices. A narrow dip is observed in the power transmission for $\beta = 0$, corresponding to the expected output from a unmodulated resonator. For $\beta \neq 0$, however, constructive interference occurs at many values of the optical frequency offset. The dashed lines in FIG. 43 correspond to the limits of the round-trip phase model ($-\beta < \phi_0 < \beta$), which accurately predict the maximum optical frequency offset that results in intra-resonator power buildup. The round-trip phase model can be extended to include effects such as modulation frequency offsets as well as dispersion. In a single round trip, the accumulated phase of the pth comb line due to a modulation frequency offset, $\theta_{p,m}$, is linear in comb line number, i.e., $$\theta_{p,m}=[\omega_0 T+p(\omega_m+\Delta\omega_m)T] \mod 2\pi = p\phi_m, \quad (21)$$

The effects of dispersion can also be included by integrating the measured or simulated group velocity dispersion to determine the round-trip accumulated phase offset of the pth comb line due to dispersion, $\theta_{p,d}$. However, if it is assumed that a linear dispersion profile, $\theta_{p,d}$, is $$\theta_{p,m}=[\omega_0 T+p(\omega_m+\Delta\omega_m)T] \mod 2\pi = p\phi_m, \quad (21)$$

where $\beta_2 L$ is the round-trip group velocity dispersion and the normalized phase offset due to dispersion is then $\phi_d = \omega_m^2 \beta_2 L$. Finally, the resonance condition for an RE-EO comb generator including optical frequency offsets, modulation frequency offsets, and linear dispersion is $$-\beta < \phi_o + p\phi_m + p^2 \phi_d < \beta. \quad (23)$$

Similar expressions can be extracted and the dispersion-limited comb width of free-space REEO comb generators can be analyzed using Fabry-Pérot resonators. For a linear dispersion profile, the maximum comb width occurs when $\phi_0 = -\beta$ and is given by $$\Delta\omega_{comb} = \sqrt{\frac{2\beta}{\beta_2 L}}.$$

This value agrees with previous comb widths up to a factor of $\sqrt{2}$ due to the difference in FSR of a Fabry-Pérot resonator and ring resonator of identical length. To fully characterize the output power spectrum, the following assumptions are made: (a) the light in the center frequency is dominated by the input field that passes through the coupler, i.e., $P_0 = (1-\gamma)(1-k)P_{in}$, (b) the slope of the comb spectrum is given by (4), and (c) the power in the first sideband is given by $$P_{\pm 1} = \frac{k^2(1-\gamma)}{1-k} J_1(\beta)^2,$$

simplified from (6). These assumptions, along with (23) form the round-trip phase model, which can efficiently predict the approximate shape of the output comb spectrum. The round-trip phase model as well as the modeling above have been successfully used to predict the output comb spectrum of actual integrated ring structures.

B. Steady-State Matrix Method

One drawback of the round-trip phase model is that fine features of the output comb spectrum cannot be determined, as shown by variations in comb line power of up to 10 dB in FIG. 42B. A numerical method is provided that is capable of resolving these fine features by determining a relation between the comb lines inside the resonator. Similar calculations have been performed before in the context of freespace Fabry-Pérot resonators, but not ring-based cavities. First, the intra-resonator field $E_c(t)$, shown in FIG. 38, is propogated by one round-trip time T resulting in the following relation:

$$E_c(t)=\sqrt{\alpha}e^{i\beta \sin \omega_m t}[\sqrt{(1-\gamma)(1-k)}E_c(t+T)+i\sqrt{(1-\gamma)k}E_{in}(t+T)]. \quad (24)$$

It is assumed that that $E_c(t)$ can be expressed as a superposition of optical fields with frequencies spaced at the modulation frequency, i.e., $$E_c(t) = \sum_{p=-\infty}^{\infty} E_p e^{i(\omega_0 + p\omega_m)t}, \quad (25)$$

where $E_p$ is the complex optical field of the pth comb line inside the resonator. If the optical field has reached steady state, corresponding to many round trips after the light is first input-coupled into the resonator, the relation between all $E_p$ is $$E_p = r \sum_{q=-\infty}^{\infty} J_q(\beta) E_{p-q} e^{i\theta_{p-q,tot}} + i\sqrt{\frac{k}{1-k}} r\hat{E}_{in} J_p(\beta) e^{i\theta_{0,tot}}, \quad (26)$$

where $\theta_{p,tot} = \phi_0 + \theta_{p,m} + \theta_M$ is the round-trip normalized frequency offset of the pth comb line. This system of linear equations can be solved with simple matrix methods. The output field in the waveguide is $$E_{out}(t)=\sqrt{(1-\gamma)(1-k)}E_{in}(t)+i\sqrt{(1-\gamma)k}E_c(t), \quad (27)$$

where the values of the complex optical field $E_p$ are solved above.

In practice, when using a matrix solver to compute $E_p$, it is necessary to increase the number of simulated comb lines because the model may become inaccurate at the edges of the spectrum. This effect occurs because frequency conversion from carriers outside of the width of the simulation are not included. Since this method is quite efficient, increasing the number of simulated comb lines by even a factor of two is often tolerable. Although not discussed further in this paper, these equations reveal individual phase information of the comb lines, which have analytical solutions, and may be useful for applications where relative phase information is desired.

C. Comparison of Methods

Here, the three models of computing the output spectrum are validated—the analytical model, the round-trip phase model, and the steady-state matrix method—by comparing the predicted output spectra in the presence of modulation frequency offsets. Since optical frequency offsets solely change the slope of the comb, this comparison is omitted.

Figure 44A:
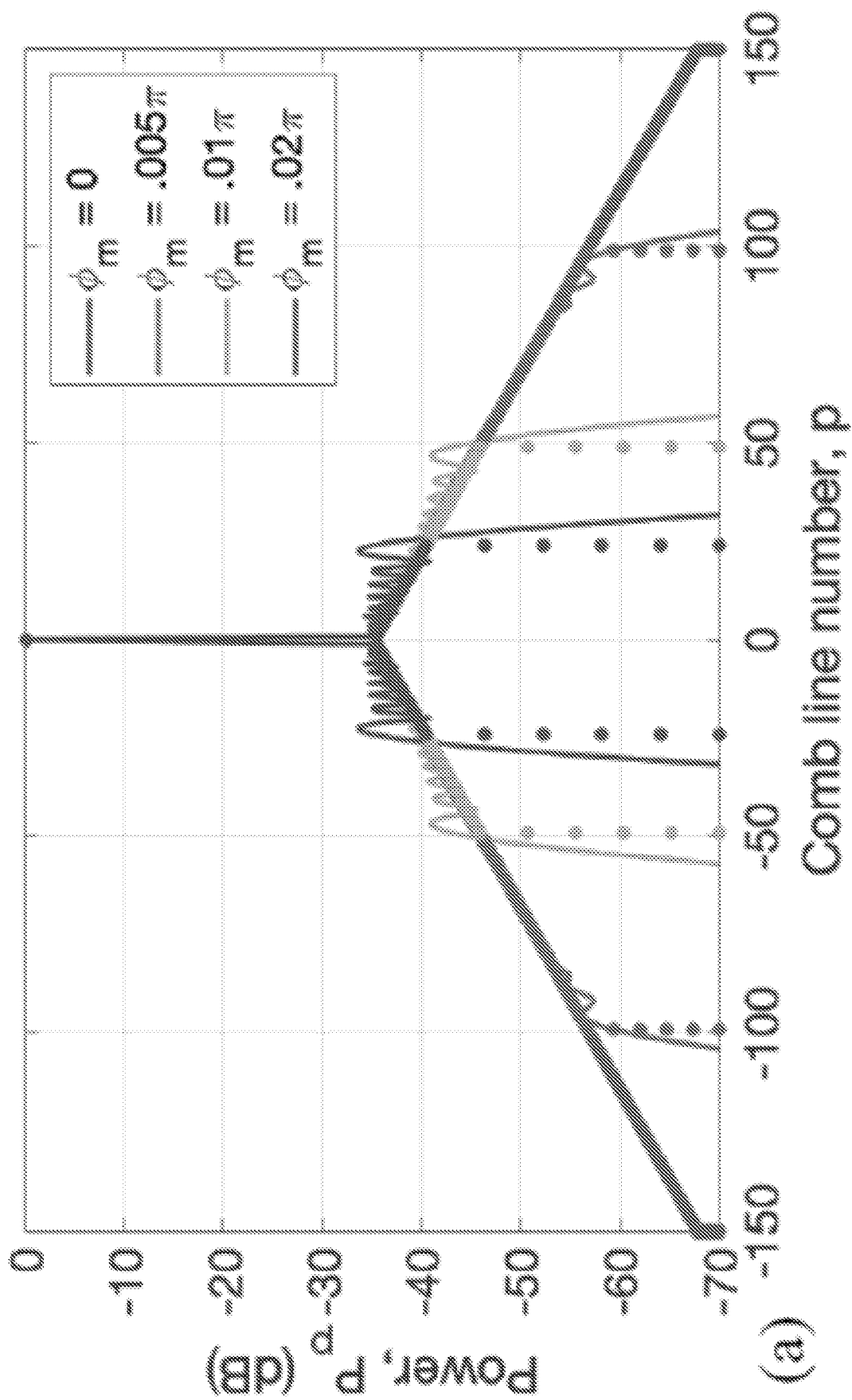
FIGS. 44A-B are plots of output comb spectra according to embodiments of the present disclosure.

FIG. 44 provides a comparison of methods used to predict the output comb spectrum. FIG. 44A is a plot of output comb spectra $P_p$ calculated with the analytical model (lines) and the round-trip phase model (filled circles) for various modulation frequency offsets. FIG. 44A is a plot of output comb spectra $P_p$ calculated with the analytical model (lines) and the steady-state matrix method (filled circles) for various modulation frequency offsets.

FIG. 44A shows the spectra calculated from the analytical model (lines) and the round-trip phase model (filled circles) for various modulation frequency offsets.

Figure 44B:
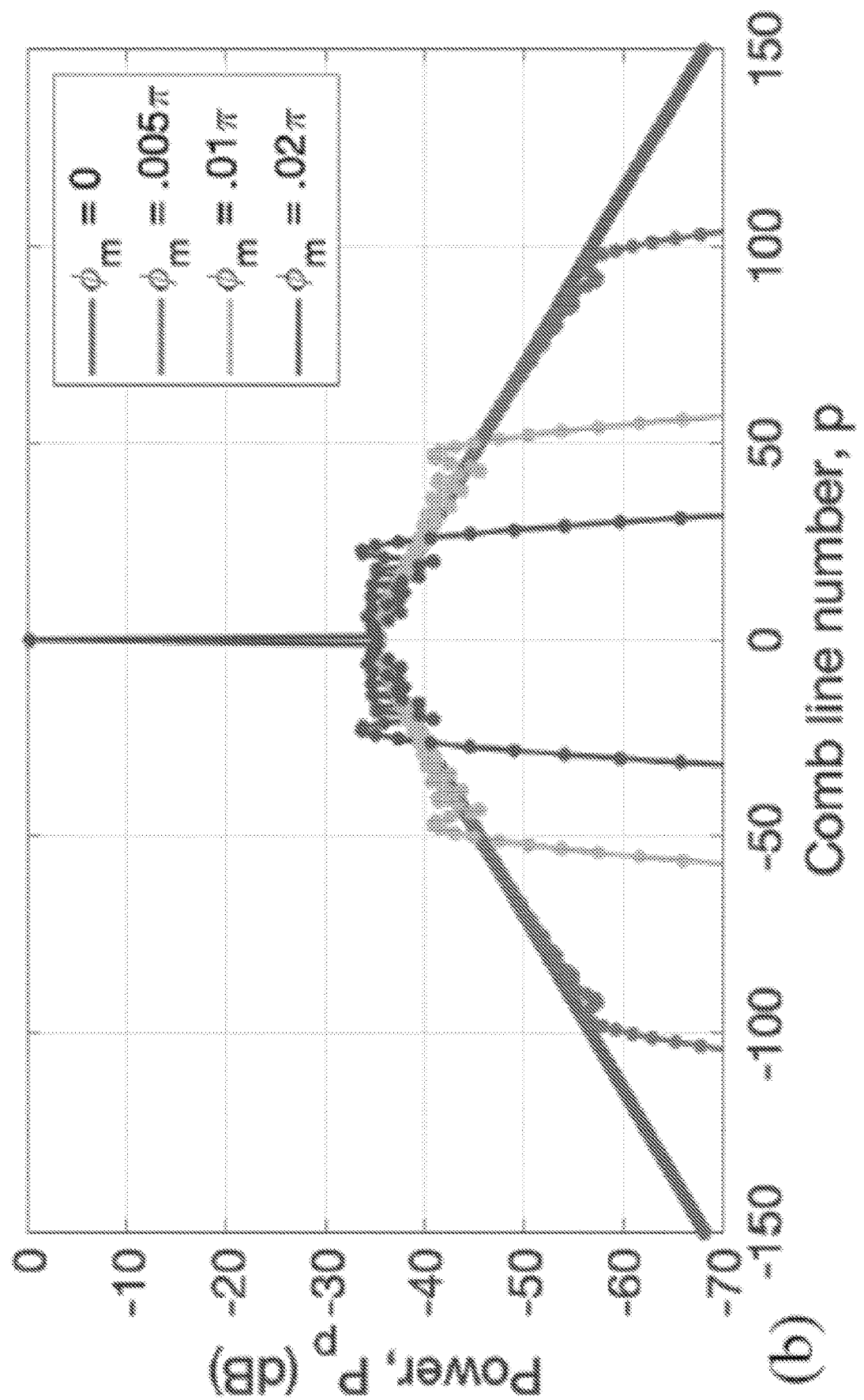

The round-trip phase model accurately predicts the comb width and shape, but fails to predict the fine features of the comb spectrum, as expected. FIG. 44B compares the spectra computed with the analytical model (lines) and the steady-state matrix method (filled circles). Here, the steady-state matrix method is able to calculate the fine features of the comb spectrum with high accuracy.

The round-trip phase model and the steady-state matrix method can also be used to predict the effects of dispersion.

In the following, a linear dispersion profile is assumed (i.e., $\theta_{p,d}=p^2\phi_d$) with $\phi_d=2\pi\times10^{-4}$. This value of $\phi_d$ is considerably larger than any practical values in order to emphasize the effects of dispersion. For example, for a lithium niobate resonator with 10 GHz FSR, this value of $\phi_d$ would correspond to a group velocity dispersion of ~$1.2\times10^4$ fs2/mm, over two orders of magnitude larger than that of current waveguide technology.

Figure 45:
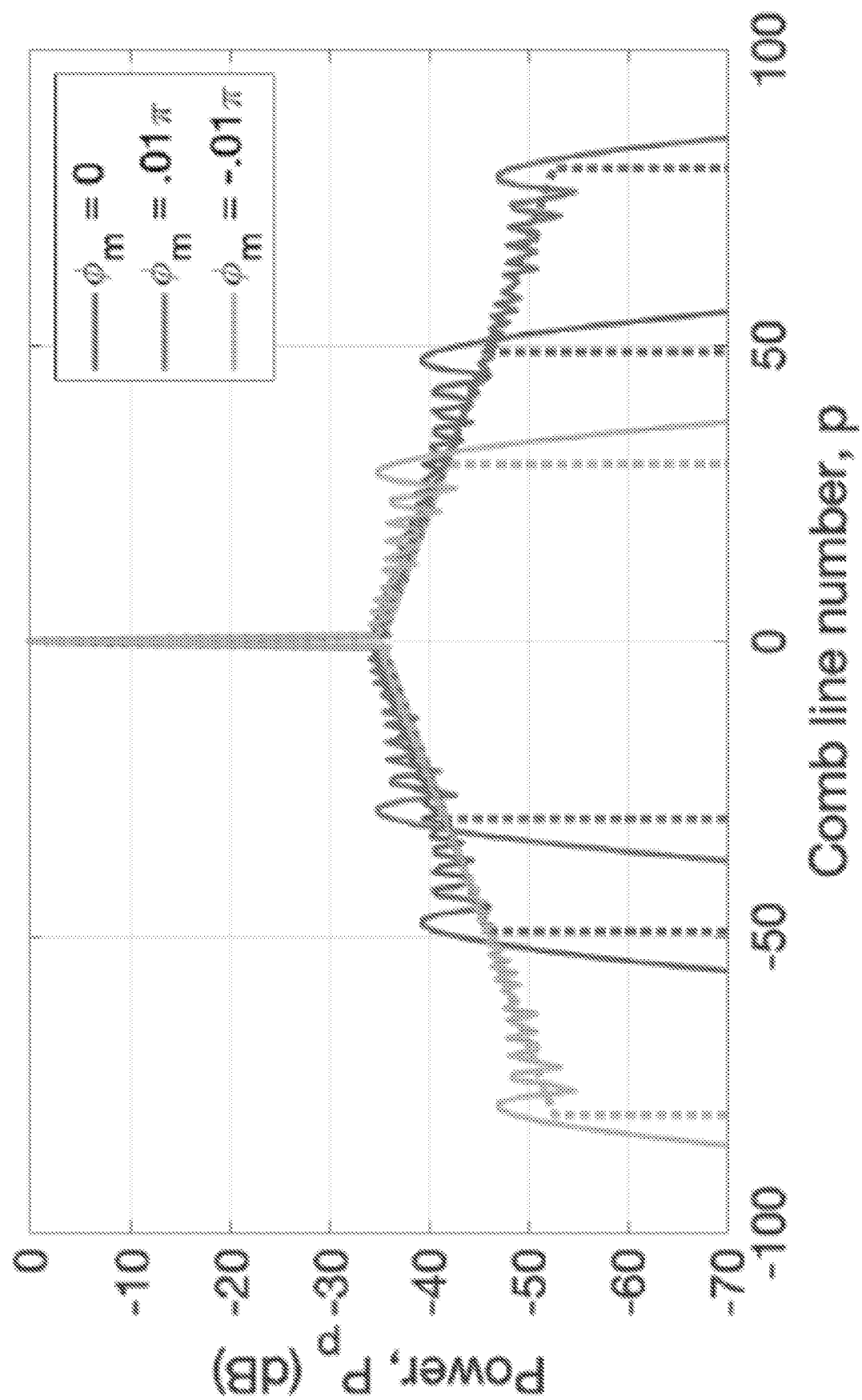
FIG. 45 is a plot of output comb spectra according to embodiments of the present disclosure.

FIG. 45 shows output comb spectra $P_p$ from the round-trip phase model (dotted line) and the steady-state matrix method (solid line). In the presence of modulation frequency offsets and dispersion, complex and asymmetric comb spectra can be observed.

FIG. 45 compares output comb spectra for various modulation frequency offsets for a linear dispersion profile. As in FIG. 44, the round-trip phase model is able to predict the comb shape, but is not able to determine fine comb features.

Conversely, the steady-state matrix method is able to resolve fine features in the comb spectra.

When both modulation frequency offsets and dispersion are included, the comb spectra becomes asymmetric about the center frequency. This effect results from the resonance condition $-\beta<p\phi_m+p^2\phi_d<\beta$, where the resonance condition for positive and negative p is different. For higher frequency comb lines (p>0), both the modulation frequency offset and the dispersion phase offset have the same sign while for lower-frequency comb lines (p<0), they have opposite signs. Unlike many other comb generators, such as those based on $\chi^{(3)}$ nonlinear effects, the RE-EO comb generator does not require extensive dispersion engineering to produce viable frequency combs because it does not require phase matching over long periods of time.

As mentioned above, resonator-based comb generators often have low efficiency due to low coupling between the input waveguide and resonator. A frequency-dependent coupler with high transmission at the input frequency, but low transmission at all other frequencies can solve this problem because the input light can efficiently coupled into the resonator where the newly generated frequencies may then resonate for many round trips. While complicated frequency dependent couplers based on photonic crystals or distributed Bragg reflectors can be fabricated to approach the desired frequency response, these methods introduce additional fabrication requirements and excess insertion loss. The impact on the output spectrum of an additional ring coupler used to efficiently couple the input field to the comb-generating resonator is analyzed.

Figure 46:
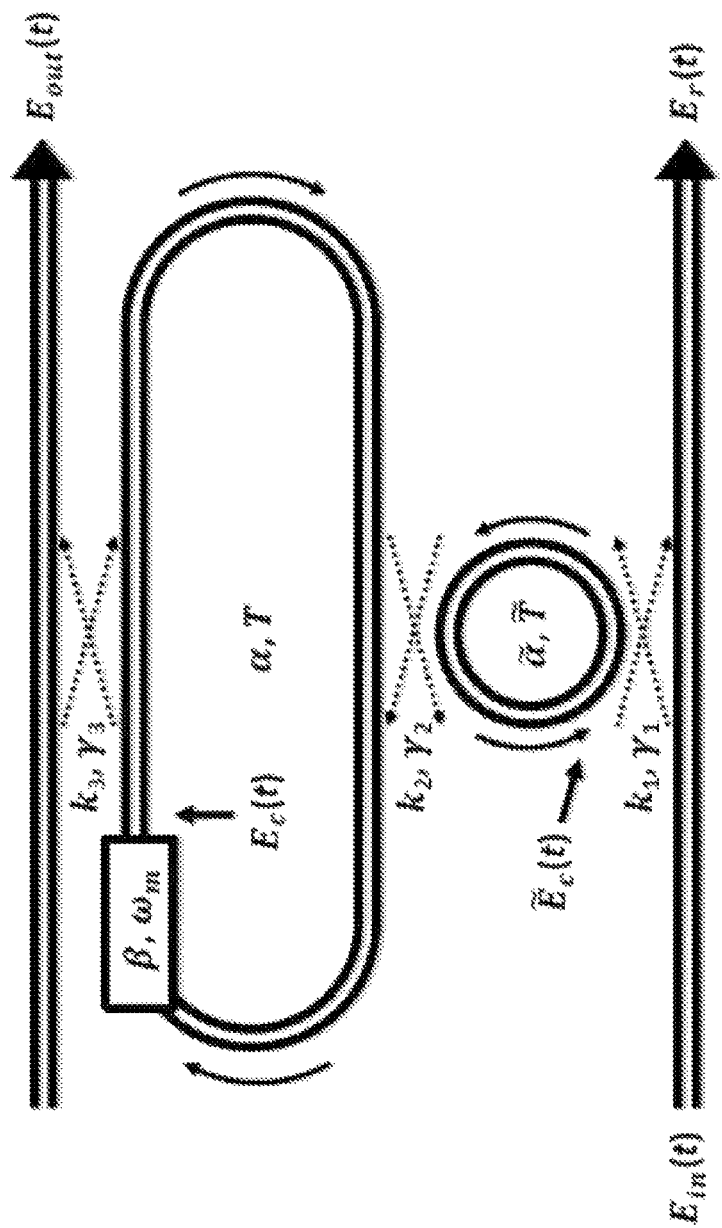
FIG. 46 is a schematic view of a dual-ring EO comb generator according to embodiments of the present disclosure.

FIG. 46 is a diagram of a dual-ring EO comb generator. Power at the input optical frequency builds up in the small ring and is then coupled to a larger resonator, where the comb is generated. A third coupler is used to output-couple the desired comb.

FIG. 46 illustrates a dual-ring EO comb generator according to embodiments of the present disclosure. An input optical field $E_{in}(t)$ is first resonantly coupled into a small ring. Inside that ring, power builds up at the input optical frequency, before it is coupled into the larger, comb-generating resonator. This resonator includes a coupler to output the desired frequency comb. The coupler power transmission coefficients are k1, k2, and k3 and the coupler insertion losses are $\gamma_1$, $\gamma_2$, $\gamma_3$, as shown in FIG. 46. The power losses of the small ring, $(1-\tilde{\alpha})$, and of the combgenerating resonator, $(1-\alpha)$, are related by $\tilde{\alpha}=\alpha^{(\tilde{T}/T)}$, where $1/\tilde{T}$ and $1/T$ are the FSRs of the small ring and combgenerating resonator, respectively. The new output field $E_{out}(t)$ can be calculated as a function of the input field $E_{in}(t)$ with the steady-state matrix method. However, the small ring coupler introduces frequency dependent phase shifts, loss, and power transmission. To determine a self-consistent relation between the comb line optical fields $E_p$, analogous to (26) that includes these effects, the same techniques as above can be applied.

First, the field in the small resonator, $\tilde{E}_c(t)$, and the field in the larger resonator, $E_c(t)$, can be related by the following equations:

$$\tilde{E}_c(t) = \tilde{r}'\tilde{E}_c(t+\tilde{T}) + \tag{28}$$

$$i\sqrt{\frac{k_2}{1-k_2}}\left(\frac{\tilde{\alpha}}{\alpha}\right)^{\frac{1}{4}}r'E_c(t+\tilde{T}/2+T/2)+i\sqrt{\frac{k_1}{1-k_1}}\tilde{r}'E_{in}(t+\tilde{T})$$

$$E_c(t) = r'e^{i\beta\sin\omega_m t}E_c(t+T) + \tag{29}$$

$$i\sqrt{\frac{k_2}{1-k_2}}\left(\frac{\alpha}{\tilde{\alpha}}\right)^{\frac{1}{4}}\tilde{r}'e^{i\beta\sin\omega_m t}\tilde{E}_c(t+\tilde{T}/2+T/2) -$$

$$(\alpha\tilde{\alpha})^{\frac{1}{4}}\sqrt{(1-\gamma_1)k_1(1-\gamma_2)k_2}\ e^{i\beta\sin\omega_m t}\times E_{in}(t+\tilde{T}/2+T/2),$$

where $\tilde{r}'=\sqrt{\tilde{\alpha}(1-\gamma_1)(1-k_1)(1-\gamma_2)(1-k_2)}$ is the round-trip gain coefficient of the small ring and $r'=\sqrt{\alpha(1-\gamma_2)(1-k_2)(1-\gamma_3)(1-k_3)}$ is the round-trip gain coefficient of the comb-generating resonator. If it is assumed that both $E_c(t)$ and $\tilde{E}_c(t)$ are superpositions of fields spaced at the modulation frequency, analogous to (25), the complex field of the pth comb line, $E_p$, is related to the other comb fields and input field via the following expression:

$$E_p = \sum_{p=-\infty}^{\infty} r'J_q(\beta)e^{i\omega_{p-q}T}\left(\frac{1-\tilde{r}'e^{i\omega_{p-q}\tilde{T}}/(1-k_2)}{1-\tilde{r}'e^{i\omega_{p-q}\tilde{T}}}\right)E_{p-q} - \tag{30}$$

$$(\alpha\tilde{\alpha})^{1/4}\sqrt{(1-\gamma_1)k_1(1-\gamma_2)k_2}\times J_p(\beta)e^{i\omega_0(T/2+\tilde{T}/2)}\left(\frac{1}{1-\tilde{r}'e^{i\omega_0\tilde{T}}}\right),$$

where $\omega_p T=\theta_{p,tot}$ is the accumulated round-trip phase of the pth comb line in the comb-generating resonator and $\omega_p\tilde{T}=\theta_{p,tot}(\tilde{T}/T)+p\omega_m\tilde{T}$ is the round-trip accumulated phase of the pth comb line in the small ring. The output optical field $E_{out}(t)$ and the reflected field $E_r(t)$ are $$E_{out}(t)=i\sqrt{(1-\gamma_3)k_3}E_c(t) \tag{31},$$

and $$E_r(t)=i\sqrt{(1-\gamma_1)k_1}\tilde{E}_c(t)+\sqrt{(1-\gamma_1)(1-k_1)}E_{in}(t). \tag{32}$$

With these expressions, a simple matrix solver may be used to first calculate $E_c(t)$ and then find the output field $E_{out}(t)$.

It is assumed that $\alpha=0.95$, $\beta=/2$, and $P_{in}=|\hat{E}_{in}|^2=1$. Additionally, to provide a fair comparison to the single resonator comb generator, it is assumed that $\gamma_1=\gamma_2=\gamma_3=0$ and $k_1=k_2=k_3=0.03$. Finally, $\tilde{T}=T/50$ is chosen in order to prioritize the 100 comb lines closest to the center optical frequency.

Figure 47:
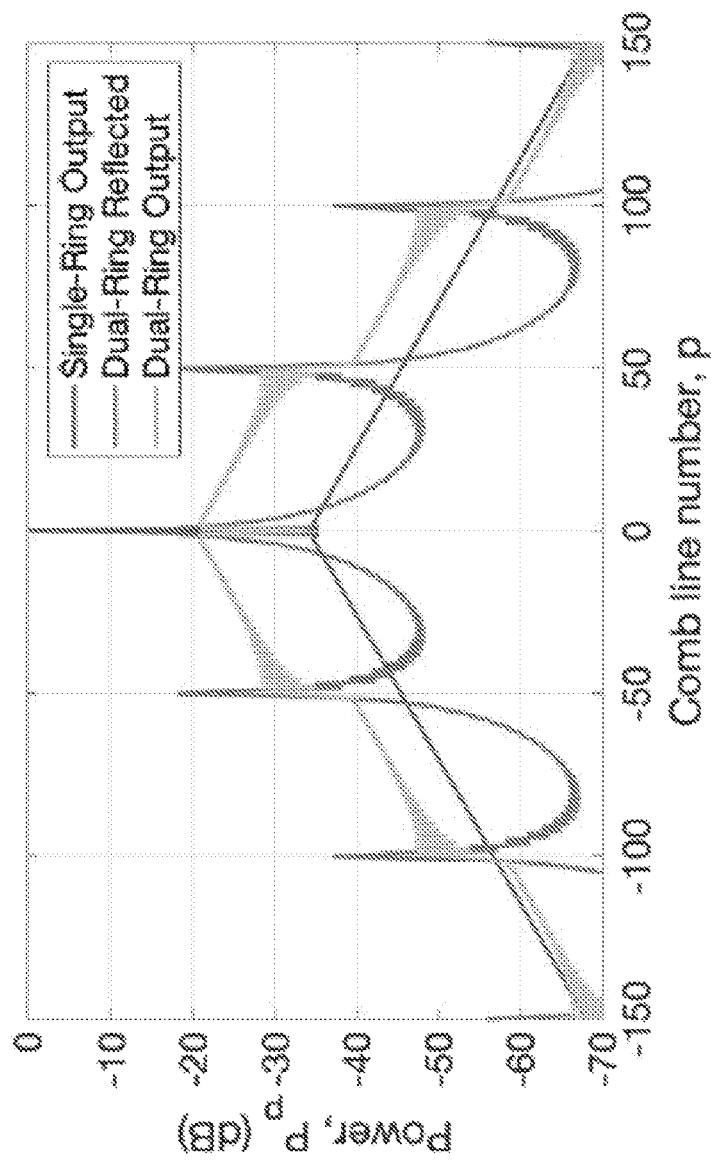
FIG. 47 is a plot of output spectra according to embodiments of the present disclosure.

FIG. 47 is a plot of the output spectra $P_p$ of a single-ring comb generator and a dual-ring comb generator. The reflected field from the dual-ring EO comb generator is also shown, demonstrating constructive build-up at the FSR of the coupling ring.

FIG. 47 compares the output comb spectrum of a single ring RE-EO comb generator to the output and reflected comb spectra of a dual-ring RE-EO comb generator. As expected, the small ring acts as a frequency-dependent coupler, with high transmission at multiples of the small ring FSR, but low transmission at other frequencies. This effect is demonstrated by the reflected power spectrum in FIG. 47, where power is concentrated in frequencies at a multiple of the small ring FSR. The output spectrum from the dual-ring RE-EO comb generator is significantly higher for comb lines that are within the FSR of the small ring. The conversion efficiency of input power to the 100 nearest comb lines excluding the center line ($-50<p<50$, $p\neq0$ for the single-ring comb generator is 1.3%, while the conversion efficiency of the dual-ring comb generator is 32.1%. The average increase in output power of these comb lines is 13.9 dB. However a sharp dip in comb line power occurs at multiples of the small ring FSR because light at these frequencies is coupled efficiently back into the smaller ring.

One possible limitation to the dual-ring comb generator design is the material damage threshold of the small ring. For the parameters discussed above, the time-averaged power in the small ring is 27 times the input optical power. However, even if the input optical power is unrealistically high, such as 1 W, the intra-resonator power is a factor of two below the damage threshold of many state-of-the-art integrated resonators.

In some cases, fabricating a ring with a FSR that is 50 times higher than that of the desired comb line spacing may prove challenging due to fabrication or material constraints. In these cases, it is still possible to generate high-power combs by increasing the size of the ring coupler, but tuning its length so that its FSR is not a harmonic of the FSR of the comb generating resonator.

Figure 48:
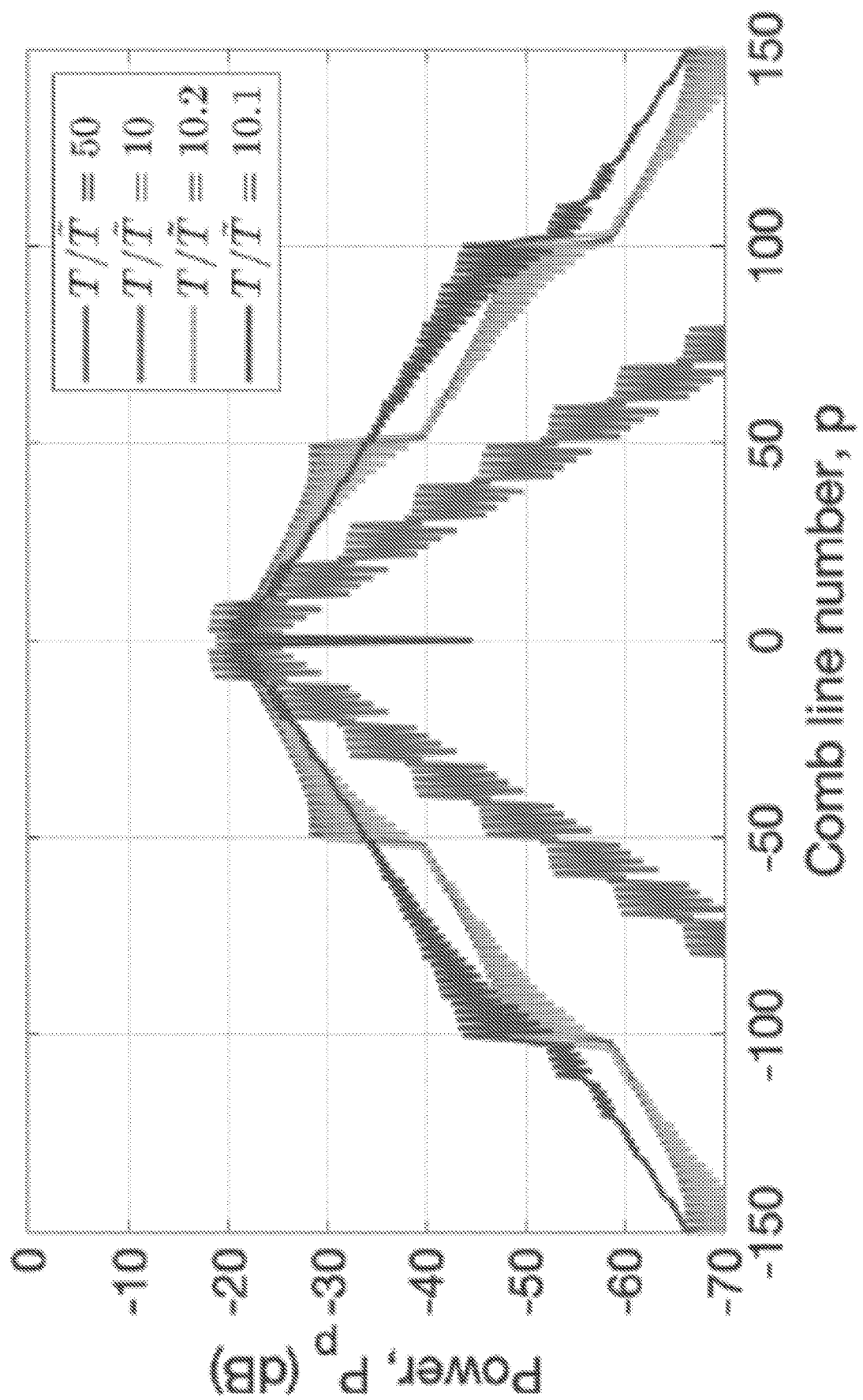
FIG. 48 is a plot of output spectra according to embodiments of the present disclosure.

FIG. 48 is a plot of output spectra $P_p$ for different values of the ratio of FSRs, $T/\tilde{T}$, of the small ring and comb-generating resonator. Slightly tuning the FSR of the coupling ring away from a harmonic of the FSR of the comb-generating resonator can increase the comb width and power.

FIG. 48 shows the output spectrum of a dual-ring EO comb generator for various values of the ratio of FSRs, $T/\tilde{T}$, of the small ring and comb-generating resonator. When compared to a small ring coupler ($T/\tilde{T}=50$), a ring coupler of increased size with FSR at a harmonic of the combgenerating resonator ($T/\tilde{T}=10$) results in a narrower comb due to interference inside the ring coupler. However, if the FSR of the small ring is adjusted away from a harmonic of the comb-generating resonator, the total FSR of the system increases, resulting in broad, high power comb generation without the difficulty of fabricating ultra-small rings. This process cannot proceed indefinitely due to the finite linewidth of the small ring resonator. Once the finesse of the ring approaches the ratio of the FSRs, at least one comb line inside the comb-generating resonator will lie inside the linewidth of the small ring. In this case, that comb line will be coupled back into the small ring and the FSR of the entire system is limited by the small ring FSR.

As mentioned above, frequency combs can be used in WDM coherent optical communications systems for both the transmitted optical carrier and receiver local oscillator. One problem with single-ring RE-EO comb generators is the low output power in each of the comb lines, which limits the OSNR of the transmitted optical carriers. The OSNR of WDM optical links utilizing RE-EO comb generators is analyzed.

Figure 49:
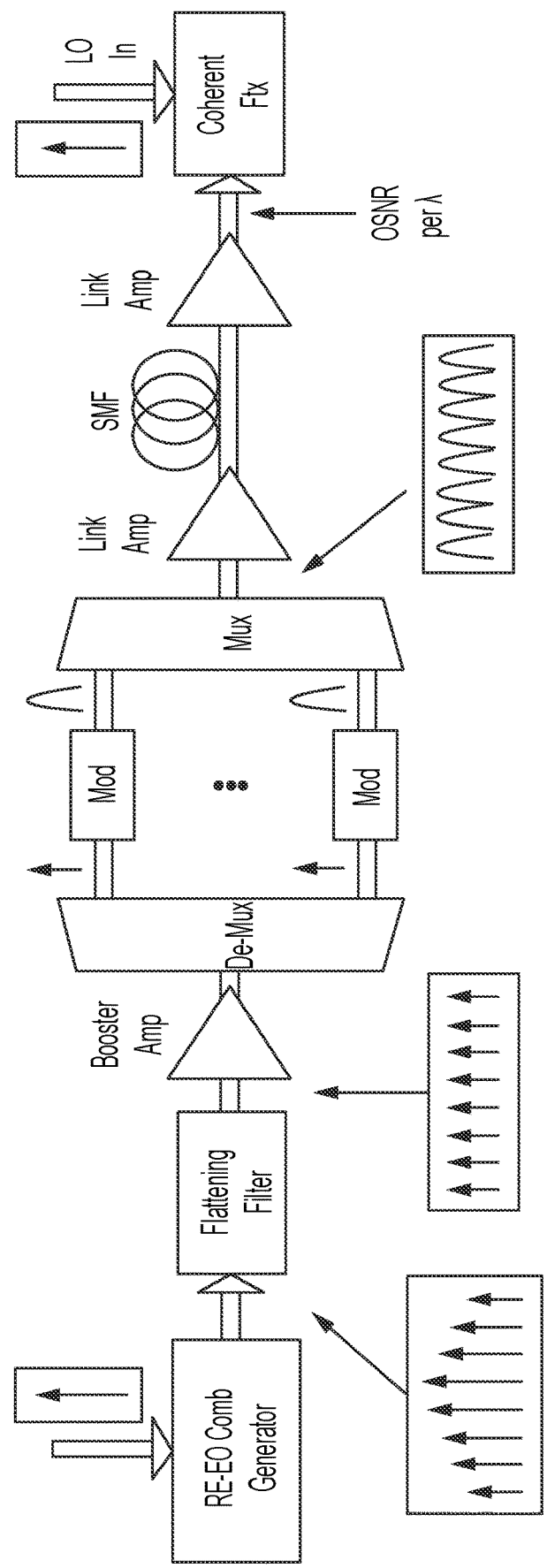
FIG. 49 is a schematic view of a WDM point-to-point inter-data center link according to embodiments of the present disclosure.

FIG. 49 is a schematic view of a WDM point-to-point inter-data center link. The output field from the RE-EO comb generator is flattened, amplified, and de-multiplexed (Demux). Each of the comb lines is modulated (Mod), multiplexed (Mux), and amplified before being input to a link of single-mode fiber (SMF). At the receiving end, the signal is amplified and sent to a coherent receiver (Rx). The OSNR is measured at the receiver input.

FIG. 49 shows an example WDM link that utilizes a RE-EO comb generator that seeds each of the modulated comb frequencies. An input laser is coupled into a RE-EO comb generator where multiple comb lines are generated. The output comb is flattened, amplified with a booster amplifier, and sent to a (de-)multiplexing stage, where the comb lines are separated, modulated individually, and re-combined. After this stage, the comb lines are amplified, transmitted through a length of single-mode fiber (SMF), and amplified before being sent to a coherent receiver.

Table 1 lists the parameters for this calculation. Notably, the difference in booster amplifier power between systems that utilize a single-ring and dual-ring RE-EO comb generator is 10 dB. This performance improvement is smaller than the average comb line power improvement of 14 dB because nonuniformities in the dual-ring RE-EO comb generator output spectrum result in a lower minimum optical power than the single-ring RE-EO comb generator. This effect is evident in FIG. 47.

TABLE 1

TABLE I
WDM LINK PARAMETERS

| Input laser power | 20 dBm |
| --- | --- |
| Insertion loss from output-coupling and flattening | 5 dB |
| Booster amplifier noise figure | 5 dB |
| Booster amplifier gain* | 30 dB |
| Insertion loss from (de-)multiplexing and modulation | 20 dB |
| Link amplifier noise figure | 5 dB |
| Link amplifier gain | 20 dB |
| Insertion loss from SMF | 20 dB |
| Local oscillator power | 15 dBm |

*20 dB for dual-ring RE-EO comb generator

For the values listed above, the receiver-side OSNR for a single-ring RE-EO comb generator is 21 dB, while the receiver-side OSNR for the dual-ring design is 28 dB. For a typical 28 Gbaud dual-polarization link based on 16-array quadrature amplitude modulation, the required receiver-side OSNR is ~22 dB [44]. For a WDM link that employs 100 comb lines, as shown in FIG. 47, the total bit-rate per fiber for this system, including overhead is 20 Tb/s. While single ring RE-EO comb generators can support lower modulation formats, and thus lower bit-rates per fiber, dual-ring comb generators provide an increase in OSNR budget of over 7 dB.

Analytical and numerical methods of predicting the output comb spectrum in the presence of a variety of impairments including optical frequency offsets, modulation frequency offsets, and dispersion are provided. These models are validated against each other and demonstrate that numerical modeling can efficiently approximate the comb spectrum without sacrificing accuracy. However, RE-EO comb generators based on a single resonator often cannot generate enough comb power to be useful for applications such as optical communications. Thus a fabricable RE-EO comb generator design is provided that utilizes a ring coupler to enhance the efficiency of the comb generation process. For this new design, the conversion efficiency is 30% higher than designs based on a single resonator, which enable its use in high-capacity coherent optical communications systems.

Output Phase Noise

This appendix calculates the relation between the phase noise of the pth comb line and the phase noise of the input optical field for resonant operation, as discussed above. It is assumed that the input optical field is $E_{in}(t)=\hat{E}_{in}e^{i\omega_0 t+i\varphi_0(t)}$, with PSD, $S_{in}(\omega)$, given by (7). The PSD of the output field, $E_{out}(t)$ is $$S_{out}(\omega) = \int_{-\infty}^{\infty} \langle E_{out}(t)E_{out}^*(t+\tau)\rangle e^{-i\omega\tau} d\tau \qquad (33)$$

$$= (1-\gamma)(1-k)S_{in}(\omega) - (1-\gamma)kS_{o,1}(\omega) -$$

$$(1-\gamma)kS_{o,2}(\omega) + (1-\gamma)\frac{k^2}{1-k}S_{o,3}(\omega),$$

where $S_{o,1}(\omega)$, $S_{o,2}(\omega)$, and $S_{o,3}(\omega)$, result from the autocorrelation of $E_{out}(t)$, given by (5), and are $$S_{o,1}(\omega) = \int_{-\infty}^{\infty}\left\langle E_{in}(t)\sum_{n=1}^{\infty} r^n e^{-i\beta n\sin\omega_m(t+\tau)} \times E_{in}^*(t+\tau-nT)\right\rangle e^{-i\omega\tau} d\tau \qquad (34)$$

$$S_{o,2}(\omega) = \int_{-\infty}^{\infty}\left\langle E_{in}^*(t+\tau)\sum_{n=1}^{\infty} r^n e^{i\beta n\sin\omega_m t} \times E_{in}(t-nT)\right\rangle e^{-i\omega\tau} d\tau \qquad (35)$$

$$S_{o,3}(\omega) = \qquad (36)$$

$$\int_{-\infty}^{\infty}\left\langle \sum_{n,m=1}^{\infty} r^{n+m} e^{i\beta n\sin\omega_m t} e^{-i\beta m\sin\omega_m(t+\tau)} \times E_{in}(t-nT)E_{in}^*(t+\tau-mT)\right\rangle$$

$$e^{-i\omega\tau} d\tau.$$

Focusing first on $S_{o,1}(\omega)$, and $S_{o,2}(\omega)$, the optical phase noise is uncorrelated to the phase modulation and thus the time-averaging inside the integrals can be separated into two terms, i.e., $$\left\langle E_{in}(t)\sum_{n=1}^{\infty} r^n e^{-i\beta n\sin\omega_m(t+\tau)} E_{in}^*(t+\tau-nT)\right\rangle = \qquad (37)$$

$$\sum_{n=1}^{\infty} r^n \langle e^{-i\beta n\sin\omega_m(t+\tau)}\rangle\langle E_{in}(t)E_{in}^*(t+\tau-nT)\rangle.$$

A Jacobi-Anger expansion can be applied to terms similar to the leftmost expectation above, resulting in $$\langle e^{\pm i\beta n\sin\omega_m(t+\tau)}\rangle = \left\langle \sum_{p=-\infty}^{\infty} J_p(\beta n)e^{\pm ip\omega_m(t+\tau)}\right\rangle \qquad (38)$$

$$= J_0(\beta n).$$

With some algebra, the following expressions can be obtained for $S_{o,1}(\omega)$, and $S_{o,2}(\omega)$, as a function of the input PSD $S_{in}(\omega)$:

$$S_{o,1}(\omega) = \left[\sum_{n=1}^{\infty} r^n J_0(\beta n)e^{-i\omega nT}\right] S_{in}(\omega) \qquad (39)$$

$$S_{o,2}(\omega) = \left[\sum_{n=1}^{\infty} r^n J_0(\beta n)e^{i\omega nT}\right] S_{in}(\omega) \qquad (40)$$

To calculate $S_{o,3}(\omega)$, uncorrelated terms are separated, similar to (37), resulting in the following simplification:

$$\langle e^{i\beta n\sin\omega_m t}e^{-i\beta m\sin\omega_m(t+\tau)}\rangle = \left\langle\sum_{p,q=-\infty}^{\infty} J_p(\beta n)J_q(\beta m)e^{i(p-q)\omega_m t}e^{-iq\omega_m\tau}\right\rangle = \qquad (41)$$

$$\sum_{p=-\infty}^{\infty} J_p(\beta n)J_p(\beta m)e^{-ip\omega_m\tau}.$$

With some additional algebra, $S_{o,3}(\omega)$ can be expressed as a function of $S_{in}(\omega)$), $$S_{o,3}(\omega) = \sum_{p=-\infty}^{\infty} S_{in}(\omega-p\omega_m) \times \left[\sum_{n,m=1}^{\infty} r^{n+m} J_p(\beta n)J_p(\beta m)e^{i\omega(n-m)T}\right]. \qquad (42)$$

Finally, the output PSD is $$S_{out}(\omega) = (1-\gamma)[(1-k)-2k\text{Re}\{\chi_0(\omega)\}]S_{in}(\omega) + \qquad (43)$$

$$(1-\gamma)\frac{k^2}{1-k}\sum_{p=-\infty}^{\infty} |\chi_p(\omega)|^2 S_{in}(\omega-p\omega_m),$$

where the linewidth correction term $\chi_p(\omega)$ is defined in (9).

Modulation Frequency Offset

The power in the pth comb line in the presence of modulation frequency offsets is derived, as defined above. First, in the presence of modulation frequency offsets, the cascaded modulation function, (2), can be adjusted to include the modulation frequency offset $\phi_m=\Delta\omega_m T$ by noting $$\beta F_n(\omega_m t) = \qquad (44)$$

$$\beta\sum_{i=1}^{n} \sin\omega_m(t-iT) = \beta\sin(\omega_m t)\left(\frac{1}{2}\cot(\phi_m/2) - \frac{\cos\left(\left(n+\frac{1}{2}\right)\phi_m\right)}{2\sin(\phi_m/2)}\right) -$$

$$\beta\cos(\omega_m t)\left(-\frac{1}{2} + \frac{\sin\left(\left(n+\frac{1}{2}\right)\phi_m\right)}{2\sin(\phi_m/2)}\right) =$$

$$\beta_o(\phi_m, n)\sin(\omega_m t) - \beta_e(\phi_m, n)\cos(\omega_m t),$$

where in the second line Lagrange's trigonometric identities are used where the final expression is simplified using $\beta_o(\phi_m, n)$ and $\beta_e(\phi_m, n)$ as defined above. This expression can then be inserted into (1) to find an expression for the output optical field in a similar manner to that of (5):

$$E_{out}(t) = \sqrt{(1-\gamma)(1-k)}\,\hat{E}_{in}e^{i\omega_0 t} - \qquad (45)$$

$$k\sqrt{\frac{1-\gamma}{1-k}}\hat{E}_{in}e^{i\omega_0 t} \times \sum_{n=1}^{\infty}(r^n e^{-i\beta_o(\phi_m,n)\sin(\omega_m t)}e^{-i\beta_e(\phi_m,n)\cos(\omega_m t)}) =$$

-continued $$\sqrt{(1-\gamma)(1-k)}\,\hat{E}_{in}e^{i\omega_0 t}\left[1-\frac{k}{1-k}\right.$$

$$\left.\sum_{p=-\infty}^{\infty}e^{ip\omega_m t}\times\sum_{n=1}^{\infty}\sum_{q=-\infty}^{\infty}r^n \hat{r}^q J_{p-q}(\beta_o(\phi_m,n))J_q(\beta_e(\phi_m,n))\right].$$

From this output field, composed of equidistant frequencies spaced at the modulation frequency, the output power in the pth comb line can be calculated, given by (15). When the modulator frequency is tuned exactly to the resonator FSR ($\phi_m=0$), this result reduces to (6).

Various exemplary embodiments described herein use lithium niobate for resonators and waveguides. However, it will be appreciated that a variety of electro-optic materials may be used in place of lithium niobate, such as lithium tantalate. In general, any materials with an electro-optic coefficient of at least 2 pm/V is suitable.

Various exemplary embodiments described herein use ring resonators resonators. However, it will be appreciated that alternative resonator configurations may be substituted for one or more of the ring resonators in various embodiments. For example, a racetrack resonator may be used.

Various exemplary embodiments described herein include a thermal oxide substrate, such as $SiO_2$. However, it will be appreciated that a variety of alternative substrates are suitable, including $SiO_2$, quartz, and sapphire. In general, any substrate with a low refractive index is suitable as a substrate. In this context, a low refractive index material is a material having a refractive index of n≤2.25 at normal temperature and pressure (20° C./293.15 K/68° F. and 1 atm/14.696 psi/101.325 kPa).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
a thermal oxide substrate;
a microring resonator comprising lithium niobate, the microring resonator disposed on the thermal oxide substrate and having inner and outer edges;
electrodes positioned along the inner and outer edges of the microring resonator, adapted to modulate the refractive index of the microring;
a pump laser optically coupled to the microring resonator, wherein
the microring resonator is adapted to emit an electro-optical frequency comb when receiving a pump mode from the pump laser and when the electrodes are driven at a frequency equal to a free-spectral-range of the microring resonator.

2. The device of claim 1, wherein the pump laser is optically coupled to the microring resonator via a coupling ring resonator, the coupling ring resonator having a free spectral range that is a non-integer multiple of a free spectral range of the microring resonator.

3. The device of claim 2, further comprising:
an output waveguide optically coupled to the microring resonator.

4. The device of claim 2, wherein the coupling ring resonator has a free spectral range greater than that of the microring resonator.

5. The device of claim 1, wherein the microring resonator is further adapted to emit a Kerr frequency comb when receiving the pump mode from the pump laser.

6. The device of claim 1, wherein the electro-optical frequency comb spans at least 10 nm.

7. The device of claim 1, wherein the electro-optical frequency comb has spacing of 1 GHz to 300 GHz.

8. The device of claim 1, wherein the electrodes comprise gold or copper.

9. The device of claim 1, wherein the microring resonator has a Q factor of at least 500,000.

10. The device of claim 1, wherein the electrodes are positioned at least 1.5 pm from the edges of the microring resonator.

11. The device of claim 1, wherein the thermal oxide substrate has a thickness of about 1 pm.

12. The device of claim 1, wherein the thermal oxide substrate has a thickness of about 2 pm.

13. The device of claim 1, wherein the electrodes are driven at a frequency of about 10 GHz.

14. The device of claim 1, wherein the electrodes are driven at a power of about 10 mW.

15. The device of claim 1, wherein the pump laser has a power of 0.1 mW to 3 W.

16. The device of claim 1, wherein the pump laser has a power of from 2 mW to 100 mW.

17. The device of claim 1, wherein the electro-optical frequency comb has a center wavelength of 380 nm to 5000 nm.

18. The device of claim 1, wherein the microring resonator comprises a ridge portion extending from a slab portion, the ridge portion having a height perpendicular to the slab portion and a width parallel to the slab portion.

19. The device of claim 18, wherein the slab portion has a thickness of 5 nm to 1000 nm.

20. The device of claim 18, wherein the ridge portion has a height of about 350 nm.

21. The device of claim 18, wherein the ridge portion has a width of 100 nm to 5000 nm.

22. The device of claim 18, wherein the ridge portion has a cross sectional area less than 5 μm².

23. The device of claim 1, wherein the microring resonator is air-clad.

24. The device of claim 1, wherein the microring resonator is clad with $SiO_2$.

25. The device of claim 1, further comprising:
an inductor electrically coupled to the electrodes.

26. The device of claim 25, wherein the inductor is adapted to form a microwave resonator having a resonant frequency, the resonant frequency being an integer multiple of a free-spectral range of the microring resonator.

27. A device comprising:
a substrate;
a resonator comprising an electro-optic material, the resonator disposed on the substrate;
electrodes positioned along the resonator with at least a portion of the resonator disposed between the electrodes, the electrodes adapted to modulate the refractive index of the resonator;

a pump laser optically coupled to the resonator, wherein the resonator is adapted to emit an electro-optical frequency comb when receiving a pump mode from the pump laser and when the electrodes are driven at a frequency, the frequency being an integer multiple of a free-spectral-range of the resonator.

28. The device of claim 27, wherein the substrate comprises a thermal oxide.

29. The device of claim 27, wherein the substrate comprises $SiO_2$, quartz, or sapphire.

30. The device of claim 27, wherein the electro-optic material comprises lithium niobate or lithium tantalate.

31. The device of claim 27, wherein the electro-optic material has an electro-optic coefficient of at least 2 pm/V.

32. The device of claim 27, wherein the resonator comprises a racetrack resonator.

33. The device of claim 32, wherein the racetrack resonator has a minor axis measuring 20 pm to 2000 pm and a perpendicular major axis measuring 0.1 mm to 20 mm.

34. The device of claim 33, wherein the major axis is perpendicular to an extraordinary axis of the electro-optic material.

35. The device of claim 27, wherein the resonator comprises a ring resonator.

36. The device of claim 27, wherein
the resonator comprises a ring resonator or a racetrack resonator,
the resonator has inner and outer edges, a first surface in contact with the substrate, and a second surface parallel to the first surface,
the electrodes are positioned along the first and second surfaces of the resonator.

37. The device of claim 27, wherein
the resonator comprises a ring resonator or a racetrack resonator,
the resonator has inner and outer edges, a first surface in contact with the substrate, and a second surface parallel to the first surface,
a first electrode is positioned along the outer edge of the resonator,
a second electrode is positioned along the second surface of the resonator.

38. The device of claim 27, wherein the pump laser is optically coupled to the resonator via a coupling resonator, the coupling resonator having a free spectral range that is a non-integer multiple of a free spectral range of the resonator.

39. The device of claim 38, wherein the coupling resonator comprises a ring resonator.

40. The device of claim 38, further comprising:
an output waveguide optically coupled to the resonator.

41. The device of claim 38, wherein the coupling resonator has a free spectral range greater than that of the resonator.

42. The device of claim 27, wherein the resonator is further adapted to emit a Kerr frequency comb when receiving the pump mode from the pump laser.

43. The device of claim 27, wherein the electro-optical frequency comb spans at least 10 nm.

44. The device of claim 27, wherein the electro-optical frequency comb has spacing of 1 GHz to 300 GHz.

45. The device of claim 27, wherein the electrodes comprise gold or copper.

46. The device of claim 27, wherein the resonator has a Q factor of at least 500,000.

47. The device of claim 27, wherein the electrodes are positioned at least 1.5 pm from the edges of the resonator.

48. The device of claim 27, wherein the substrate has a thickness of about 1 pm.

49. The device of claim 27, wherein the substrate has a thickness of about 2 pm.

50. The device of claim 27, wherein the electrodes are driven at a frequency of about 10 GHz.

51. The device of claim 27, wherein the electrodes are driven at a power of about 10 mW.

52. The device of claim 27, wherein the pump laser has a power of 0.1 mW to 3 W.

53. The device of claim 27, wherein the pump laser has a power of from 2 mW to 100 mW.

54. The device of claim 27, wherein the electro-optical frequency comb has a center wavelength of 380 nm to 5000 nm.

55. The device of claim 27, wherein the resonator comprises a ridge portion extending from a slab portion, the ridge portion having a height perpendicular to the slab portion and a width parallel to the slab portion.

56. The device of claim 55, wherein the slab portion has a thickness of 5 nm to 1000 nm.

57. The device of claim 55, wherein the ridge portion has a height of about 350 nm.

58. The device of claim 55, wherein the ridge portion has a width of 100 nm to 5000 nm.

59. The device of claim 55, wherein the ridge portion has a cross sectional area less than 5 $\mu m^2$.

60. The device of claim 27, wherein the resonator is air-clad.

61. The device of claim 27, wherein the resonator is clad with $SiO_2$.

62. The device of claim 27, further comprising:
an inductor electrically coupled to the electrodes.

63. The device of claim 62, wherein the inductor is adapted to form a microwave resonator having a resonant frequency, the resonant frequency being an integer multiple of a free-spectral range of the microring resonator.

64. A method of generating an electro-optical frequency comb, the method comprising:
receiving a pump mode from a pump laser by a resonator, wherein
the resonator comprises an electro-optic material,
the resonator is disposed on a substrate;
driving electrodes at a frequency, the frequency being an integer multiple of a free-spectral-range of the resonator, wherein
the electrodes are positioned along the resonator with at least a portion of the resonator disposed between the electrodes,
the electrodes adapted to modulate the refractive index of the resonator.

* * * * *

UNITED STATES PATENT AND TRADEMARK OFFICE
CERTIFICATE OF CORRECTION

PATENT NO. : 11,537,026 B2  
APPLICATION NO. : 17/051670  
DATED : December 27, 2022  
INVENTOR(S) : Zhang et al.

Page 1 of 1

It is certified that error appears in the above-identified patent and that said Letters Patent is hereby corrected as shown below:

In the Specification

Insert the following paragraph at Column 1, Line number 13:
--GOVERNMENT SUPPORT
This invention was made with government support under 1740296 awarded by the National Science Foundation. The government has certain rights in the invention.--

Signed and Sealed this
Fourteenth Day of January, 2025

Derrick Brent
*Acting Director of the United States Patent and Trademark Office*